(12) United States Patent
Botelho et al.

(10) Patent No.: US 12,019,748 B2
(45) Date of Patent: Jun. 25, 2024

(54) APPLICATION MIGRATION FOR CLOUD DATA MANAGEMENT AND RANSOMWARE RECOVERY

(71) Applicant: Rubrik, Inc., Palo Alto, CA (US)

(72) Inventors: Fabiano Botelho, Palo Alto, CA (US);
Bryan Evans, Palo Alto, CA (US);
Benjamin Travis Meadowcroft, Lincoln, CA (US)

(73) Assignee: Rubrik, Inc., Palo Alto, CA (US)

( * ) Notice: Subject to any disclaimer, the term of this patent is extended or adjusted under 35 U.S.C. 154(b) by 356 days.

(21) Appl. No.: 17/322,356

(22) Filed: May 17, 2021

(65) Prior Publication Data
US 2022/0374519 A1 Nov. 24, 2022

(51) Int. Cl.
| | |
|---|---|
| G06F 21/56 | (2013.01) |
| G06F 9/455 | (2018.01) |
| G06F 11/14 | (2006.01) |
| G06F 21/54 | (2013.01) |
| G06F 21/55 | (2013.01) |

(52) U.S. Cl.
CPC ........ G06F 21/568 (2013.01); G06F 9/45558 (2013.01); G06F 11/1451 (2013.01); G06F 11/1464 (2013.01); G06F 11/1469 (2013.01); G06F 21/54 (2013.01); G06F 21/554 (2013.01); *G06F 2009/45587* (2013.01); *G06F 2009/45595* (2013.01)

(58) Field of Classification Search
CPC .............. G06F 21/568; G06F 9/45558; G06F 11/1451; G06F 11/1464; G06F 11/1469; G06F 21/54; G06F 21/554; G06F 2009/45587; G06F 2009/45595; G06F 2009/45579; G06F 2201/815; G06F 11/1471; G06F 11/2097; G06F 11/2094; G06F 2201/84
See application file for complete search history.

(56) References Cited

U.S. PATENT DOCUMENTS

| | | | |
|---|---|---|---|
| 10,346,610 B1* | 7/2019 | Natanzon | G06F 3/0623 |
| 11,036,594 B1* | 6/2021 | Shats | G06F 11/1466 |
| 2016/0202923 A1* | 7/2016 | Liu | G06F 3/0664 |
| | | | 711/162 |
| 2018/0032409 A1* | 2/2018 | Surakanti | G06F 11/1451 |
| 2018/0211039 A1* | 7/2018 | Tamir | G06F 21/568 |
| 2020/0034537 A1* | 1/2020 | Chen | G06F 16/951 |
| 2020/0042707 A1* | 2/2020 | Kucherov | G06F 3/0683 |
| 2021/0303418 A1* | 9/2021 | Swami | G06F 16/13 |
| 2022/0229746 A1* | 7/2022 | Jindal | G06F 11/1464 |

* cited by examiner

*Primary Examiner* — Trong H Nguyen
(74) *Attorney, Agent, or Firm* — Holland & Hart LLP

(57) ABSTRACT

Examples relate generally to systems and methods for orchestrating a recovery in the event of a ransomware attack on a compute infrastructure. More specifically, some examples include techniques for application migration in cloud data management, ransomware recovery, and mitigation of lost data.

17 Claims, 65 Drawing Sheets

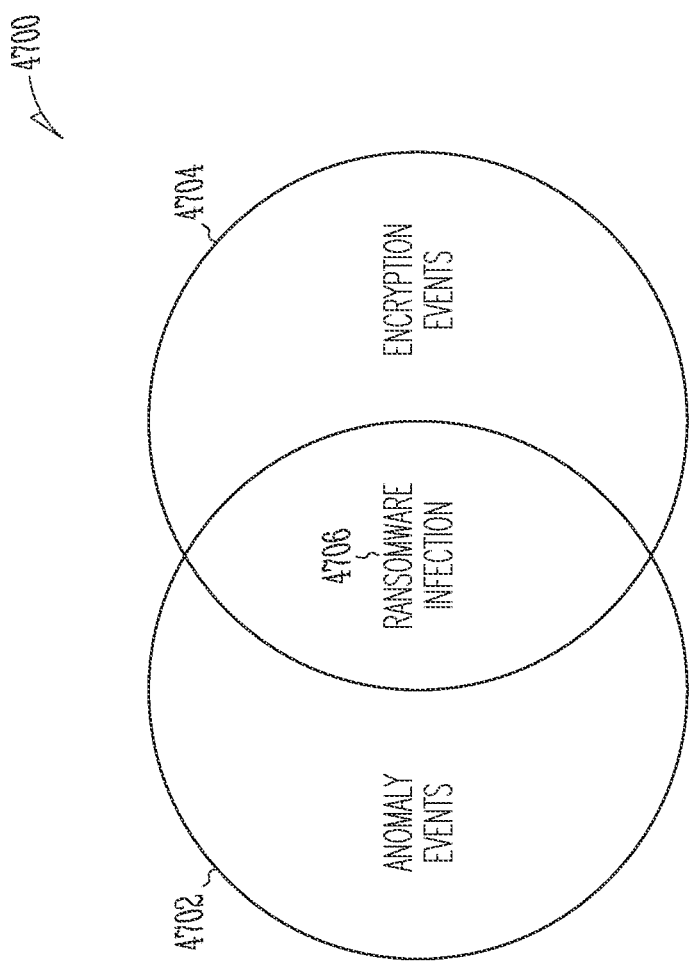

```
{"path": "\/Users\/Windows\/Desktop\/target", "inode": {"stat": {} "mode": "000041ff",
"mtime": "2018-01-12_13:10:42", "size": 518, "acl": {} "mode": "000041ff", "uid": 0,
"gid": 0, "cifs_attr": 0 }}}
{"path": "\/Users\/Windows\/Desktop\/target\/fs0_0.target", "inode": {"stat": {} "mode":
"000081ff", "mtime": "2018-01-12_13:10:42", "size": 6, "acl": {} "mode": "000081ff",
"uid": 0, "gid": 0, "cifs_attr": 0 }}, "bytes_changed": 6 }}
{"path": "\/Windows\/Temp", "inode": {"stat": {} "mode": "000041ff", "mtime":
"2018-01-12_13:10:12", "size": 2503224, "acl": {} "mode": "000041ff", "uid": 0, "gid": 0,
"cifs_attr": 0 }}}
```

Fig. 48

{"value": {"entropy_128": "5.364138505482046", "entropy_256": "5.611384088755264", "entropy_512": "5.791241747107691", "magic_type": "data"}, "key": "/Users/Windows/Desktop/sstable/fs0_1_0.sstable"}
{"value": {"entropy_128": "2.584962500721156", "entropy_256": "2.584962500721156", "entropy_512": "2.584962500721156", "magic_type": "ASCII text"}, "key": "/Users/Windows/Desktop/target/fs0_1.target"}

*Fig. 49*

Service Schedule 5622

| machine_user_id | machine_id | SLA |
|---|---|---|
| VM01 | m001 | standard VM |
| VM02 | m002 | standard VM |
| PM04 | m003 | standard PM |
| VM07 | m004 | high frequency |
| PM01 | m005 | short life |
| | ... | |

Fig. 57A

562A
Job Queue

| job_id | start_time | job_type | job_info |
|---|---|---|---|
| 00001 | 0600 | pull snapshot | target = m001 |
| 00002 | 0600 | pull snapshot | target = m005 |
| 00003 | 0610 | replicate | target = m003 |
| 00004 | 0615 | run analytics | target = m002 |
| 00005 | 0615 | trash collection | xxx |
| ... | | | |

Fig. 57B

Snapshot Table 5626

| ss_id | ss_time | im_list |
|---|---|---|
| m001.ss1 | 20171001.0300 | m001.im1 |
| m001.ss2 | 20171001.0900 | m001.im1, m001.im1-2 |
| m001.ss3 | 20171001.1500 | m001.im1, m001.im1-2, m001.im2-3 |
| m001.ss4 | 20171001.2100 | m001.im1, m001.im1-2, m001.im2-3, m001.im3-4 |
| m001.ss5 | 20171002.0300 | ... |

Image Table 5628

| im_id | im_location |
|---|---|
| m001.im1 | ... |
| m001.im1-2 | |
| m001.im2-3 | |
| m001.im3-4 | |
| m001.im4-5 | |

*Fig. 57C*

Snapshot Table 5626

| ss_id | ss_time | im_list |
|---|---|---|
| m001.ss1 | 20171001.0300 | m001.im1 |
| m001.ss2 | 20171001.0900 | m001.im1, m001.im1-2 |
| m001.ss3 | 20171001.1500 | m001.im1, m001.im1-2, m001.im2-3 |
| m001.ss4 | 20171001.2100 | m001.im1, m001.im1-2, m001.im2-3, m001.im3-4 |
| m001.ss5 | 20171002.0300 | m001.im1, ......, m001.im4-5 |
| m001.ss6 | 20171002.0900 | ... |
| ... | ... | |
| m001.ss12 | 20171003.2100 | m001.im1, ......, m001.im11-12 |

Image Table 5628

| im_id | im_location |
|---|---|
| m001.im1 | xxx |
| m001.im1-2 | |
| m001.im2-3 | |
| m001.im3-4 | |
| m001.im4-5 | |
| m001.im5-6 | |
| ... | xxx |
| m001.im11-12 | |

*Fig. 58A*

Snapshot Table 5626

| ss_id | ss_time | im_list |
|---|---|---|
| m001.ss1 | 20171001.0300 | m001.im1 |
| m001.ss2 | 20171001.0900 | m001.im1, m001.im1-2 |
| m001.ss3 | 20171001.1500 | m001.im1, m001.im1-2, m001.im2-3 |
| m001.ss4 | 20171001.2100 | m001.im1, m001.im1-2, m001.im2-3, m001.im3-4 |
| m001.ss5 | 20171002.0300 | m001.im1, ..., m001.im4-5 |
| m001.ss6 | 20171002.0900 | |
| ... | ... | ... |
| m001.ss12 | 20171003.2100 | m001.im1, ..., m001.im11-12 |

Image Table 5628

| im_id | im_location |
|---|---|
| m001.im1 | ... |
| m001.im1-2 | |
| m001.im2-3 | |
| m001.im3-4 | |
| m001.im4-5 | |
| m001.im5-6 | |
| ... | |
| m001.im11-12 | |

Snapshot Table 5626

| ss_id | ss_time | im_list |
|---|---|---|
| m001.ss1 | 20171001.0300 | m001.im1 |
| m001.ss2 | 20171001.0900 | m001.im1, m001.im2-2 |
| m001.ss3 | 20171001.1500 | m001.im1, m001.im2-2, m001.im3 |
| m001.ss4 | 20171001.2100 | m001.im1, m001.im2-3, m001.im3-4 |
| m001.ss5 | 20171002.0300 | m001.im5 |
| m001.ss6 | 20171002.0900 | ... |
| ... | ... | ... |
| m001.ss12 | 20171003.2100 | m001.im5, ... m001.im11-12 |

Image Table 5628

| im_id | im_location |
|---|---|
| m001.im1 | ... |
| m001.im2-2 | |
| m001.im3-4 | |
| m001.im3-4 | |
| m001.im4-5 | |
| m001.im5-6 | ... |
| ... | |
| m001.im11-12 | |
| m001.im5 | |

Snapshot Table 5626

| ss_id | ss_time | im_list |
|---|---|---|
| m001.ss1 | 20171001.0300 | m001.im1 |
| m001.ss2 | 20171001.0900 | m001.im1, m001.im1-2 |
| m001.ss3 | 20171001.1500 | m001.im1, m001.im1-2, m001.im2-3 |
| m001.ss4 | 20171001.2100 | m001.im1, m001.im1-2, m001.im2-3, m001.im2-4 |
| m001.ss5 | 20171002.0300 | m001.im5 |
| m001.ss6 | 20171002.0900 | ××× |
| ⋮ | ⋮ | ⋮ |
| m001.ss12 | 20171003.2100 | m001.im5, ..., m001.im11-12 |

Image Table 5628

| im_id | im_location |
|---|---|
| m001.im1 | ... |
| m001.im1-2 | |
| m001.im2-3 | |
| m001.im2-4 | |
| m001.im4-5 | |
| m001.im5-6 | ... |
| ⋮ | |
| m001.im5 | |
| m001.im5-1 | |

Application Service Schedule

| application_user_id | application_id | machine_id | SLA |
|---|---|---|---|
| APP01 | a001 | m001, m002, m003 | standard application |
| APP02 | a002 | m004, m005 | short life |
| APP03 | a003 | m006, m007 | high frequency |
| APP04 | a004 | m008, m009, m001 | standard application |
| ... | ... | ... | ... |

Fig. 59A

562A
Job Queue

| job_id | start_time | job_type | job_info | application_id |
|--------|------------|---------------|----------------|----------------|
| 00001 | 0300 | pull snapshot | target = m003 | APP01 |
| 00002 | 0300 | pull snapshot | target = m002 | APP01 |
| 00003 | 0300 | pull snapshot | target = m003 | APP01 |
| ... | | | | |
| 00010 | 0600 | pull snapshot | target = m004 | APP02 |
| 00011 | 0600 | pull snapshot | target = m005 | APP02 |
| ... | | | | |

Fig. 59B

Application Snapshot Table 5636

| ss_id | ss_time | snapshot_child_list | snapshot_parent_list |
|---|---|---|---|
| app001.ss1 | 20171001.0300 | m001.ss1, m002.ss1, m003.ss1 | |
| m001.ss1 | 20171001.0300 | | app001.ss1 |
| m002.ss1 | 20171001.0300 | | app001.ss1 |
| m003.ss1 | 20171001.0300 | | app001.ss1 |
| app001.ss2 | 20171002.0300 | m001.ss2, m002.ss2, m003.ss2 | |
| m001.ss2 | 20171002.0300 | | app002.ss2 |
| m001.ss2 | 20171002.0300 | | app002.ss2 |
| m001.ss2 | 20171002.0300 | ... | app002.ss2 |

Fig. 59C

APPLICATION MIGRATION FOR CLOUD DATA MANAGEMENT AND RANSOMWARE RECOVERY

FIELD

The present disclosure relates generally to systems and methods for orchestrating a recovery in the event of a ransomware attack on a compute infrastructure. More specifically, some examples include techniques for application migration in cloud data management, ransomware recovery, and mitigation of lost data.

BACKGROUND

The amount and type of data that is collected, analyzed and stored is increasing rapidly over time. The compute infrastructure used to handle this data is also becoming more complex, with more processing power and more portability. As a result, data management and storage are increasingly important. One aspect of this is reliable data backup and storage and fast data recovery in cases of failure, malware interruption, or ransomware attack. A ransomware attack can include unauthorized encryption or publication of data. Another aspect is data portability across locations and platforms.

Virtualization allows virtual machines to be created and decoupled from the underlying physical hardware. For example, a hypervisor running on a physical host machine or server may be used to create one or more virtual machines that may each run the same or different operating systems, applications and corresponding data. In these cases, management of the compute infrastructure typically includes backup and retrieval of the virtual machines, in addition to just the application data. However, various different platforms are offered for virtualization, including VMware, Microsoft Hyper-V, Microsoft Azure, GCP (Google Cloud Platform), Nutanix AHV, Linux KVM (Kernel-based Virtual Machine), and Xen. While users may desire to have their applications and data be machine-agnostic, it typically is not easy to port applications and data between different platforms. Thus, there is a need for better approaches to managing and storing data, particularly across different virtual machine platforms.

Virtual machines (VMs) that include virtual disks are sometimes backed up by taking snapshots. Due to certain limitations of existing snapshot technology, snapshots cannot be taken frequently without impacting VM users. Typical snapshot-based backup and recovery technology provides recovery point objectives (RPOs) in the tens of minutes.

In a snapshot-based approach, a base snapshot is taken when a protection policy under a service level agreement (SLA) for example is enabled on a VM and its virtual disks. After the base snapshot is saved on a backup site, incremental snapshots are taken periodically. A delta between two snapshots represents data blocks that have changed, and these blocks may be sent to and stored on a backup site for recovery when needed. Since taking snapshots is an expensive operation and may impact users, snapshots are typically taken some minutes apart, often from the tens of minutes to several hours, and this in turn can result in a very poor RPO.

In further aspects, ransomware has become a major cybersecurity threat over the past few years. In this regard, data security regulations such as those mandated in the General Data Protection Regulation 2016/679 (GDPR) place strict notification obligations on data holders. The GDPR is a regulation in EU law relating to data protection and privacy for all individuals within the European Union and the European Economic Area. The regulation also addresses the export of personal data outside the EU and EEA areas, such as into the United States. Under the GDPR regulation, if there is a data breach the data holder is required to notify all affected users very quickly. Thus, the rapid detection of ransomware or unauthorized access to data is critical.

Conventional attempts to solve these challenges have drawbacks. For example, signature-based ransomware detection is ineffective because ransomware can avoid detection by using different signatures. In addition, behavioral analysis-based approaches tax computational resources. In any large organization with multiple disparate file systems, protecting against ransomware invasion is a resource-consuming task. Status-based detection systems that look for system changes at specified time intervals as evidence of possible misappropriation do not operate in real time and do not solve the technical challenge of how to provide rapid notification after a ransomware event. Moreover, status-based systems do not typically identify an affected user or unauthorized actor in any event.

SUMMARY

In some examples, a disaster recovery (DR) system is provided for orchestrating a recovery in the event of a ransomware attack on a compute infrastructure. In some examples, a DR system comprises at least one processor for executing machine-readable instructions, and a memory storing instructions configured to cause the at least one processor to perform operations comprising, at least: monitoring the compute infrastructure by deploying continuous data management (CDM) of the compute infrastructure, the compute infrastructure including a virtual machine (VM) having a virtual disk, a local primary datacenter and a remote secondary datacenter, the CDM to implement on-demand or automated backup services using the local primary datacenter or remote secondary datacenter; identifying an application configuration in the compute infrastructure to generate a blueprint, the blueprint to serve as a target application configuration for a recovery in the event of a ransomware attack, continuously or periodically scanning snapshots of the VM for evidence of ransomware present in the VM; and in response to a detection of ransomware in the VM, executing the recovery by implementing, based on the blueprint, a DR orchestration plan to establish the target application configuration at the local primary datacenter of the compute infrastructure.

In some examples, the deployed CDM includes at least: obtaining a base snapshot of the virtual disk of the VM; intercepting, at an interception point in an I/O path, a virtual disk I/O stream between the VM and a virtualization server; replicating the I/O stream at a backup site at the local primary datacenter or remote secondary datacenter; storing the replicated I/O stream at the backup site in I/O logs; forming a recoverable snapshot-log chain by applying the replicated I/O stream stored in the I/O logs on top of the base snapshot; receiving a request for recoverable data from a replication target; and sending data to the replication target based at least on a portion of the recoverable snapshot-log chain.

In some examples, the blueprint defines the DR orchestration plan for a failover or rollback employed in the recovery at the local primary data center, the DR orchestration plan including an application migration plan.

In some examples, wherein the application migration plan is used to migrate, during the recovery, an application between different computing environments, the different computing environments including the local primary data-center, the application migration plan based on snapshots of the VM executing the application in the compute infrastructure.

In some examples, scanning snapshots of the VM includes identifying a last known safe or good point in time prior to a data encryption of the ransomware attack.

In some examples, scanning snapshots of the VM includes recognizing that a ransomware-infected VM is identified in the blueprint.

In some examples, virtual disk I/Os are intercepted in an I/O path thereby allowing the I/O to be replicated to a backup site at near real time with minimal user impacts, substantially eliminating the need to take snapshots periodically. RPO may be reduced down to seconds. In some examples, a log management system oversees and controls a log stream received at the backup site.

In an example, a system is provided for continuous data protection for a virtual machine (VM) having a virtual disk. The system may comprise at least one processor for executing machine-readable instructions; and a memory storing instructions configured to cause the at least one processor to perform operations comprising, at least: obtaining a base snapshot of the virtual disk; intercepting, at an interception point in an I/O path, a virtual disk I/O stream between the VM and a virtualization server; replicating the I/O stream at a backup site; storing the replicated I/O stream at the backup site in I/O logs; forming a recoverable snapshot-log chain by applying the replicated I/O stream stored in the I/O logs on top of the base snapshot; receiving a request for recoverable data from a replication target; and sending data to the replication target based at least on a portion of the recoverable snapshot-log chain.

In another example, a system is provided for optimizing a recovery point objective (RPO) in a virtual machine (VM) having a virtual disk. The system may comprise at least one processor for executing machine-readable instructions; and a memory storing instructions configured to cause the at least one processor to perform operations comprising, at least: tapping off I/O data at a virtualization server by a filter framework; collecting the I/O data at a filter stack, and providing a filter touchpoint selection at the filter framework to parse the tapped off I/O data and configure its collection; sending a parsed section of the collected I/O data to a log receiver for storage as a log-chain in an I/O log; receiving a request for recoverable data from a replication target; and causing or facilitating a transmission of requested data to the replication target based at least on a portion of the stored log chain.

In another example, a system is provided for continuous data protection for a virtual machine (VM) having a virtual disk. The system may comprise at least one processor for executing machine-readable instructions; and a memory storing instructions configured to cause the at least one processor to perform operations comprising, at least: obtaining a base snapshot of the virtual disk; intercepting, at an interception point in an I/O path, a virtual disk I/O stream between the VM and a virtualization server; replicating the I/O stream at a log receiver, and storing the replicated I/O stream at the log receiver in I/O logs; forming a recoverable snapshot-log chain by applying the replicated I/O stream stored in the I/O logs on top of the base snapshot; receiving, via a graphical user interface, a user request for recoverable data at a replication target, the request based on a recovery protocol including a recovery point objective (RPO) of less than 60 seconds; and meeting or exceeding the RPO by sending data less than 60 seconds old to the replication target based at least on a portion of the recoverable snapshot-log chain.

In another example, a system is provided for continuous data protection for a virtual machine (VM) having a virtual disk. The system may comprise at least one processor for executing machine-readable instructions, and a memory storing instructions configured to cause the at least one processor to perform operations comprising, at least: capturing a base snapshot of the virtual disk; receiving, at a backup site, I/O data from an intercepted I/O stream between the VM and a virtualization server; buffering the received I/O data into memory and flushing the I/O data to a log file; including a log file with the base snapshot in an I/O log to form a recoverable snapshot-log chain; determining a request for recoverable data from a replication target; and pushing the requested data to the replication target based at least on a portion of the recoverable snapshot-log chain.

In another example, a system is provided for optimizing a recovery point objective (RPO) for a virtual machine (VM) having a virtual disk. The system may comprise at least one processor for executing machine-readable instructions; and a memory storing instructions configured to cause the at least one processor to perform operations comprising, at least: storing a base snapshot of the virtual disk; receiving, at a log receiver, I/O data from an intercepted I/O stream between the VM and a virtualization server; storing, at the log receiver, the I/O data as a plurality of log chains in one or more log files; associating a log chain in the plurality of log chains with the base snapshot to form a recoverable snapshot-log chain; receiving a request for recoverable data from a replication target; and transmitting the requested data to the replication target including at least on a portion of the recoverable snapshot-log chain.

In another example, a system is provided for optimizing a recovery point objective (RPO) for a virtual machine (VM) having a virtual disk. The system may comprise at least one processor for executing machine-readable instructions; and a memory storing instructions configured to cause the at least one processor to perform operations comprising, at least: storing a base snapshot of the virtual disk; receiving, at a log receiver, I/O data from an intercepted I/O stream source between the VM and a virtualization server; storing the I/O data at the log receiver in one or more log files, the i/O data including a plurality of log chains; associating a log chain in the plurality of log chains with the base snapshot to form a recoverable snapshot-log chain; receiving a request for recoverable data from a replication target; and transmitting the requested data including at least on a portion of the recoverable snapshot-log chain to a disk seeking replication at the replication target.

In another example, a system is provided for continuous data protection for a virtual machine (VM) having a virtual disk, the system comprising: at least one processor for executing machine-readable instructions; and a memory storing instructions configured to cause the at least one processor to perform operations comprising, at least: determining an existence or availability of a base snapshot of the virtual disk; intercepting, at an interception point in an I/O path, a virtual disk I/O stream between the VM and a virtualization server; replicating the I/O stream at a backup site; storing the replicated I/O stream at the backup site in I/O logs; based on the existence or availability of the base snapshot, forming a recoverable snapshot-log chain by applying the replicated I/O stream stored in the I/O logs on top of the base snapshot; receiving a request for recoverable data from a replication target; and sending data to the replication target based at least on a portion of the recoverable snapshot-log chain.

In another example, a system is provided for continuous data protection for a virtual machine (VM) having a virtual disk, the system comprising: at least one processor for executing machine-readable instructions; and a memory storing instructions configured to cause the at least one processor to perform operations comprising, at least: determining an existence or availability of a base snapshot of the virtual disk; intercepting, at an interception point in an I/O path, a virtual disk I/O stream between the VM and a virtualization server; replicating the I/O stream at a backup site; storing the replicated I/O stream at the backup site in I/O logs; based on the existence or availability of the base snapshot, forming a recoverable snapshot-log chain by applying the replicated I/O stream stored in the I/O logs on top of the base snapshot; receiving a request for recoverable data from a replication target; and sending data to the replication target based at least on a portion of the recoverable snapshot-log chain.

In another example, a system is provided for continuous data protection, the system comprising: at least one processor for executing machine-readable instructions; and a memory storing instructions configured to cause the at least one processor to perform operations comprising, at least; obtaining or identifying recoverable ranges of a VM; and recovering the VM from a most recent continuous point-in-time version of the virtual disk or a specific continuous point-in-time version of the virtual disk by implementing a set of algorithms, the set of algorithms to determine if a log chain in a series of log chains stored at a recovery site is valid for recovery of the VM, wherein a first algorithm of the set of algorithms includes determining a shortest log chain having a valid base snapshot, and a second algorithm in the set of algorithms includes determining a longest log chain having a valid base snapshot.

In another example, a system is provided for continuous data protection for a virtual machine (VM) having a virtual disk, the system comprising: at least one processor for executing machine-readable instructions; and a memory storing instructions configured to cause the at least one processor to perform operations comprising, at least: intercepting, at an interception point in an I/O path, a virtual disk I/O stream between the VM and a virtualization server; storing the I/O stream at a backup site; forming a recoverable snapshot-log chain by associating the stored I/O stream with a base snapshot; receiving a request for recoverable data from a replication target; and sending data to the replication target based at least on a portion of the recoverable snapshot-log chain.

BRIEF DESCRIPTION OF THE DRAWINGS

Some examples are illustrated by way of example and not limitation in the figures of the accompanying drawings:

FIG. 47 depicts a categorization of an anomaly and ransomware detection pipeline, according to an example.

FIG. 48 depicts example contents of a diff FMD file, according to an example.

FIG. 49 depicts example contents of an RST file, according to an example.

FIGS. 57A-57C are DMS tables that illustrate operation of the system of FIGS. 56-57, according to one example.

FIGS. 58A-58D are DMS tables that illustrate updating of snapshot images, according to one example.

FIGS. 59A-59C are DMS tables that illustrate operation of the system of FIGS. 55-56 to manage and store data for an application, according to one example.

DETAILED DESCRIPTION

Figure 1:
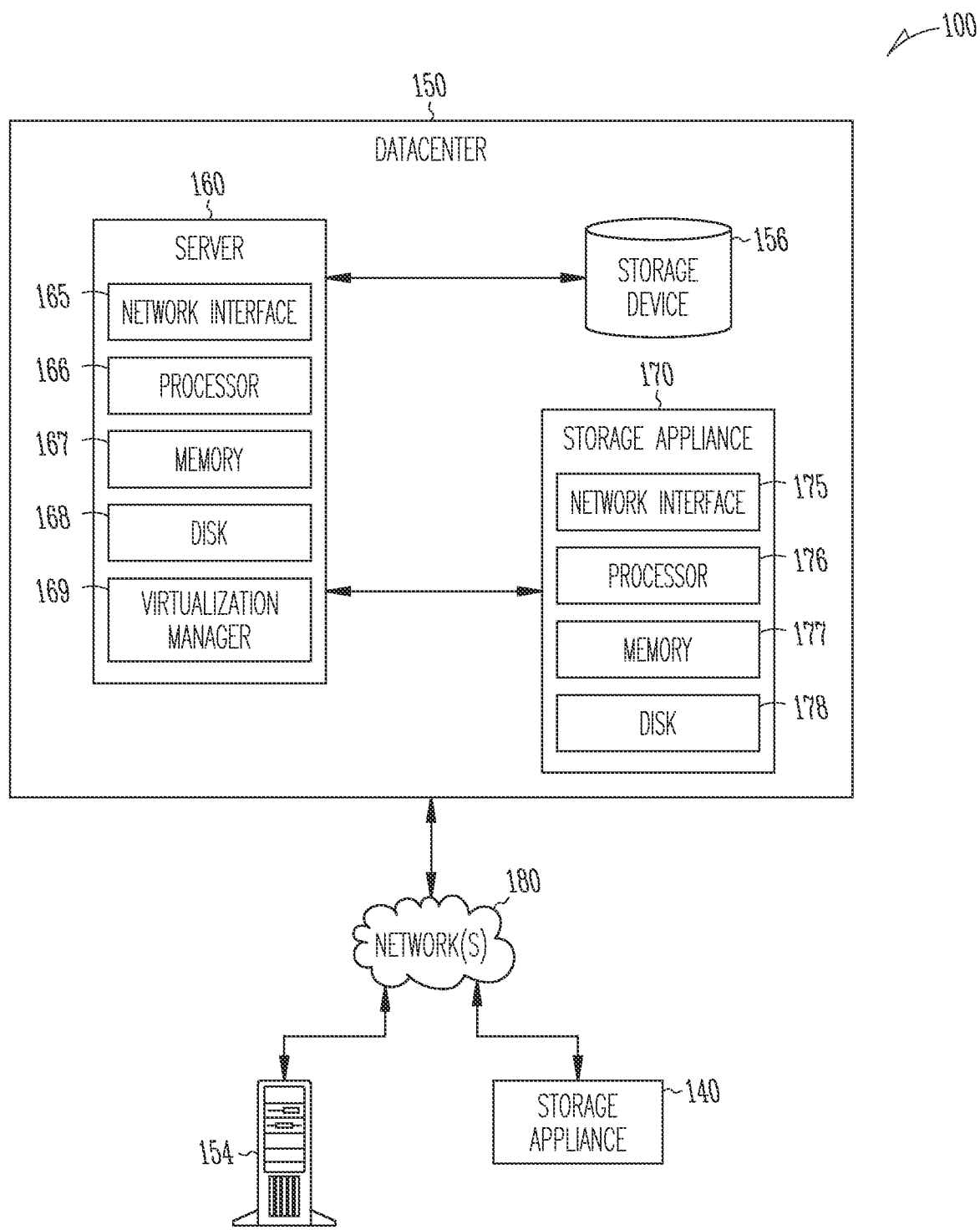
FIG. 1 depicts one example of a networked computing environment with which the disclosed technology may be practiced, according to an example.

The description that follows includes systems, methods, techniques, instruction sequences, and computing machine program products that embody illustrative examples of the present disclosure. In the following description, for purposes of explanation, numerous specific details are set forth in order to provide a thorough understanding of the examples. It will be evident, however, to one skilled in the art that the present inventive subject matter may be practiced without these specific details.

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright Rubrik, Inc., 2018-2021, All Rights Reserved.

FIG. 1 depicts one example of a networked computing environment 100 in which the disclosed technology may be practiced. As depicted, the networked computing environment 100 includes a data center 150, a storage appliance 140, and a computing device 154 in communication with each other via one or more networks 180. The networked computing environment 100 may include a plurality of computing devices interconnected through one or more networks 180. The one or more networks 180 may allow computing devices and/or storage devices to connect to and communicate with other computing devices and/or other storage devices. In some cases, the networked computing environment 100 may include other computing devices and/or other storage devices not shown. The other computing devices may include, for example, a mobile computing device, a non-mobile computing device, a server, a workstation, a laptop computer, a tablet computer, a desktop computer, or an information processing system. The other storage devices may include, for example, a storage area network storage device, a networked-attached storage device, a hard disk drive, a solid-state drive, or a data storage system.

The data center 150 may include one or more servers, such as server 160, in communication with one or more storage devices, such as storage device 156. The one or more servers may also be in communication with one or more storage appliances, such as storage appliance 170. The server 160, storage device 156, and storage appliance 170 may be in communication with each other via a networking fabric connecting servers and data storage units within the data center 150 to each other. The storage appliance 170 may include a data management system for backing up virtual machines and/or files within a virtualized infrastructure. The server 160 may be used to create and manage one or more virtual machines associated with a virtualized infrastructure.

The one or more virtual machines may run various applications, such as a database application or a web server. The storage device 156 may include one or more hardware storage devices for storing data, such as a hard disk drive (HDD), a magnetic tape drive, a solid-state drive (SSD), a storage area network (SAN) storage device, or a Network-Attached Storage (NAS) device. In some cases, a data center, such as data center 150, may include thousands of servers and/or data storage devices in communication with each other. The data storage devices may comprise a tiered data storage infrastructure (or a portion of a tiered data storage infrastructure). The tiered data storage infrastructure may allow for the movement of data across different tiers of a data storage infrastructure between higher-cost, higher-performance storage devices (e.g., solid-state drives and hard disk drives) and relatively lower-cost, lower-performance storage devices (e.g., magnetic tape drives).

The one or more networks 180 may include a secure network such as an enterprise private network, an unsecured network such as a wireless open network, a local area network (LAN), a wide area network (WAN), and the Internet. The one or more networks 180 may include a cellular network, a mobile network, a wireless network, or a wired network. Each network of the one or more networks 180 may include hubs, bridges, routers, switches, and wired transmission media such as a direct-wired connection. The one or more networks 180 may include an extranet or other private network for securely sharing information or providing controlled access to applications or files.

A server, such as server 160, may allow a client to download information or files (e.g., executable, text, application, audio, image, or video files) from the server 160 or to perform a search query related to particular information stored on the server 160. In some cases, a server may act as an application server or a file server. In general, a server may refer to a hardware device that acts as the host in a client-server relationship or a software process that shares a resource with or performs work for one or more clients.

One example of server 160 includes a network interface 165, a processor 166, a memory 167, a disk 168, and a virtualization manager 169 all in communication with each other. Network interface 165 allows the server 160 to connect to one or more networks 180. Network interface 165 may include a wireless network interface and/or a wired network interface. Processor 166 allows server 160 to execute computer-readable instructions stored in memory 167 in order to perform processes described herein. Processor 166 may include one or more processing units, such as one or more CPUs and/or one or more GPUs. Memory 167 may comprise one or more types of memory (e.g., RAM, SRAM, DRAM, ROM, EEPROM, Flash, etc.). Disk 168 may include a hard disk drive and/or a solid-state drive. Memory 167 and disk 168 may comprise hardware storage devices.

The virtualization manager 169 may manage a virtualized infrastructure and perform management operations associated with the virtualized infrastructure. The virtualization manager 169 may manage the provisioning of virtual machines running within the virtualized infrastructure and provide an interface to computing devices interacting with the virtualized infrastructure. In one example, the virtualization manager 169 may set a virtual machine into a frozen state in response to a snapshot request made via an application programming interface (API) by a storage appliance, such as storage appliance 170. Setting the virtual machine into a frozen state may allow a point in time snapshot of the virtual machine to be stored or transferred. In one example, updates made to a virtual machine that has been set into a frozen state may be written to a separate file (e.g., an update file) while the virtual disk file may be set into a read-only state to prevent modifications to the virtual disk file while the virtual machine is in the frozen state.

The virtualization manager 169 may then transfer data associated with the virtual machine (e.g., an image of the virtual machine or a portion of the image of the virtual disk file associated with the state of the virtual disk at the point in time it is frozen) to a storage appliance in response to a request made by the storage appliance 170. After the data associated with the point in time snapshot of the virtual machine has been transferred to the storage appliance, the virtual machine may be released from the frozen state (i.e., unfrozen) and the updates made to the virtual machine and stored in the separate file may be merged into the virtual disk file. The virtualization manager 169 may perform various virtual machine-related tasks, such as cloning virtual machines, creating new virtual machines, monitoring the state of virtual machines, moving virtual machines between physical hosts for load balancing purposes, and facilitating backups of virtual machines.

One examples of storage appliance 170 includes a network interface 175, processor 176, memory 177, and disk 178 all in communication with each other. Network interface 175 allows storage appliance 170 to connect to one or more networks 180. Network interface 175 may include a wireless network interface and/or a wired network interface. Processor 176 allows storage appliance 170 to execute computer-readable instructions stored in memory 177 in order to perform processes described herein. Processor 176 may include one or more processing units, such as one or more CPUs and/or one or more GPUs. Memory 177 may comprise one or more types of memory (e.g., RAM, SRAM, DRAM, ROM, EEPROM, NOR Flash, NAND Flash, etc.). Disk 178 may include a hard disk drive and/or a solid-state drive. Memory 177 and disk 178 may comprise hardware storage devices.

In one examples, the storage appliance 170 may include four machines. Each of the four machines may include a multi-core CPU, 64 GB of RAM, a 400 GB SSD, three 4 TB HDDs, and a network interface controller. In this case, the four machines may be in communication with the one or more networks 180 via the four network interface controllers. The four machines may comprise four nodes of a server cluster. The server cluster may comprise a set of physical machines that are connected together via a network. The server cluster may be used for storing data associated with a plurality of virtual machines, such as backup data associated with different point-in-time versions of virtual machines.

The networked computing environment 100 may provide a cloud computing environment for one or more computing devices. Cloud computing may refer to Internet-based computing, wherein shared resources, software, and/or information may be provided to one or more computing devices on-demand via the Internet. The networked computing environment 100 may comprise a cloud computing environment providing Software-as-a-Service (SaaS) or Infrastructure-as-a-Service (IaaS) services. SaaS may refer to a software distribution model in which applications are hosted by a service provider and made available to end users over the Internet. In one examples, the networked computing environment 100 may include a virtualized infrastructure that provides software, data processing, and/or data storage services to end users accessing the services via the networked computing environment. In one example, networked computing environment 100 may provide cloud-based work productivity or business-related applications to a computing device, such as computing device 154. The storage appliance 140 may comprise a cloud-based data management system for backing up virtual machines and/or files within a virtualized infrastructure, such as virtual machines running on server 160 or files stored on server 160.

In some cases, networked computing environment 100 may provide remote access to secure applications and files stored within data center 150 from a remote computing device, such as computing device 154. The data center 150 may use an access control application to manage remote access to protected resources, such as protected applications, databases, or files located within the data center 150. To facilitate remote access to secure applications and files, a secure network connection may be established using a virtual private network (VPN). A VPN connection may allow a remote computing device, such as computing device 154, to securely access data from a private network (e.g., from a company file server or mail server) using an unsecure public network or the Internet. The VPN connection may require client-side software (e.g., running on the remote computing device) to establish and maintain the VPN connection. The VPN client software may provide data encryption and encapsulation prior to the transmission of secure private network traffic through the Internet.

In some examples, the storage appliance 170 may manage the extraction and storage of virtual machine snapshots associated with different point-in-time versions of one or more virtual machines running within the data center 150. A snapshot of a virtual machine may correspond with a state of the virtual machine at a particular point in time. In response to a restore command from the server 160, the storage appliance 170 may restore a point-in-time version of a virtual machine or restore point-in-time versions of one or more files located on the virtual machine and transmit the restored data to the server 160. In response to a mount command from the server 160, the storage appliance 170 may allow a point-in-time version of a virtual machine to be mounted and allow the server 160 to read and/or modify data associated with the point-in-time version of the virtual machine. To improve storage density, the storage appliance 170 may deduplicate and compress data associated with different versions of a virtual machine and/or deduplicate and compress data associated with different virtual machines. To improve system performance, the storage appliance 170 may first store virtual machine snapshots received from a virtualized environment in a cache, such as a flash-based cache. The cache may also store popular data or frequently accessed data (e.g., based on a history of virtual machine restorations, incremental files associated with commonly restored virtual machine versions) and current day incremental files or incremental files corresponding with snapshots captured within the past 24 hours.

An incremental file may comprise a forward incremental file or a reverse incremental file. A forward incremental file may include a set of data representing changes that have occurred since an earlier point-in-time snapshot of a virtual machine. To generate a snapshot of the virtual machine corresponding with a forward incremental file, the forward incremental file may be combined with an earlier point-in-time snapshot of the virtual machine (e.g., the forward incremental file may be combined with the last full image of the virtual machine that was captured before the forward incremental file was captured and any other forward incremental files that were captured subsequent to the last full image and prior to the forward incremental file). A reverse incremental file may include a set of data representing changes from a later point-in-time snapshot of a virtual machine. To generate a snapshot of the virtual machine corresponding with a reverse incremental file, the reverse incremental file may be combined with a later point-in-time snapshot of the virtual machine (e.g., the reverse incremental file may be combined with the most recent snapshot of the virtual machine and any other reverse incremental files that were captured prior to the most recent snapshot and subsequent to the reverse incremental file).

The storage appliance 170 may provide a user interface (e.g., a web-based interface or a graphical user interface) that displays virtual machine backup information such as identifications of the virtual machines protected and the historical versions or time machine views for each of the virtual machines protected. A time machine view of a virtual machine may include snapshots of the virtual machine over a plurality of points in time. Each snapshot may comprise the state of the virtual machine at a particular point in time. Each snapshot may correspond with a different version of the virtual machine (e.g., Version 1 of a virtual machine may correspond with the state of the virtual machine at a first point in time and Version 2 of the virtual machine may correspond with the state of the virtual machine at a second point in time subsequent to the first point in time).

The user interface may enable an end user of the storage appliance 170 (e.g., a system administrator or a virtualization administrator) to select a particular version of a virtual machine to be restored or mounted. When a particular version of a virtual machine has been mounted, the particular version may be accessed by a client (e.g., a virtual machine, a physical machine, or a computing device) as if the particular version was local to the client. A mounted version of a virtual machine may correspond with a mount point directory (e.g., /snapshots/VM5Nersion23). In one example, the storage appliance 170 may run an NFS server and make the particular version (or a copy of the particular version) of the virtual machine accessible for reading and/or writing. The end user of the storage appliance 170 may then select the particular version to be mounted and run an application (e.g., a data analytics application) using the mounted version of the virtual machine. In another example, the particular version may be mounted as an iSCSI target.

Figure 2:
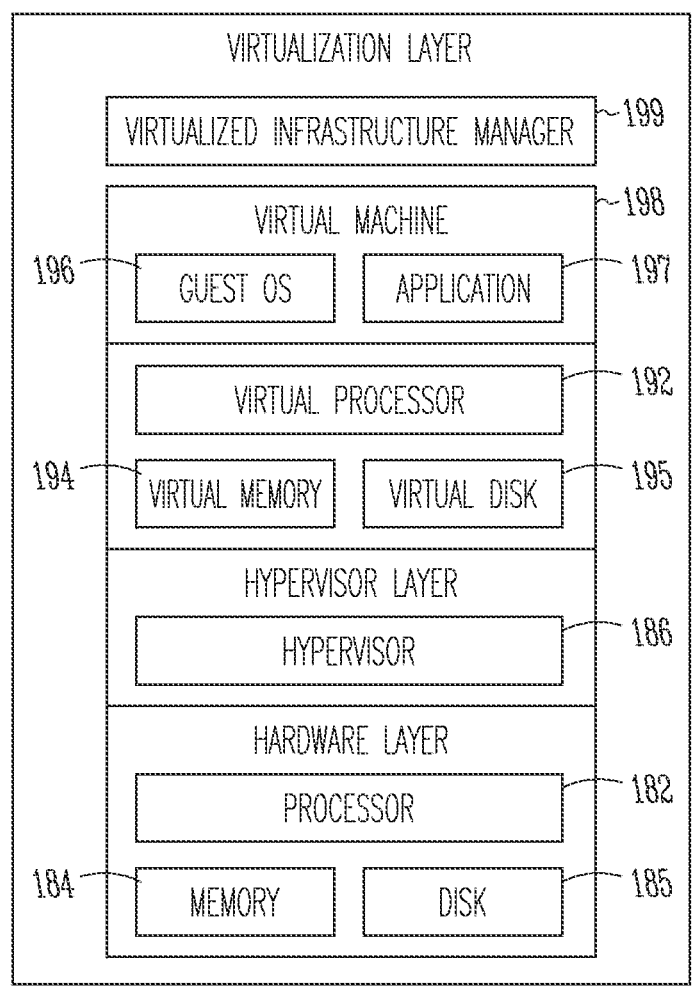
FIG. 2 depicts one example of the server in FIG. 1, according to an example.

FIG. 2 depicts one example of server 160 in FIG. 1. The server 160 may comprise one server out of a plurality of servers that are networked together within a data center. In one example, the plurality of servers may be positioned within one or more server racks within the data center. As depicted, the server 160 includes hardware-level components and software-level components. The hardware-level components include one or more processors 182, one or more memory 184, and one or more disks 185. The software-level components include a hypervisor 186, a virtualized infrastructure manager 199, and one or more virtual machines, such as virtual machine 198. The hypervisor 186 may comprise a native hypervisor or a hosted hypervisor. The hypervisor 186 may provide a virtual operating platform for running one or more virtual machines, such as virtual machine 198. Virtual machine 198 includes a plurality of virtual hardware devices including a virtual processor 192, a virtual memory 194, and a virtual disk 195. The virtual disk 195 may comprise a file stored within the one or more disks 185. In one example, a virtual machine may include a plurality of virtual disks, with each virtual disk of the plurality of virtual disks associated with a different file stored on the one or more disks 185. Virtual machine 198 may include a guest operating system 196 that runs one or more applications, such as application 197.

The virtualized infrastructure manager 199, which may correspond with the virtualization manager 169 in FIG. 1, may run on a virtual machine or natively on the server 160. The virtualized infrastructure manager 199 may provide a centralized platform for managing a virtualized infrastructure that includes a plurality of virtual machines. The virtualized infrastructure manager 199 may manage the provisioning of virtual machines running within the virtualized infrastructure and provide an interface to computing devices interacting with the virtualized infrastructure. The virtualized infrastructure manager 199 may perform various virtualized infrastructure related tasks, such as cloning virtual machines, creating new virtual machines, monitoring the state of virtual machines, and facilitating backups of virtual machines.

In one example, the server 160 may use the virtualized infrastructure manager 199 to facilitate backups for a plurality of virtual machines (e.g., eight different virtual machines) running on the server 160. Each virtual machine running on the server 160 may run its own guest operating system and its own set of applications. Each virtual machine running on the server 160 may store its own set of files using one or more virtual disks associated with the virtual machine (e.g., each virtual machine may include two virtual disks that are used for storing data associated with the virtual machine).

In one example, a data management application running on a storage appliance, such as storage appliance 140 in FIG. 1 or storage appliance 170 in FIG. 1, may request a snapshot of a virtual machine running on server 160. The snapshot of the virtual machine may be stored as one or more files, with each file associated with a virtual disk of the virtual machine. A snapshot of a virtual machine may correspond with a state of the virtual machine at a particular point in time. The particular point in time may be associated with a time stamp. In one example, a first snapshot of a virtual machine may correspond with a first state of the virtual machine (including the state of applications and files stored on the virtual machine) at a first point in time and a second snapshot of the virtual machine may correspond with a second state of the virtual machine at a second point in time subsequent to the first point in time.

In response to a request for a snapshot of a virtual machine at a particular point in time, the virtualized infrastructure manager 199 may set the virtual machine into a frozen state or store a copy of the virtual machine at the particular point in time. The virtualized infrastructure manager 199 may then transfer data associated with the virtual machine (e.g., an image of the virtual machine or a portion of the image of the virtual machine) to the storage appliance. The data associated with the virtual machine may include a set of files including a virtual disk file storing contents of a virtual disk of the virtual machine at the particular point in time and a virtual machine configuration file storing configuration settings for the virtual machine at the particular point in time. The contents of the virtual disk file may include the operating system used by the virtual machine, local applications stored on the virtual disk, and user files (e.g., images and word processing documents). In some cases, the virtualized infrastructure manager 199 may transfer a full image of the virtual machine to the storage appliance or a plurality of data blocks corresponding with the full image (e.g., to enable a full image-level backup of the virtual machine to be stored on the storage appliance). In other cases, the virtualized infrastructure manager 199 may transfer a portion of an image of the virtual machine associated with data that has changed since an earlier point in time prior to the particular point in time or since a last snapshot of the virtual machine was taken. In one example, the virtualized infrastructure manager 199 may transfer only data associated with virtual blocks stored on a virtual disk of the virtual machine that have changed since the last snapshot of the virtual machine was taken. In one example, the data management application may specify a first point in time and a second point in time and the virtualized infrastructure manager 199 may output one or more virtual data blocks associated with the virtual machine that have been modified between the first point in time and the second point in time.

In some examples, the server 160 may or the hypervisor 186 may communicate with a storage appliance, such as storage appliance 140 in FIG. 1 or storage appliance 170 in FIG. 1, using a distributed file system protocol such as Network File System (NFS) Version 3, or Server Message Block (SMB) protocol. The distributed file system protocol may allow the server 160 or the hypervisor 186 to access, read, write, or modify files stored on the storage appliance as if the files were locally stored on the server. The distributed file system protocol may allow the server 160 or the hypervisor 186 to mount a directory or a portion of a file system located within the storage appliance.

Figure 3:
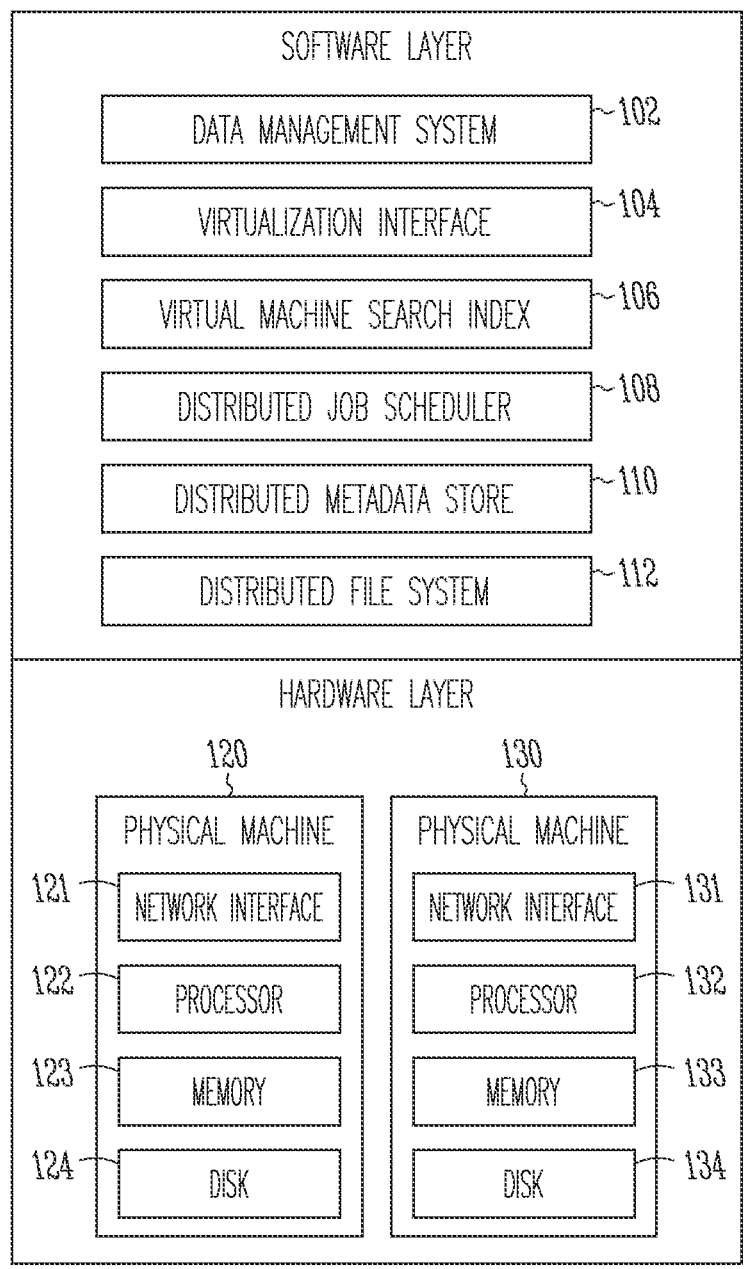
FIG. 3 depicts one example of the storage appliance in FIG. 1, according to an example.

FIG. 3 depicts one example of storage appliance 170 in FIG. 1. The storage appliance may include a plurality of physical machines that may be grouped together and presented as a single computing system. Each physical machine of the plurality of physical machines may comprise a node in a cluster (e.g., a failover cluster). In one example, the storage appliance may be positioned within a server rack within a data center. As depicted, the storage appliance 170 includes hardware-level components and software-level components. The hardware-level components include one or more physical machines, such as physical machine 120 and physical machine 130. The physical machine 120 includes a network interface 121, processor 122, memory 123, and disk 124 all in communication with each other. Processor 122 allows physical machine 120 to execute computer-readable instructions stored in memory 123 to perform processes described herein. Disk 124 may include a hard disk drive and/or a solid-state drive. The physical machine 130 includes a network interface 131, processor 132, memory 133, and disk 134 all in communication with each other. Processor 132 allows physical machine 130 to execute computer-readable instructions stored in memory 133 to perform processes described herein. Disk 134 may include a hard disk drive and/or a solid-state drive. In some cases, disk 134 may include a flash-based SSD or a hybrid HDD/SSD drive. In one example, the storage appliance 170 may include a plurality of physical machines arranged in a cluster (e.g., eight machines in a cluster). Each of the plurality of physical machines may include a plurality of multi-core CPUs, 128 GB of RAM, a 500 GB SSD, four 4 TB HDDs, and a network interface controller.

In some examples, the plurality of physical machines may be used to implement a cluster-based network fileserver. The cluster-based network file server may neither require nor use a front-end load balancer. One issue with using a front-end load balancer to host the IP address for the cluster-based network file server and to forward requests to the nodes of the cluster-based network file server is that the front-end load balancer comprises a single point of failure for the cluster-based network file server. In some cases, the file system protocol used by a server, such as server 160 in FIG. 1, or a hypervisor, such as hypervisor 186 in FIG. 2, to communicate with the storage appliance 170 may not provide a failover mechanism (e.g., NFS Version 3). In the case that no failover mechanism is provided on the client side, the hypervisor may not be able to connect to a new node within a cluster in the event that the node connected to the hypervisor fails.

In some examples, each node in a cluster may be connected to each other via a network and may be associated with one or more IP addresses (e.g., two different IP addresses may be assigned to each node). In one example, each node in the cluster may be assigned a permanent IP address and a floating IP address and may be accessed using either the permanent IP address or the floating IP address. In this case, a hypervisor, such as hypervisor 186 in FIG. 2 may be configured with a first floating IP address associated with a first node in the cluster. The hypervisor may connect to the cluster using the first floating IP address. In one example, the hypervisor may communicate with the cluster using the NFS Version 3 protocol. Each node in the cluster may run a Virtual Router Redundancy Protocol (VRRP) daemon. A daemon may comprise a background process. Each VRRP daemon may include a list of all floating IP addresses available within the cluster. In the event that the first node associated with the first floating IP address fails, one of the VRRP daemons may automatically assume or pick up the first floating IP address if no other VRRP daemon has already assumed the first floating IP address. Therefore, if the first node in the cluster fails or otherwise goes down, then one of the remaining VRRP daemons running on the other nodes in the cluster may assume the first floating IP address that is used by the hypervisor for communicating with the cluster.

In order to determine which of the other nodes in the cluster will assume the first floating IP address, a VRRP priority may be established. In one example, given a number (N) of nodes in a cluster from node(0) to node(N−1), for a floating IP address (i), the VRRP priority of nodeG) may be G−i) modulo N. In another example, given a number (N) of nodes in a cluster from node(0) to node(N−1), for a floating IP address (i), the VRRP priority of nodeG) may be (i−j) modulo N. In these cases, nodeG) will assume floating IP address (i) only if its VRRP priority is higher than that of any other node in the cluster that is alive and announcing itself on the network. Thus, if a node fails, then there may be a clear priority ordering for determining which other node in the cluster will take over the failed node's floating IP address.

In some cases, a cluster may include a plurality of nodes and each node of the plurality of nodes may be assigned a different floating IP address. In this case, a first hypervisor may be configured with a first floating IP address associated with a first node in the cluster, a second hypervisor may be configured with a second floating IP address associated with a second node in the cluster, and a third hypervisor may be configured with a third floating IP address associated with a third node in the cluster.

As depicted in FIG. 3, the software-level components of the storage appliance 170 may include data management system 102, a virtualization interface 104, a distributed job scheduler 108, a distributed metadata store 110, a distributed file system 112, and one or more virtual machine search indexes, such as virtual machine search index 106. In one examples, the software-level components of the storage appliance 170 may be run using a dedicated hardware-based appliance. In another examples, the software-level components of the storage appliance 170 may be run from the cloud (e.g., the software-level components may be installed on a cloud service provider).

In some cases, the data storage across a plurality of nodes in a cluster (e.g., the data storage available from the one or more physical machines) may be aggregated and made available over a single file system namespace (e.g., /snapshots/). A directory for each virtual machine protected using the storage appliance 170 may be created (e.g., the directory for Virtual Machine A may be /snapshots/VM_A). Snapshots and other data associated with a virtual machine may reside within the directory for the virtual machine. In one example, snapshots of a virtual machine may be stored in subdirectories of the directory (e.g., a first snapshot of Virtual Machine A may reside in/snapshots/VM_A/s1/ and a second snapshot of Virtual Machine A may reside in/snapshots/VM_A/s2/).

The distributed file system 112 may present itself as a single file system, in which as new physical machines or nodes are added to the storage appliance 170, the cluster may automatically discover the additional nodes and automatically increase the available capacity of the file system for storing files and other data. Each file stored in the distributed file system 112 may be partitioned into one or more chunks or shards. Each of the one or more chunks may be stored within the distributed file system 112 as a separate file. The files stored within the distributed file system 112 may be replicated or mirrored over a plurality of physical machines, thereby creating a load-balanced and fault tolerant distributed file system. In one example, storage appliance 170 may include ten physical machines arranged as a failover cluster and a first file corresponding with a snapshot of a virtual machine (e.g., /snapshots/VM_A/sl/sl.full) may be replicated and stored on three of the ten machines.

The distributed metadata store 110 may include a distributed database management system that provides high availability without a single point of failure. In one example, the distributed metadata store 110 may comprise a database, such as a distributed document-oriented database. The distributed metadata store 110 may be used as a distributed key value storage system. In one example, the distributed metadata store 110 may comprise a distributed NoSQL key value store database. In some cases, the distributed metadata store 110 may include a partitioned row store, in which rows are organized into tables or other collections of related data held within a structured format within the key value store database. A table (or a set of tables) may be used to store metadata information associated with one or more files stored within the distributed file system 112. The metadata information may include the name of a file, a size of the file, file permissions associated with the file, when the file was last modified, and file mapping information associated with an identification of the location of the file stored within a cluster of physical machines. In one example, a new file corresponding with a snapshot of a virtual machine may be stored within the distributed file system 112 and metadata associated with the new file may be stored within the distributed metadata store 110. The distributed metadata store 110 may also be used to store a backup schedule for the virtual machine and a list of snapshots for the virtual machine that are stored using the storage appliance 170.

In some cases, the distributed metadata store 110 may be used to manage one or more versions of a virtual machine. Each version of the virtual machine may correspond with a full image snapshot of the virtual machine stored within the distributed file system 112 or an incremental snapshot of the virtual machine (e.g., a forward incremental or reverse incremental) stored within the distributed file system 112. In one example, the one or more versions of the virtual machine may correspond with a plurality of files. The plurality of files may include a single full image snapshot of the virtual machine and one or more incremental aspects derived from the single full image snapshot. The single full image snapshot of the virtual machine may be stored using a first storage device of a first type (e.g., an HDD) and the one or more incremental aspects derived from the single full image snapshot may be stored using a second storage device of a second type (e.g., an SSD). In this case, only a single full image needs to be stored and each version of the virtual machine may be generated from the single full image or the single full image combined with a subset of the one or more incremental aspects. Furthermore, each version of the virtual machine may be generated by performing a sequential read from the first storage device (e.g., reading a single file from an HDD) to acquire the full image and, in parallel, performing one or more reads from the second storage device (e.g., performing fast random reads from an SSD) to acquire the one or more incremental aspects.

The distributed job scheduler 108 may be used for scheduling backup jobs that acquire and store virtual machine snapshots for one or more virtual machines over time. The distributed job scheduler 108 may follow a backup schedule to back up an entire image of a virtual machine at a particular point in time or one or more virtual disks associated with the virtual machine at the particular point in time. In one example, the backup schedule may specify that the virtual machine be backed up at a snapshot capture frequency, such as every two hours or every 24 hours. Each backup job may be associated with one or more tasks to be performed in a sequence. Each of the one or more tasks associated with a job may be run on a particular node within a cluster. In some cases, the distributed job scheduler 108 may schedule a specific job to be run on a particular node based on data stored on the particular node. For example, the distributed job scheduler 108 may schedule a virtual machine snapshot job to be run on a node in a cluster that is used to store snapshots of the virtual machine in order to reduce network congestion.

The distributed job scheduler 108 may comprise a distributed fault tolerant job scheduler, in which jobs affected by node failures are recovered and rescheduled to be run on available nodes. In one examples, the distributed job scheduler 108 may be fully decentralized and implemented without the existence of a master node. The distributed job scheduler 108 may run job scheduling processes on each node in a cluster or on a plurality of nodes in the cluster. In one example, the distributed job scheduler 108 may run a first set of job scheduling processes on a first node in the cluster, a second set of job scheduling processes on a second node in the cluster, and a third set of job scheduling processes on a third node in the cluster. The first set of job scheduling processes, the second set of job scheduling processes, and the third set of job scheduling processes may store information regarding jobs, schedules, and the states of jobs using a metadata store, such as distributed metadata store 110. In the event that the first node running the first set of job scheduling processes fails (e.g., due to a network failure or a physical machine failure), the states of the jobs managed by the first set of job scheduling processes may fail to be updated within a threshold period of time (e.g., a job may fail to be completed within 30 seconds or within minutes from being started). In response to detecting jobs that have failed to be updated within the threshold period of time, the distributed job scheduler 108 may undo and restart the failed jobs on available nodes within the cluster.

The job scheduling processes running on at least a plurality of nodes in a cluster (e.g., on each available node in the cluster) may manage the scheduling and execution of a plurality of jobs. The job scheduling processes may include run processes for running jobs, cleanup processes for cleaning up failed tasks, and rollback processes for rolling-back or undoing any actions or tasks performed by failed jobs. In one examples, the job scheduling processes may detect that a particular task for a particular job has failed and in response may perform a cleanup process to clean up or remove the effects of the particular task and then perform a rollback process that processes one or more completed tasks for the particular job in reverse order to undo the effects of the one or more completed tasks. Once the particular job with the failed task has been undone, the job scheduling processes may restart the particular job on an available node in the cluster.

The distributed job scheduler 108 may manage a job in which a series of tasks associated with the job are to be performed atomically (i.e., partial execution of the series of tasks is not permitted). If the series of tasks cannot be completely executed or there is any failure that occurs to one of the series of tasks during execution (e.g., a hard disk associated with a physical machine fails or a network connection to the physical machine fails), then the state of a data management system may be returned to a state as if none of the series of tasks were ever performed. The series of tasks may correspond with an ordering of tasks for the series of tasks and the distributed job scheduler 108 may ensure that each task of the series of tasks is executed based on the ordering of tasks. Tasks that do not have dependencies with each other may be executed in parallel.

In some cases, the distributed job scheduler 108 may schedule each task of a series of tasks to be performed on a specific node in a cluster. In other cases, the distributed job scheduler 108 may schedule a first task of the series of tasks to be performed on a first node in a cluster and a second task of the series of tasks to be performed on a second node in the cluster. In these cases, the first task may have to operate on a first set of data (e.g., a first file stored in a file system) stored on the first node and the second task may have to operate on a second set of data (e.g., metadata related to the first file that is stored in a database) stored on the second node. In some examples, one or more tasks associated with a job may have an affinity to a specific node in a cluster.

In one example, if the one or more tasks require access to a database that has been replicated on three nodes in a cluster, then the one or more tasks may be executed on one of the three nodes. In another example, if the one or more tasks require access to multiple chunks of data associated with a virtual disk that has been replicated over four nodes in a cluster, then the one or more tasks may be executed on one of the four nodes. Thus, the distributed job scheduler 108 may assign one or more tasks associated with a job to be executed on a particular node in a cluster based on the location of data required to be accessed by the one or more tasks.

In one example, the distributed job scheduler 108 may manage a first job associated with capturing and storing a snapshot of a virtual machine periodically (e.g., every 30 minutes). The first job may include one or more tasks, such as communicating with a virtualized infrastructure manager, such as the virtualized infrastructure manager 199 in FIG. 2, to create a frozen copy of the virtual machine and to transfer one or more chunks (or one or more files) associated with the frozen copy to a storage appliance, such as storage appliance 170 in FIG. 1. The one or more tasks may also include generating metadata for the one or more chunks, storing the metadata using the distributed metadata store 110, storing the one or more chunks within the distributed file system 112, and communicating with the virtualized infrastructure manager 199 that the frozen copy of the virtual machine may be unfrozen or released from a frozen state. The metadata for a first chunk of the one or more chunks may include information specifying a version of the virtual machine associated with the frozen copy, a time associated with the version (e.g., the snapshot of the virtual machine was taken at 5:30 p.m. on Jun. 29, 2018), and a file path to where the first chunk is stored within the distributed file system 112 (e.g., the first chunk is located at /snapshotsNM_B/s1/s1.chunk1). The one or more tasks may also include deduplication, compression (e.g., using a lossless data compression algorithm such as LZ4 or LZ77), decompression, encryption (e.g., using a symmetric key algorithm such as Triple DES or AES-256), and decryption related tasks.

The virtualization interface 104 may provide an interface for communicating with a virtualized infrastructure manager managing a virtualization infrastructure, such as virtualized infrastructure manager 199 in FIG. 2, and requesting data associated with virtual machine snapshots from the virtualization infrastructure. The virtualization interface 104 may communicate with the virtualized infrastructure manager using an API for accessing the virtualized infrastructure manager (e.g., to communicate a request for a snapshot of a virtual machine). In this case, storage appliance 170 may request and receive data from a virtualized infrastructure without requiring agent software to be installed or running on virtual machines within the virtualized infrastructure. The virtualization interface 104 may request data associated with virtual blocks stored on a virtual disk of the virtual machine that have changed since a last snapshot of the virtual machine was taken or since a specified prior point in time. Therefore, in some cases, if a snapshot of a virtual machine is the first snapshot taken of the virtual machine, then a full image of the virtual machine may be transferred to the storage appliance. However, if the snapshot of the virtual machine is not the first snapshot taken of the virtual machine, then only the data blocks of the virtual machine that have changed since a prior snapshot was taken may be transferred to the storage appliance.

The virtual machine search index 106 may include a list of files that have been stored using a virtual machine and a version history for each of the files in the list. Each version of a file may be mapped to the earliest point-in-time snapshot of the virtual machine that includes the version of the file or to a snapshot of the virtual machine that includes the version of the file (e.g., the latest point-in-time snapshot of the virtual machine that includes the version of the file). In one example, the virtual machine search index 106 may be used to identify a version of the virtual machine that includes a particular version of a file (e.g., a particular version of a database, a spreadsheet, or a word processing document). In some cases, each of the virtual machines that are backed up or protected using storage appliance 170 may have a corresponding virtual machine search index.

In one example, as each snapshot of a virtual machine is ingested, each virtual disk associated with the virtual machine is parsed in order to identify a file system type associated with the virtual disk and to extract metadata (e.g., file system metadata) for each file stored on the virtual disk. The metadata may include information for locating and retrieving each file from the virtual disk. The metadata may also include a name of a file, the size of the file, the last time at which the file was modified, and a content checksum for the file. Each file that has been added, deleted, or modified since a previous snapshot was captured may be determined using the metadata (e.g., by comparing the time at which a file was last modified with a time associated with the previous snapshot). Thus, for every file that has existed within any of the snapshots of the virtual machine, a virtual machine search index may be used to identify when the file was first created (e.g., corresponding with a first version of the file) and at what times the file was modified (e.g., corresponding with subsequent versions of the file). Each version of the file may be mapped to a particular version of the virtual machine that stores that version of the file.

In some cases, if a virtual machine includes a plurality of virtual disks, then a virtual machine search index may be generated for each virtual disk of the plurality of virtual disks. For example, a first virtual machine search index may catalog and map files located on a first virtual disk of the plurality of virtual disks and a second virtual machine search index may catalog and map files located on a second virtual disk of the plurality of virtual disks. In this case, a global file catalog or a global virtual machine search index for the virtual machine may include the first virtual machine search index and the second virtual machine search index. A global file catalog may be stored for each virtual machine backed up by a storage appliance within a file system, such as distributed file system 112 in FIG. 3.

The data management system 102 may comprise an application running on the storage appliance that manages and stores one or more snapshots of a virtual machine. In one example, the data management system 102 may comprise a highest-level layer in an integrated software stack running on the storage appliance. The integrated software stack may include the data management system 102, the virtualization interface 104, the distributed job scheduler 108, the distributed metadata store 110, and the distributed file system 112.

In some cases, the integrated software stack may run on other computing devices, such as a server or computing device 154 in FIG. 1. The data management system 102 may use the virtualization interface 104, the distributed job scheduler 108, the distributed metadata store 110, and the distributed file system 112 to manage and store one or more snapshots of a virtual machine. Each snapshot of the virtual machine may correspond with a point-in-time version of the virtual machine. The data management system 102 may generate and manage a list of versions for the virtual machine. Each version of the virtual machine may map to or reference one or more chunks and/or one or more files stored within the distributed file system 112. Combined together, the one or more chunks and/or the one or more files stored within the distributed file system 112 may comprise a full image of the version of the virtual machine.

Continuous Data Management (CDM)

Figure 4:
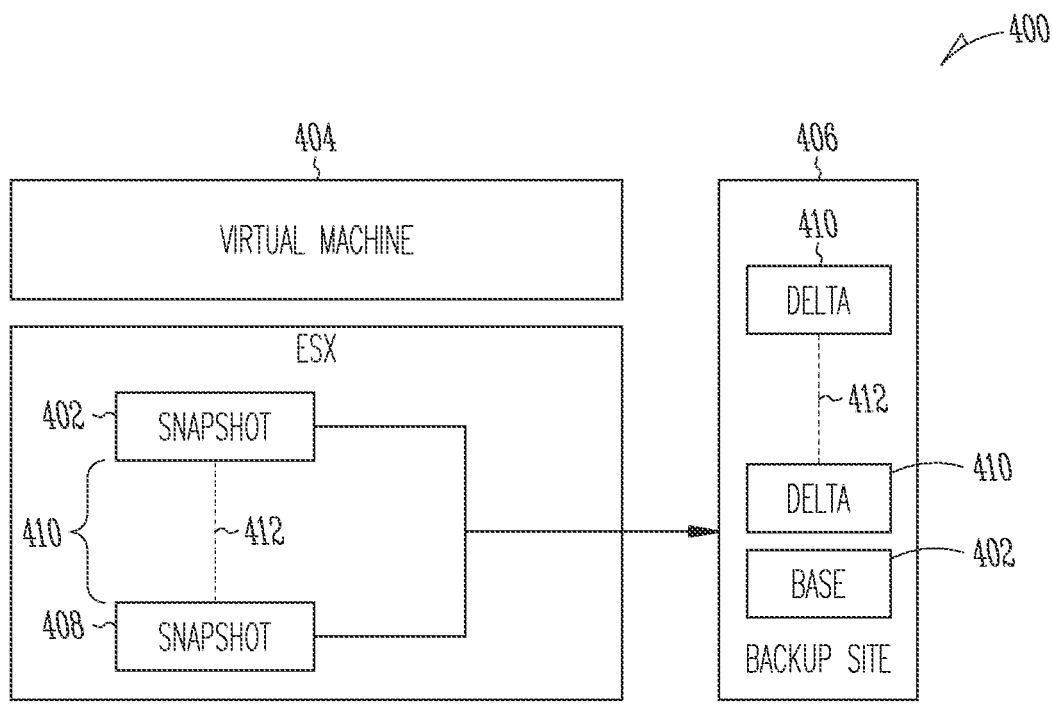
FIG. 4 depicts a networked environment, according to an example.

Aspects of the present disclosure may be used in continuous (or cloud) data management (CDM) or for continuous data protection (CDP). Some CDM or CDP examples employ a snapshot-based approach. With reference to FIG. 4, in a networked environment 400 a base snapshot 402 may be taken for example when a protection policy (e.g., under a Service Level Agreement) is enabled on a VM 404 and its virtual disks. After the base snapshot 402 is saved on a backup site 406, incremental snapshots 408 are taken periodically. A delta 410 between the two snapshots 402 and 408 represents data blocks that have changed, and these blocks 412 may be sent to and stored on the backup site 406 for recovery when needed. Since taking snapshots may be an expensive operation and can impact users, snapshots are typically taken some minutes apart, often from the tens of minutes to several hours; without certain techniques discussed herein, this can result in a poor RPO.

In some instances, taking snapshots may involve relatively heavy operations performed on a periodic basis, perhaps several hours apart and then replicated to data recovery (DR) locations. These snapshot-based solutions typically meet data protection needs for applications where the service level objectives can accommodate hours of data loss in the event of disaster. However, for other applications there is a requirement to reduce the potential loss to minutes, or even seconds, of data loss. Snapshot-based solutions cannot typically scale to meet these aggressive requirements, and users may be obliged to adopt alternate methods such as replication at the application, database, storage, or hypervisor level.

Some examples herein seek to address this gap by delivering a continuous data protection capability enabling users to protect, for example, high value applications and deliver near-zero RPOs. Users may still enjoy a near seamless experience in integrating with traditional "discrete" snapshots, extending existing services such as SLA domains, transport models for archival sites in the cloud or on premises (on prem), global searching, and recovery models.

Figure 5:
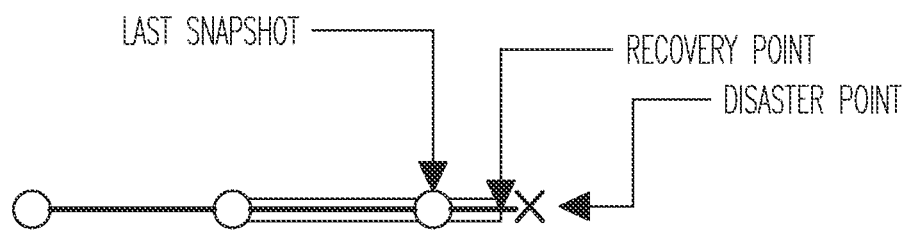
FIGS. 5-6 show timelines of example use cases, according to an example.

With reference to FIG. 5, which shows a timeline of an example use case, a virtualization administrator may for example accidentally delete a VM at the illustrated "disaster point". The administrator may wish to restore that VM locally from the latest point in time prior to deletion of the VM. With a snapshot-based approach the recoverable data may be several hours old, as shown for example at the illustrated "last snapshot". Some examples herein provide continuous data protection (CDP) allowing data recovery from an RPO point a few moments ago, as shown for example at the illustrated "recovery point". The term "continuous data protection" herein means "near-continuous" or "substantially continuous," providing in some instances an RPO of less than a minute (60 seconds). Longer RPOs in the range of 1 to 5 minutes are possible using the disclosed techniques. Ideally, an RPO will exist only a few seconds before the VM was deleted. Similarly, in the case of a storage failure at a local data center, by using the techniques described herein some examples allow the recovery of multiple VMs remotely from the most recent version of the data, which may only be a few seconds old.

Figure 6:
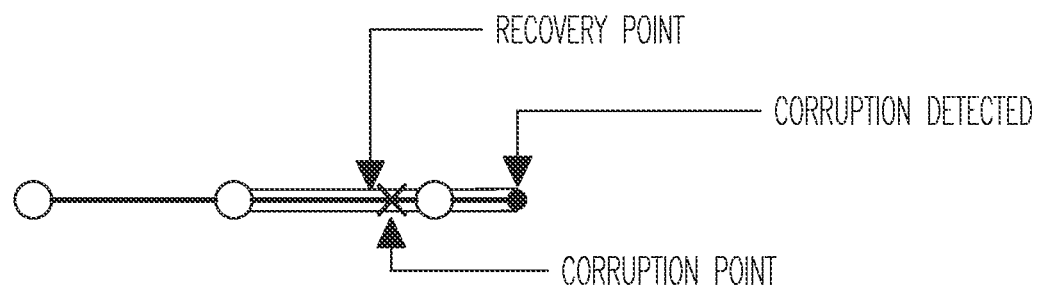

With reference to FIG. 6, in another example a backup administrator may wish to recover from a breakdown, at a local or remote site, from an historical point in time closest to the point prior to when the breakdown was detected. Say, for example, a data corruption occurs at a "corruption point" and is only detected sometime later at a "corruption detected" point, a snapshot-based approach would only allow recovery from an uncorrupted snapshot existing prior to the corruption point. A corrupted snapshot taken after the corruption is not a viable recovery point even if it was taken before the corruption was detected. A recent viable uncorrupted snapshot may not exist; in fact, a viable snapshot may only exist several hours or, in extreme cases, days ago. Examples of the present disclosure allow for a recovery point "just before" (i.e., an RPO of near-zero) the corruption point.

Figure 7:
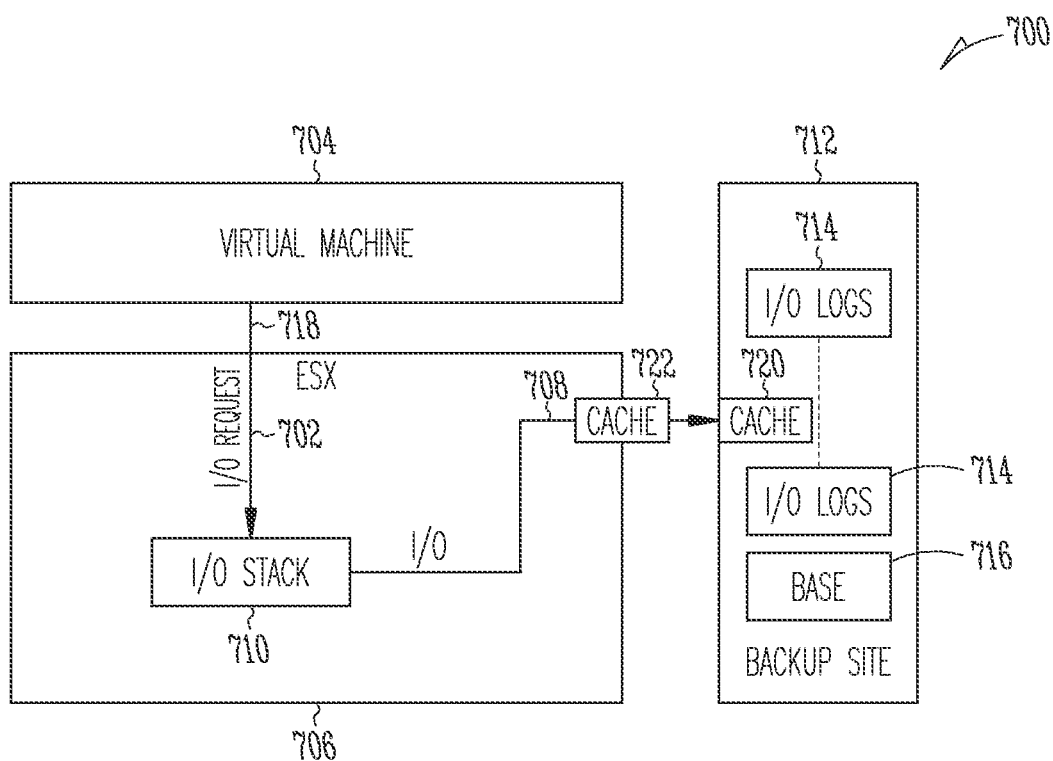
FIGS. 7-10 depict networked environments, according to an example.

With reference to FIG. 7, in a networked environment 700, in some examples virtual disk I/Os that are exchanged between a virtual machine (VM) 704 and a virtualization server, for example an ESX (hypervisor) server 706, are intercepted at an I/O stack 710 in an I/O path 702. The I/O interception and stack allows the I/O to be replicated at 708 to a backup site (or log receiver) 712 at near real time. This may be done with minimal user impact. The I/O replication may in some examples substantially eliminate a need to take snapshots periodically. RPO may be reduced down to seconds. I/O logs 714, discussed further below, are created.

More specifically, in some examples, I/Os are intercepted in an I/O path and allow the collection and replication of changed data. When an I/O is requested for example at 718, it goes through the ESX's I/O stack 710 and the I/O can be intercepted and replicated to a backup site 712. The replicated I/Os are stored in logs 714 which can be used for recovery by applying the I/Os on top of a base snapshot 716. Because the I/Os are intercepted and replicated while the I/Os are going through the I/O stack 710, there is a minimal delay before the I/O reaches the backup site 712, and RPO is reduced significantly. A filter framework, such as a VAIO filter framework for example (see FIG. 8), may allow minimal user impact by inserting a filter driver inside the ESX server 706 to intercept and replicate the I/Os.

Figure 8:
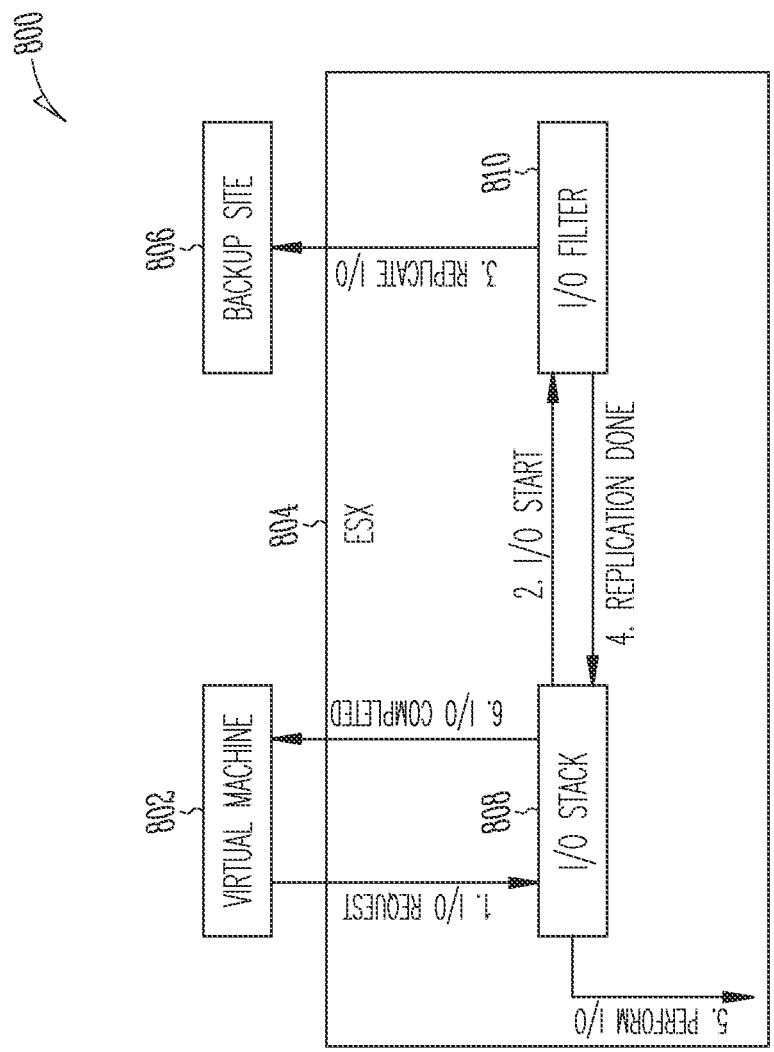

With reference to FIG. 8, a networked environment 800 includes a virtual machine (VM) 802, an ESX server 804, and a backup site 806. The ESX server 804 includes an I/O stack 808 and an I/O filter 810. The I/O filter 810 (also known as a replication filter, or plugin filter) may include a plugin filter driver to intercept I/Os for the purpose of caching and replication. An example replication method may include the I/O operations 1-6 as indicated. The illustrated filter framework can, in some examples, provide one or more touch points during an I/O's life cycle, for example start, cancel, complete, and so forth. A filter driver can in some examples be configured to intercept an I/O at any point. For efficiency reasons, for example, a filter may be configured to intercept only completed I/Os and may significantly reduce the complexity of managing the life cycle of I/Os accordingly. The labeled arrows in FIG. 8 represent an example workflow of a replication filter.

Figure 9:
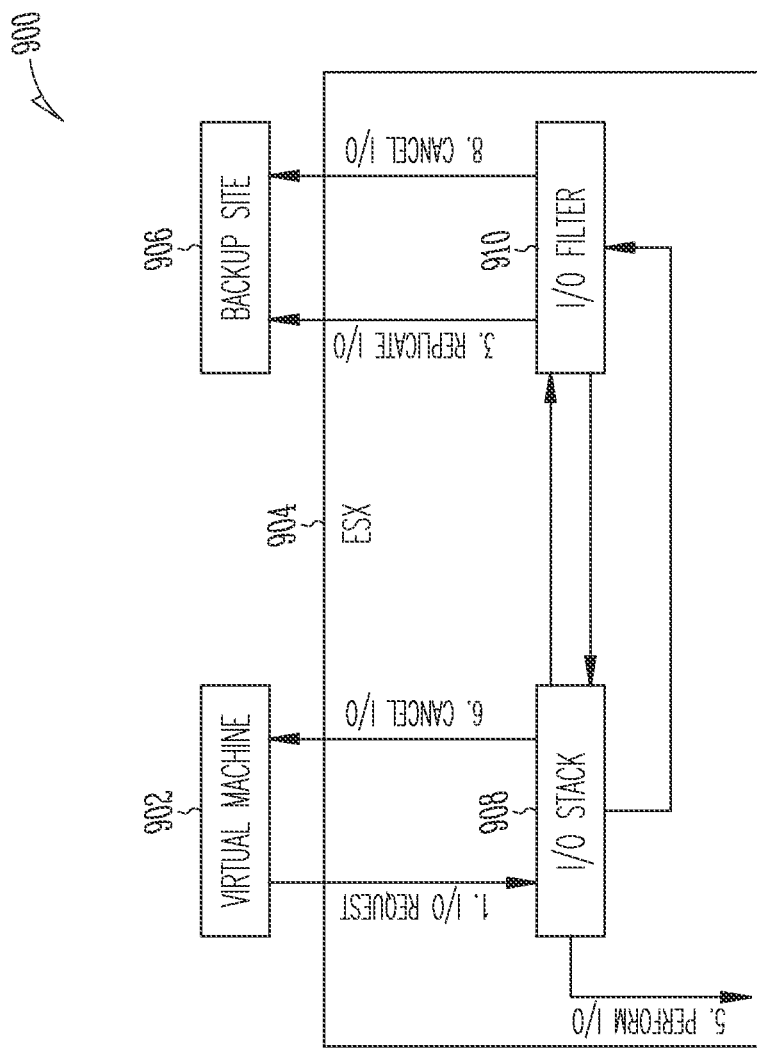

Some examples address replication complications that may arise from I/O cancellations in the I/O stack 908 sent to the virtual machine 902. Replication can become more challenging and complicated if an I/O cancellation occurs. In the networked example 900 of FIG. 9, both of the I/O filter driver 910 and backup site 906 may require an ability to handle cancelled I/O's. A distributed I/O cancellation is complicated and leaves much room for error and data recovery unreliability. To address complications arising in such an implementation, a replication method may include the I/O operations illustrated in FIG. 9. In some examples, instead of replicating I/Os at an I/O start (i.e., a selected touch point mentioned above), I/Os are in some examples replicated at an I/O completion (another selected touch point mentioned above). A I/O cancellation occurring between an I/O start and an I/O completion is thus rendered moot. In some examples, the use of I/O data collection (as opposed to snapshots) and the ability of the filter framework to select a touch point for data collection allows complicated I/O cancellation ordinarily handled by the filter driver and backup site to be eliminated.

Figure 10:
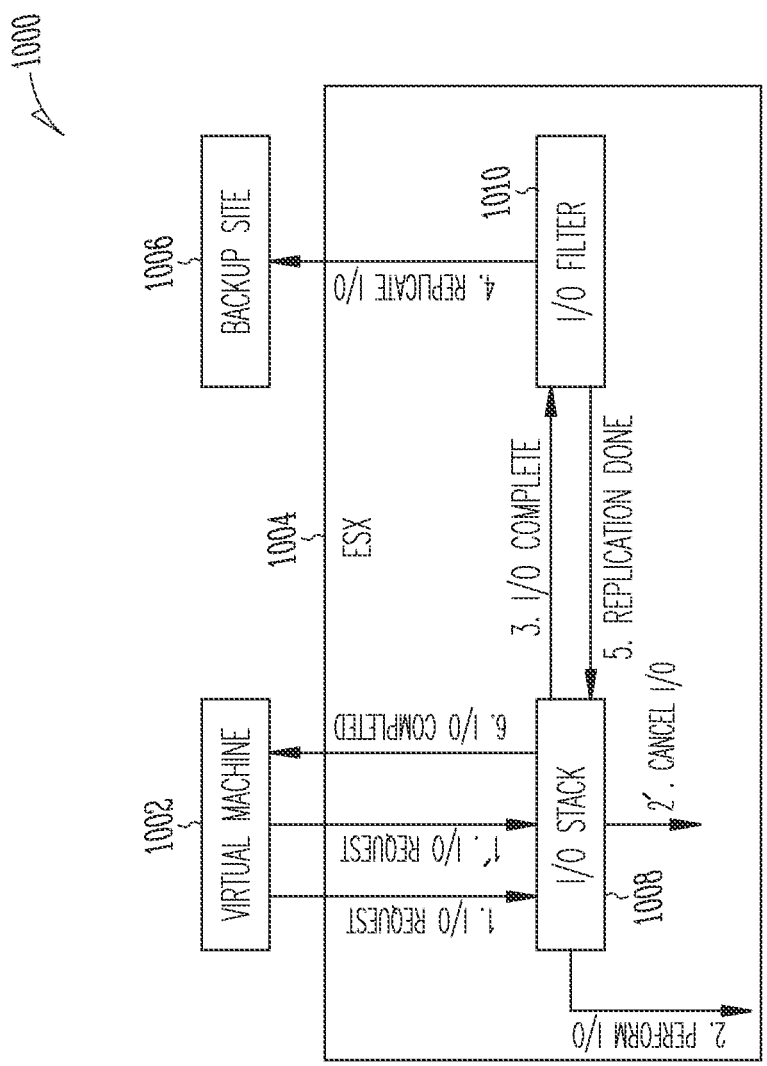

With reference to another example networked configuration 1000 in FIG. 10, I/O cancellation is managed by the I/O stack 1008 of the ESX server 1004 connected to a virtual machine 1002 and is not populated to the I/O filter 1010. A replication method may include the I/O operations as shown.

Thus, in some examples, an I/O-based recovery enables an optimized RPO. A filter framework enables tap off of I/O data at an ESX server (or hypervisor) between a VM and production storage. I/O data is obtained without affecting production latency. A filter touchpoint selection allows selection of various I/O touch points to configure I/O collection. This enables a parsing of various portions of I/O data instead of having to process the full I/O stream. A specific touch-point selection of completed I/Os addresses the problem of how to handle distributed I/O cancellations. By replicating at I/O completion, prior I/O cancellations are rendered moot.

In some examples, a cache or buffer 722 (FIG. 7) may be provided between an ESX server (e.g., ESX server 706, 804, 904, or 1004) and a backup site or log receiver (e.g., backup site 712, 806, 906, or 1006). I/O data can include blocky chunks of data, some of very large size. This can overwhelm resources at a backup site. A cache smooths out the I/O data flow and enables use of existing resources at a "snapshot" backup site. In some examples, two (or more) caches are provided, for example a network cache and a backup site (or log receiver) cache 720 (FIG. 7). In some instances, a single cache may be overwhelmed at extreme I/O flow. A network cache and a backup site cache work in tandem to smooth I/O flow to the backup site (receiver).

In some examples, some or all of the I/O data is replicated directly to memory, not to disk as handling massive I/O data can be a challenge. In some examples, the I/O data remains in memory until it is replicated, or the I/O data may be replicated directly from memory. In some examples, sequence numbers are added to the I/O data write and/or read paths to detect I/O data gaps, corruption, and so forth. The monitoring of consecutive sequence numbers may allow a confirmation that full I/O data was sent and received. This check can be done and supplemented before mounting so that only good data is used and/or replicated.

Some example filter frameworks include a timestamp module and an offset module. Reconciling an ESX server timestamp (collection point) with a backup site (recovery) Rubrik timestamp can be challenging. A large data block remount can be difficult in timestamp offset situations, and the timestamp and offset modules are configured to calculate and adjust for this difference. This ability may in turn enable a convenient RPO selection for example by depicting a slider bar in a graphical user interface (GUI) and enable successful large data block remounts based on slider selection, notwithstanding a timestamp offset between an ESX server and a backup site. Some examples may include a timestamp journal and index to identify a correct RPO point and a near-zero RPO by pointing in real-time to an offset and enabling the correct data to be read at a precise moment it is needed.

The management of the I/O stream and the I/O logs 714 at the backup site 712 (see, for example FIG. 7) is now described more fully. In some examples, in addition to taking snapshots, a continuous data protection (CDP) system maintains I/O logs for virtual machines. Some examples enable point-in-time recovery by replaying logs on top of a base snapshot. In some examples, a sub-minute (i.e., less than 60 seconds) recovery point objective (RPO) is achieved assuming sufficient network bandwidth. Occasionally, replication of a base snapshot may be absent or delayed. In a catchup situation, newer logs in multiple logs on top of a base snapshot may be prioritized for replay.

With reference again to FIG. 8, a filter (for example a VAIO filter) 810 sends I/Os to a log receiver (e.g., a backup site 806, or a CDP service) using for example code division multiplexing CDM. CDM is a networking technique in which multiple data signals are combined for simultaneous transmission over a common frequency band. The log receiver buffers the received i/Os in memory and periodically (based on a time/buffer size threshold) flushes them to a log file. A log file may be included in an I/O log 714 (FIG. 7) on top of a base snapshot 716 (FIG. 7). The logs 714 roll over in the event of a new snapshot, time, or size-based threshold. Some examples replicate these logs to a replication target. In order to support optimum (low) RPOs, data is replicated as soon as it received. Thus, in some examples, a push-based replication approach is utilized, as opposed to pull-based models.

As mentioned above, examples may include a network buffer 722 and/or a log receiver cache 720. A cache 720 allows a log receiver 712 to queue the I/Os to create a fast path for logs to replicate assuming there is sufficient network bandwidth. If a required log sequence is not in the buffer 722, the log receiver 712 reads sequentially from disk until a catchup. In some examples, a catchup may include reading a missing portion of records from a disk without necessarily reading all the way to the end of disk as the log receiver 712 has filled up the gap between two logs in the memory records. A source component at the log receiver may ensure that records are received by a replication target (e.g., a database, a backup site, or a VM requiring backup data) and schedule flushes of the records to a log file on disk in order. Logs at the source component and the replication target maintain a one-to-one mapping. This implies a given log on source will either not be replicated at all or will be replicated completely to the replication target with the same log Id.

Figure 11:
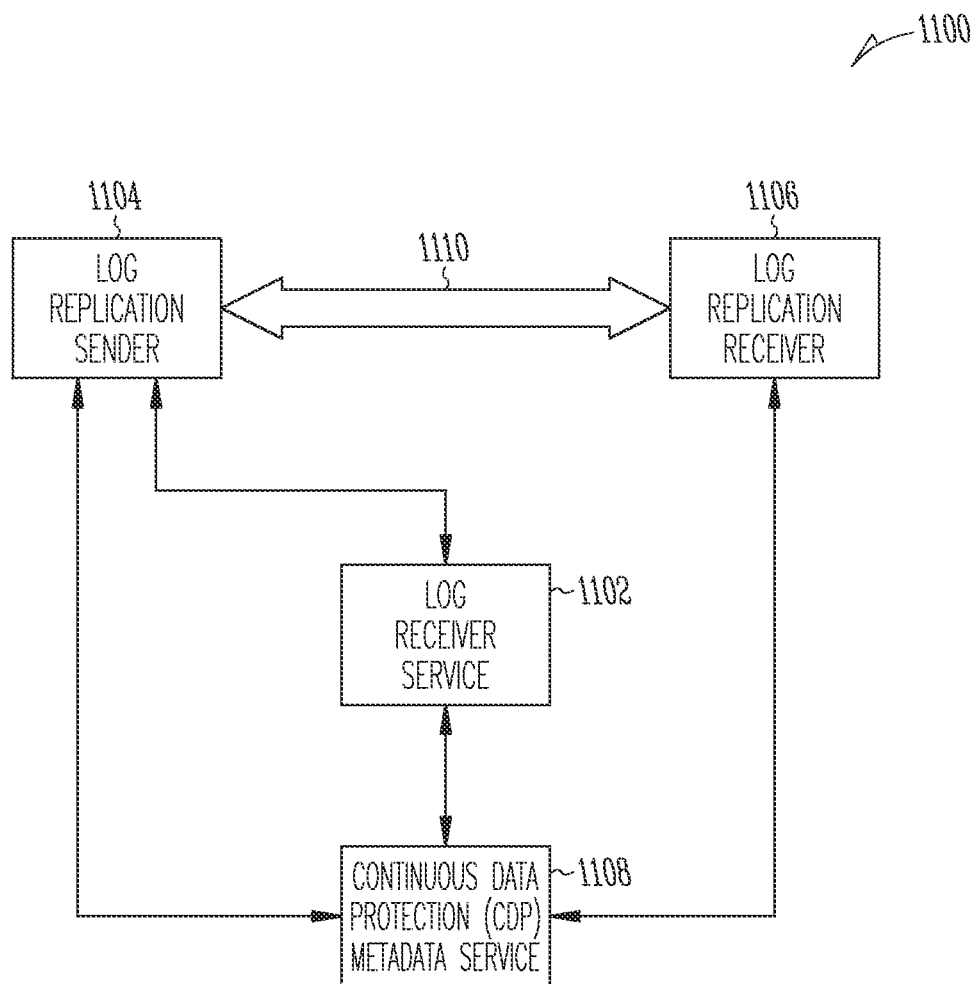
FIG. 11 shows aspects of an example log receiver, according to an example.

With reference to FIG. 11, an example log receiver 1102 resides in a networked environment 1100. A log receiver (also termed a backup site, or log receiver service herein) may provide certain services and include (or interact with) a log replication sender 1104, a log replication receiver 1106, and a CDP metadata service 1108. In some examples, the log replication sender 1104 runs on a data or I/O source component and is responsible for sending data from the source component to one or more replication targets. In some examples, the log replication sender 1104 resides in a log receiver data service. The log replication sender 1104 can communicate at 1110 directly to a log replication receiver 1106 residing at a replication target. In some examples, the log replication sender 1104 and the log replication receiver 1106 are on different nodes. For each node of a source cluster, the log replication sender 1104 communicates with the log replication receiver 1106 on that node and the CDP metadata service 1108 on that source node. For each node of a target cluster, the log replication receiver 1106 communicates with the CDP metadata service 1108 on that target node.

In some examples, the log replication receiver 1106 runs at a replication target and in some examples resides in an existing replication service (e.g., a snapshot replication service). This may provide some convenience in that a client may not be required to perform additional configuration for CDP replication as the same ports may be used and network address translation (NAT) configuration may be continued. The log replication receiver 1106 is responsible for receiving data from the log replication sender and adding it to a log file (e.g. an I/O log 714 in FIG. 7). Some arrangements include a separate log replication receiver 1106 and send proxy requests through an existing snapshot replication service. Proxying can increase overall memory requirements as the same amount of memory would be required on both the log replication sender 1104 and log replication receiver 1106 at steady state data transfer. In some examples, the CDP metadata service 1108 runs on both the data source component and the replication target. The log replication sender 1104 and the log replication receiver 1106 communicate with the CDP metadata service for all metadata operations.

In some examples, the log replication sender 1104 includes a metadata service component responsible for metadata operations and a data service component responsible for data transfer. The data service component calls an application programming interface (API) such as a write-ToLog API on the log replication receiver 1106 to replicate records. The log file to be replicated may be a closed file or an open file currently receiving data records from an I/O filter (e.g., I/O filter 810 in FIG. 8). In the case of closed replication, records (I/O data) are read from the log file on disk and replicated. In the case of live replication, it is not necessary to read the records from disk but instead directly replicate the records received from the I/O filter 810 by using an in-memory buffer. In some examples, this may be performed as follows.

The log receiver 1102 receives records (I/O data) from the I/O filter 810, stores the records in memory (e.g., I/O logs 714), and then flushes the logs to a distributed or scale data file system periodically. Once the records are flushed, the log receiver 1102 calls a live replicator manager to perform live replication before the log receiver 1106 removes the flushed records out of its memory. The log receiver 1102 instructs the live replication manager to replicate records (for example, records m, n). The live replication manager checks its own memory usage, and if the combined size of the records (m, n) fits into the memory of the live replication manager, the live replication manager moves the received records to its own memory and queues a replicate request to a live replicator worker and indicates the records are in memory. If the received records do not fit into its memory, the live replicator manager will ignore the records and queue a replicate request to the live replicator worker and indicate that the records are on disk. The live replicator worker reads a replicate request from the queue. If the records are in memory, it reads the records from memory and sends them to the log replication receiver 1106 and removes the records from memory to free up space. If the replicate request indicates that the records are on disk, it will read from SDFS, then replicate to the log replication receiver 1106.

Certain APIs may be used in conjunction with the log replication sender 1104. A replicateLog API is used for replication which may be closed, or live replication as discussed above. Once all the records for a given log are replicated, the log replication sender 1104 calls a signalReplicateLogCompletion API on the metadata service component. A replicateLogStatus API is used to check the status of the replication which is ultimately reported on a graphical user interface (GUI) as a remote recovery point (e.g., a GUI on a physical machine 120 or 130 of FIG. 3).

In some examples, the log replication receiver 1106 comprises or provides a thrift service on a target cluster (e.g., a cluster discussed with reference to FIGS. 1-3 above) that is responsible for receiving logs sent by the log replication sender 1104. In some instances, the log replication sender 1104 may try to replicate or send the same log multiple times in case of crashes, lost acknowledgments, and so forth. The log replication receiver 1106 is responsible for dealing with duplicate data. In some examples, the log replication receiver 1106 maintains an in-memory handleId to generate a disk-id map which is populated on each openLog call by the log replication sender 1104. If the log replication receiver 1106 receives a call without a valid handleId, it generates an error.

Certain APIs may be used in conjunction with the log replication receiver 1106. An openLog API determines the node on which a disk should replicate using round robin or random assignment techniques for load balancing. The API may generate a unique handleId which is used in all subsequent requests by the source. The API may review a log table to determine a last replicated log. In the event of a source-side crash, a previously assigned node ID should exist for the disk, accordingly. In some cases, there may be a partially replicated log. The log content of the partially replicated log is deleted, and the replication starts afresh. A resumability (i.e., an ability to resume) function may be established at this point. A call to a writeToLog API contains a list of requested records for replication and the requested records are queued to an in-memory buffer. In some examples, the records are flushed to the disk in order by a daemon (background process). If the in-memory buffer is full because it is holding out-of-order records, then the API responds with a sequence_out_of_order status. At this point, the log replication sender 1104 may retry starting from the last record received in order. A closeLog API is utilized when the log replication sender 1104 has sent all the records for a given log. The log replication sender 1104 then sends closeLog request to signal the end of the log. At this point, the log replication sender may call a finishCreate log store API.

In some examples, the CDP metadata service 1108 scans disks in an I/O stream source table periodically to determine and claim a replication owner node for a disk. Each disk (or I/O stream source) has a replicationOwnerId to ensure that only one node is working on replicating logs for that disk at a time. This operation may include a worker pool which processes each disk that is seeking replication from the relevant node. In some examples, a worker claims replication ownership for the node to ensure only one node is replicating for a disk. The worker determines the next log to be replicated by calling a replication orchestrator, discussed in more detail below. The worker generates a unique handleId for each log replication which is used in all API requests. In some examples, the worker calls an openLog API of the replication target to initialize log replication with the unique handleId, and a replicateLog API of a data service on the relevant node with the log information, the handleId, and targetNode information, which does the replication of data records. A signalReplicateLogCompletion API is called by the data service once it finishes replicating all the requested records. This API may call a finalizeLog API of the replication target which marks the log as finalized on the target. A replication status of the log on the source may be changed to a replicated status accordingly.

Some examples include an algorithm to filter disks (e.g., VM disks by the I/O filter 810, FIG. 8) and determine a replication owner node. For disks which receive I/O records from the I/O filter 810 and replication is enabled (e.g., an effective service level agreement (SLA) has replication enabled), the replication owner is the same as the log receiver 1102 owner. This enables a read from the log receiver 1102 buffer (e.g., cache 720, FIG. 7) and creates a fast path of data transfer when replication can keep up with the incoming I/O stream (e.g., I/O stream 708, FIG. 7). This configuration also allows the use of the same load balancing as used by the log receiver 1102 even when log replication lags behind. For disks which have no assigned log receiver owner (implying the disk is not receiving I/O records), but for which log replication is enabled, node ownership is claimed based on a sharding technique so that these disks can be distributed equally among the source nodes.

Some examples include a replication status poller. The metadata service of the log replication sender 1104 maintains an in-memory queue containing handleIds of logs that are replicating from the relevant node. The poller is responsible for determining a timestamp of a last replicated data record. The timestamp is used for remote recovery point calculation, cleanup in the event of a service restart, or other unknown failures.

In some examples, the poller periodically (for example, every 30 seconds) calls an API (for example, replicateLogStatus(handleId) API) to identify the timestamp of the last replicated data record and persist this information in a database. This information may be stored for example as diskId→(current replicating log ID, timestamp of last replicate data record, lastUpdateTime). This information may serve to compute a remote recovery point. In some examples, the database does not update if the data service is down or if it is not replicating any data with respect to handleIds generally, or the specific handleId. If the lastUpdateTime is more than 30 minutes ago (for example), the poller concludes that something is amiss as the log is not being replicated. A next step may include performing a cleanup operation of the session with respect to the relevant handleId and then restart replication for the disk. In some examples, cleanup is performed by calling a deleteLog API for (handle_id, log_id).

A unique handle identification (handleId) may be important in some examples. For example, a unique handleId is used for an initial handshake (using the openLog API) to establish all replication requests with respect to a given log being sent by the applicable unique handleId. There can only be one active handle identification for any disk and a unique handleId is generated for each log replication. Using a unique handleId may be important because replication requests communicated over a wide area network (WAN) can return a client error or timeout status with respect to a data source but it is still executed on the target. Further, if a previous finalizeLog API or deleteLog API for a given log is executed later on the target, this could lead to inconsistent state. But as each log is verified with respect to a current active handleId, these errors or inconsistent requests can be ignored.

As discussed above, in some examples replicated I/Os are stored in logs 714 which can be used for recovery by applying the I/Os on top of a base snapshot 716. Some present examples include a CDP replication orchestrator to determine and prioritize base snapshots for replication (for example, base snapshot 716, FIG. 7), as opposed to other SLA snapshots.

In some examples, an orchestrator accesses for replication at least the following information from a I/O stream log table: a logId; a base_log_id; a StreamSourceId or a vmwareDiskId; a replication status such as to_replicate (no work yet done on replicating a log), in_progress (a worker is currently replicating the log), or replicated (the log has been replicated to the target cluster); and a base snapshot identification (for example, base snapshot 716, FIG. 7). In some examples, the orchestrator may also identify or access a stream source including a StreamSourceId and replication metadata. The replication metadata may include a data store owner nodeId and a claimTime value. Data store handle information may include a handleId, and a log id. Some examples also include a snapshot table accessed by the orchestrator during replication operations. In some examples, a snapshot table may store dependent log information which may be read during a pull replication or by an openLog API to add the base snapshot for the log on the replication target.

Figure 12:
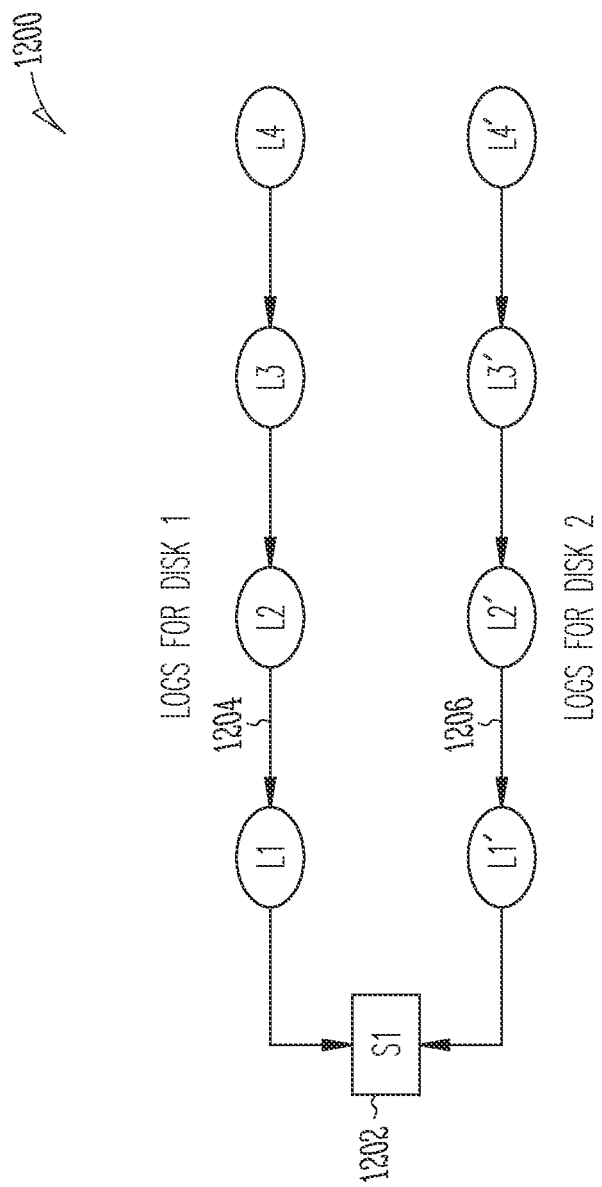
FIGS. 12-25 show aspects of example log chains (also termed snapshot-log chains herein, depending on the context), according to examples.

With reference to FIG. 12, in some examples a CDP replication orchestrator abstracts out a snapshot-log chain 1200 using management logic for determining a next log for replication. Each snapshot-log chain 1200 starts from a snapshot 1202 followed by one or more log chains 1204 and 1206 for it to be recoverable i.e. capable of replication. The snapshot-log chain 1204 may relate to a disk 1, while the snapshot-log chain 1206 may relate to a disk 2. The replication orchestrator is designed to keep track of these chains 1204 and 1206 to oversee an identification and replication of all the snapshots necessary (so-called "must-replicate" or "must-have" snapshots) for the log chains to be recoverable on the replication target and, since a VM may contain multiple disks, a determination that the logs replicated for multiple disks are in sync with one another.

In some examples, the following APIs are exposed by the orchestrator. A GetNextLogToReplicate API returns the next I/O stream to be replicated for a given stream source ID. The logic handles all the cases where the disk might be lagging due to slow network connectivity or other reasons. Some examples try to start a chain from a new snapshot if a snapshot falls outside of a retention window. The orchestrator also handles cases in which VM disks are added or removed from the VM inappropriately. A GetNextSnapshotToReplicate API is used by the orchestrator internally to ensure that all "must-have" snapshots are not deleted until they are replicated. A CalculateLastReplicatedTimeInNanos API assists in determining a remote recovery point. The API factors into this determination whether the snapshot is replicated and the last status of the in-progress log which is being replicated.

In some examples, the replication orchestrator also has the functionality to pick up inProgress snapshots and start replicating logs. In some examples, this is done optimistically in the sense that the orchestrator begins replicating IO records with the hope that the snapshot copy step will not fail. If it fails for some reason, then the logs may have to be discarded. Snapshot completion or failure cases are appropriately handled. Specifically, in the case of failure, logs are not replicated anymore and the chain (for example, chain 1204 or 1206) is marked invalid. In some examples, all operations to the orchestrator are performed atomically and are thread-safe. Some examples begin collecting I/O records as soon as a 'take snapshot API' call to a virtual center for that virtual machine succeeds. After this, the replication orchestrator copies the data onto a cluster which could take any amount of time based on size and change rates of the virtual machine. In some examples, only when a snapshot is fully copied on to the cluster do the I/O records become recoverable. It is also possible that there is some failure in the copy step. In a failure case, the snapshot is not available and hence I/O records beyond that snapshot cannot be used for recovery.

Some examples of a CDP replication orchestrator may include the following design aspects and data structures. For example, data entries in a replication orchestrator table may include a primary key and orchestrator information. A primary key may include a composite identification (compositeId) of a "snappable" i.e. a snapshot, (for example, a "must-have" snapshot and a target cluster identification (targetClusterId). Orchestrator information may include a chain of snapshotAndLogInfo where each chain starts from a snapshot followed by logs for each VM disk. This snapshot may be a "must-have" snapshot and, if so, will be replicated to make the logs recoverable on the replication target. In some examples, a new chain is added to the list on various conditions: for example, a replication on a previous log chain falls out of a retention window for any of the VM disks, or a CDP effort is broken on the source and is then restarted, or a replication encounters an error (for example, a network error or other fault) which results in a log being marked with an error message, for example ReplicatedWithError.

An example data structure may include I/O stream source information such as streamLogIds (OrchestratorList), a doneReplication (Boolean value), and a lastUpdatedTimestamp (for example, Option[Date]=None). The data structure may store a list of streamLogIds for each stream source. Usually the last log in this list is the one which is being replicated or is the next candidate for replication. Some structures also store the lastUpdatedTimestamp to detect a last modification. Orchestrator rows or lists in the data structure may be checked to determine those which have not been updated beyond a specified time and purged. Appropriate pruning logic may be added to an orchestrator list so that a log chain does not grow in an unbounded fashion. Unbounded chains could lead to big metadata rows and cause processing problems.

Snapshot and log information in an example data structure may include one unit of a snapshot-log chain. Some example orchestrators include a mechanism to start a log chain even from an in-progress snapshot. The mechanism may include or access a map from streamSource to StreamSourceInfo and assist in tracking how far each disk has been replicated. The mechanism may also store information to detect if the snapshot needs to be pinned or not and if it has been replicated. Some examples include a background replication orchestrator which cleans up the replication orchestrator table in a data structure. This clean up may include removing archived snappable rows and all rows for which a service level agreement (SLA) has changed to a different target cluster. All relevant snapshots are unpinned while removing the chain.

As mentioned above, some examples provide the ability for users to protect their workloads and data at discrete points-in-time using snapshots. These snapshots are relatively heavy operations that are performed on a periodic basis, perhaps several hours apart and then replicated to DR locations. Snapshot-based solutions meet the data protection needs for applications where the service-level objectives can accommodate hours of data loss in the event of disaster. However, for other applications there is a requirement to reduce the potential loss to minutes, or even seconds, of data loss. Snapshot-based solutions cannot scale to meet these aggressive requirements, and customers are forced to adopt additional solutions like replication at the application, database, storage, or hypervisor level. To address this gap, some examples deliver a new near-continuous data protection (CDP) capability that enable users to protect, for example, high-value applications and deliver near-zero RPOs.

Figure 13:
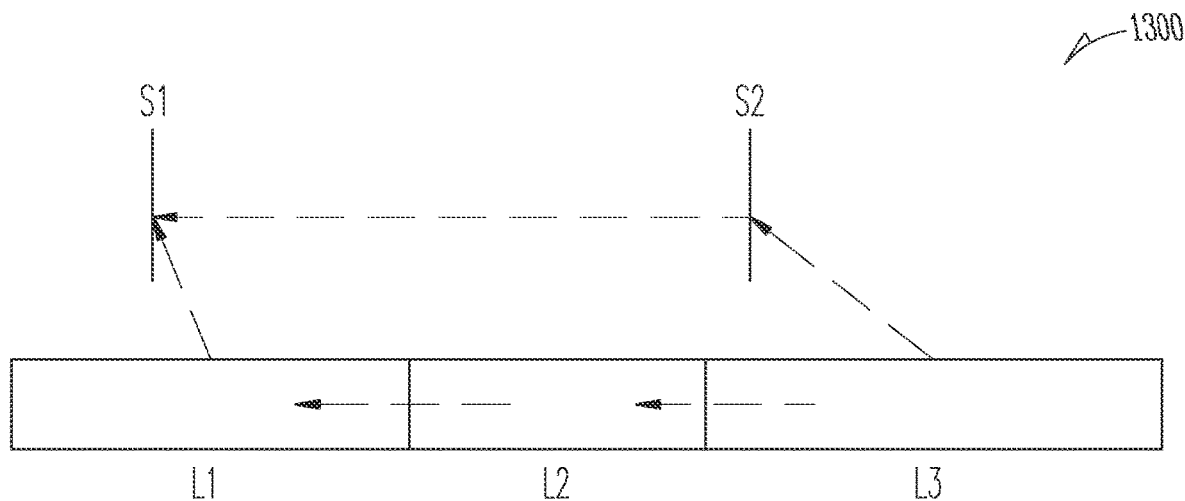

In this regard, to enable CDP, a vendor-specific driver captures continuous I/Os, caches them, and sends the I/O data (a.k.a. "stream logs") to clusters. A log receiver service (LRS) running on nodes receives the logs and writes them to a disk. Logs are captured after a snapshot is taken. This snapshot will serve as the base of subsequent logs. Logs are captured one after another; a later one depends on the former one. Thus, with reference to FIG. 13, the continuous logs form a log chain 1300. The dotted arrows show the logical dependencies of the snapshots and logs. A log chain is valid only if there is a base snapshot. In other words, a VM is recoverable from a specific continuous point-in-time version (which corresponds to a log) only if there is a valid base snapshot. Once a new snapshot is taken and designated as the new base, old logs may be eligible for expiration or garbage collection depending on the assigned SLA policy.

Typical operations supported by CDP include obtaining or accessing the recoverable ranges of a VM or recovering a VM from a most recent continuous point-in-time version or recovering a VM from a specific continuous point-in-time version. To support these operations, example algorithms manage the log chain to determine if a log chain is valid for recovery. One algorithm may include determining a shortest log chain, with a valid base snapshot. A second algorithm may include determining a longest log chain, with a valid base snapshot. These algorithms can be used to calculate recoverable ranges of a VM.

Figure 14:
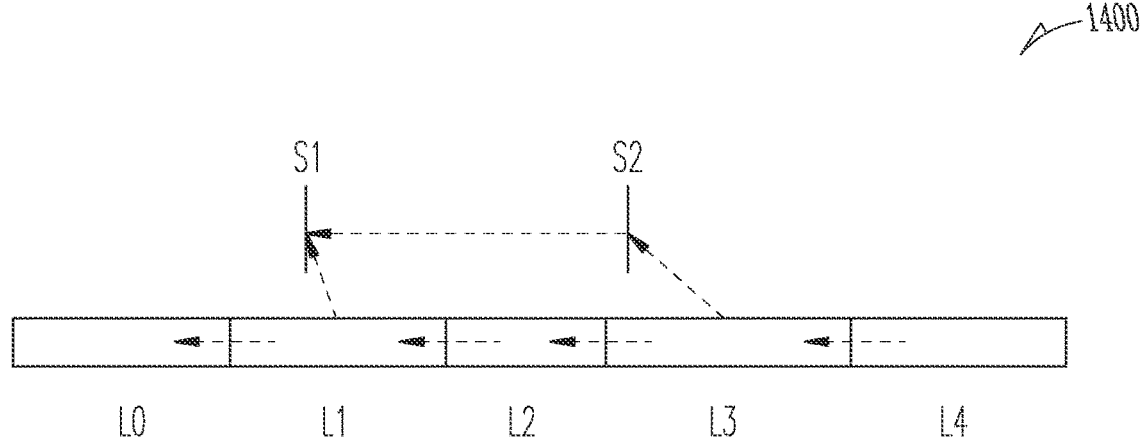
Figure 15:
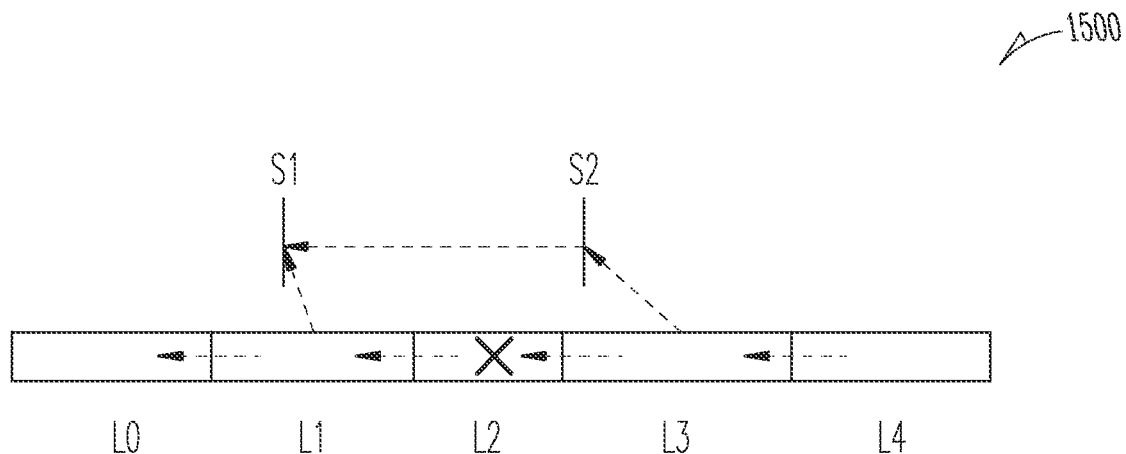

Some examples pin a log chain for recovery or to get recoverable ranges of a VM. An example continuous log chain 1400 is depicted in FIG. 14. In this example, the latest log chain for recovery is {S2, L3, L4}. The recoverable range is {[S1, L4]}. An example broken log chain 1500 is shown in FIG. 15. In this example, the latest log chain for recovery is {S2, L3, L4}. The recoverable range is {[S1, L1], [S2, L4]}. The algorithms can be enhanced to support recovering a VM from a specific continuous point-in-time version.

For purposes of explanation, a stream source may be considered to include an abstraction of any data sources that can produce continuous stream data, for example a virtual disk of a VM is a stream source. A stream log may be considered to include an abstraction of any continuous stream data produced by a stream source. In some examples, stream logs are managed in a form of dependency chain, for example as discussed above. A log may be pinned by 3 different references. A SelfRef reference indicates a log is alive and not expired. A Log Ref reference indicates a log is a base of other logs. A JobRef reference indicates a log is being used for recovery (e.g., Live Mount). Building a log chain to enable continuous point-in-time recovery may only be a partial flow in a replication operation, in some examples. Stream logs are like a "stream": the source I/O data continuously "flows" into a cluster. The disk space consumed by stream logs may be significant for some stream sources (for example, virtual disks). In some examples, it is equally important for efficient CDP to ensure that all expired stream logs are recycled to free up the disk space as soon as possible. Log garbage collection (GC) is a process that aims to free up occupied disk space by removing unneeded logs and may be an integral part of a CDP product, in some examples. In a typical garbage collection cycle, any logs that are still referenced will be kept, even if they have expired. The space occupied by logs with no references will be freed and reclaimed to accommodate new logs.

Figure 16:
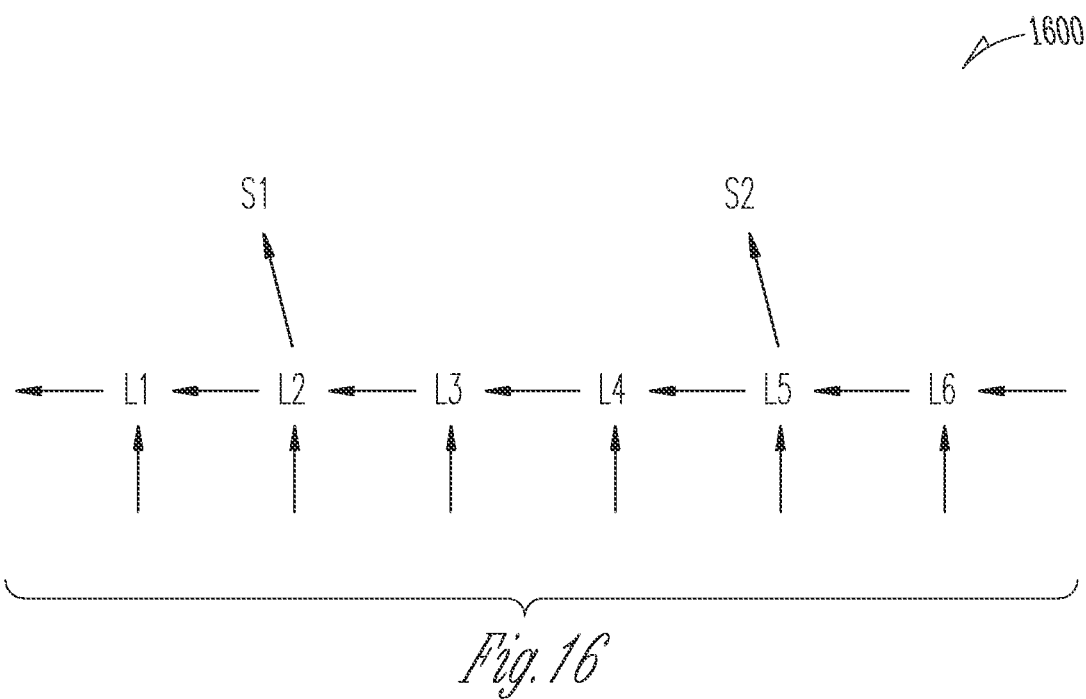
Figure 17:
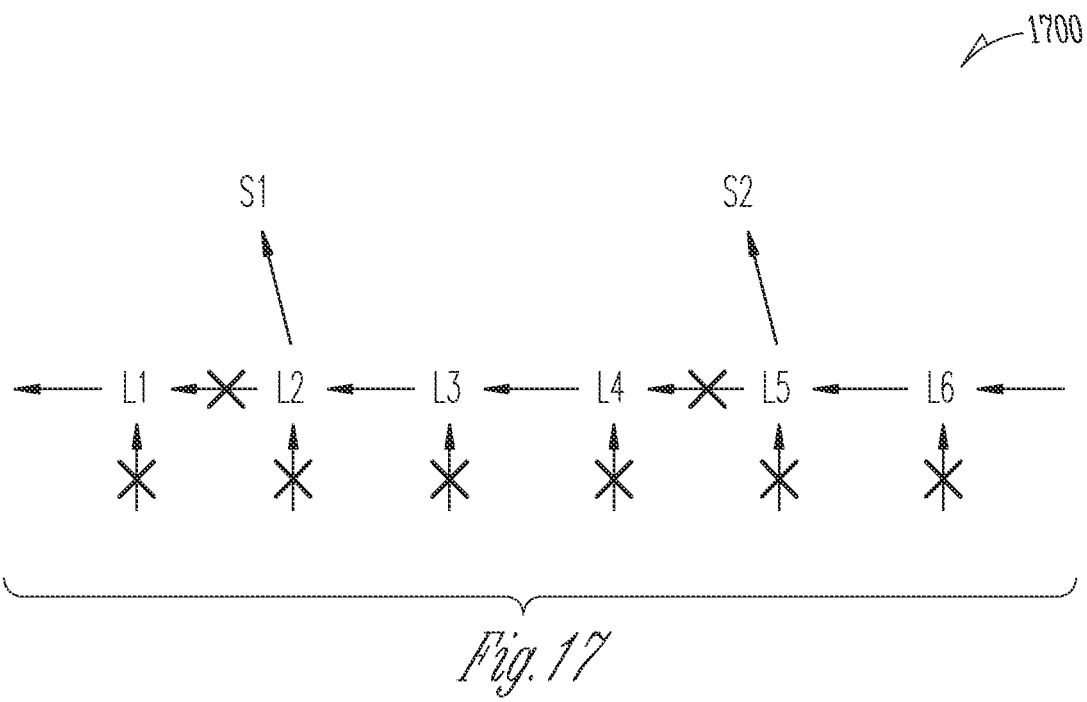
Figure 18:
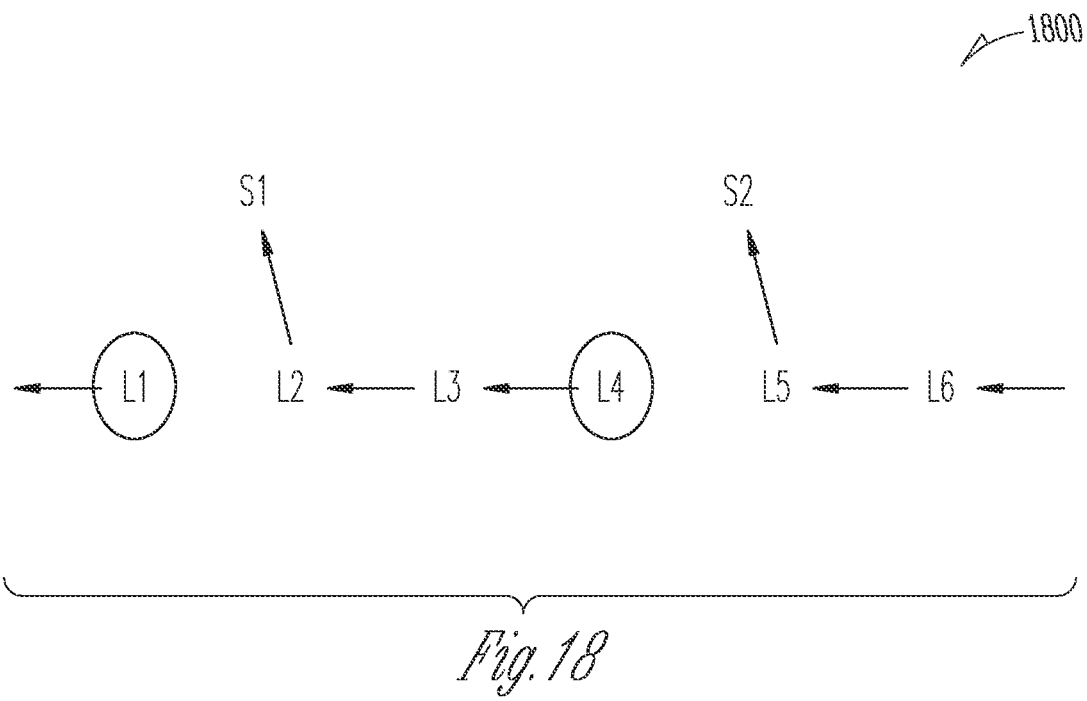

With reference to FIG. 16, example operations in a GC process 1600 are now described. Assume all logs below should be expired based on assigned SLA policy. The following steps describe how an example log GC process works. First, the logs are expired based on SLA policy. Typically, when a new snapshot is taken, old logs should be expired or consolidated. But based on various business requirements, users may want to keep some logs for a longer period. A per stream source job will be scheduled periodically to expire the logs based on SLA policy. The expired job will take care of two things: first, removing self-references if a particular log should be expired according to SLA. Second, if the expired log has a base snapshot, which means it is recoverable without relying on the base log, then remove the reference from base log (if it exists). With reference to FIG. 17, the first operation above will mark a log 1700 as expired, so that it will not be used as a base log for any new logs. The second operation ensures that if a newer log is recoverable from a base snapshot, then it is safe to mark older logs as eligible for GC. After the expiry operation is complete, the log chain may appear like the log 1800 chain in FIG. 18, for example. The circled L1 and L4 are eligible for GC because there's no reference pinned on them.

Figure 19:
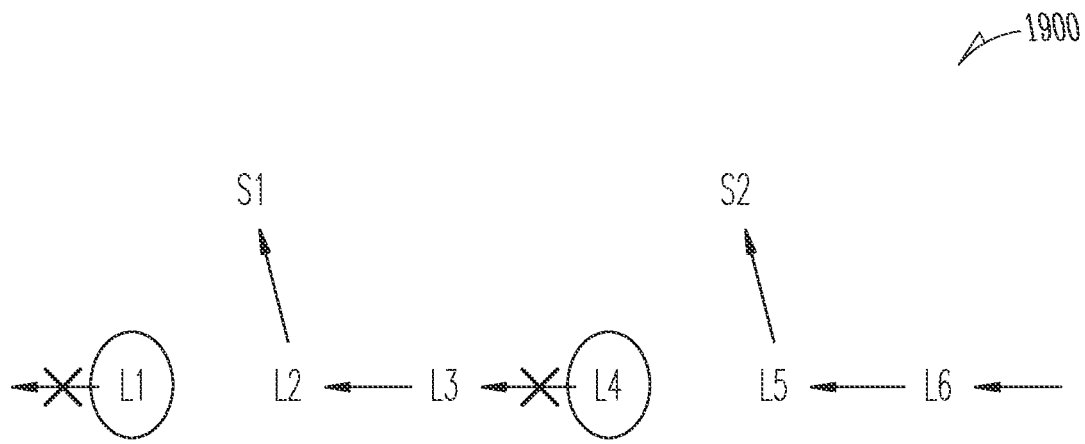
Figure 20:
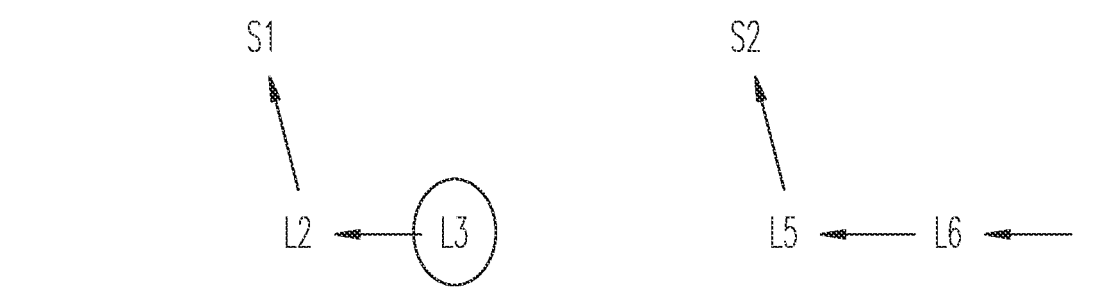

Some examples include GC logs. A GC operation cleans out the logs if the references are empty. An empty reference implies that the log has expired, no other logs depend on it, and no live jobs are using it. So, it may be inferred that it performs GC on these logs. With reference to FIG. 19, a per node operation 1900 will be scheduled periodically to perform GC on the logs. In some examples, the GC operation addresses, firstly, removal of the log reference from the base log and the base snapshot if these exist; secondly, removing log metadata where stored in a database; and thirdly, removing the log file from disk. After the GC operation is complete, the log chain may appear like the example log chain 2000 in FIG. 20. Now L3 has no reference on it, so it will be recycled in the next execution of a GC operation.

Figure 21:
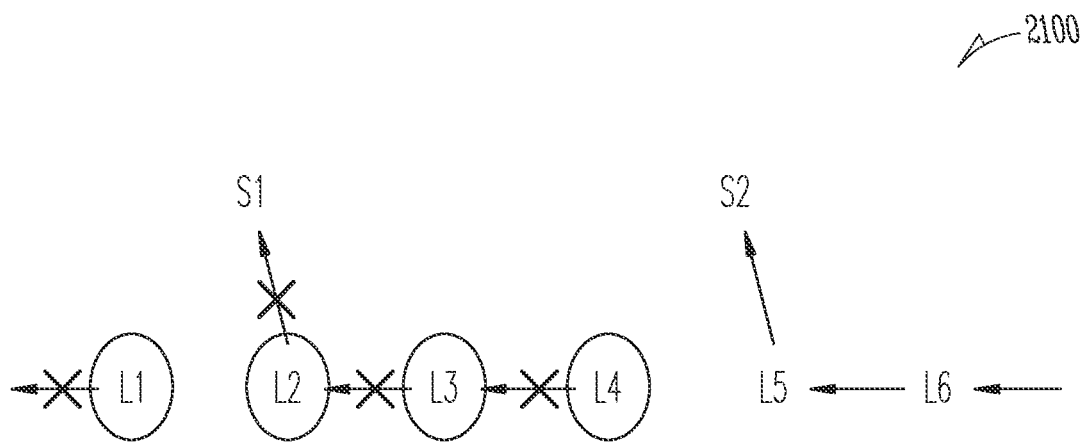
Figure 22:
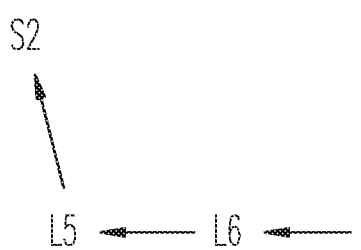

Some examples include an enhanced algorithm to promote an efficiency of the GC operation. In the above examples, once L4 has been GC'd and the Log Ref has been removed from its base log, L3 becomes eligible for GC immediately. Aggressive GC tries to garbage collect as many logs as possible during one job execution, for example as shown at 2100 in FIG. 21. So, with aggressive GC, after one GC job execution, the log chain may appear like the example log chain 2200 in FIG. 22. All expired logs will be garbage collected during the first execution of the GC operation assuming the logs are not being pinned for recovery during GC.

In some examples, CDP enables near-continuous data protection of VMware VMs using a VAIO framework from VMware. A VAIO filter is implemented to replicate each I/O to a cluster. In some examples, these I/Os are written into a new file format called TimestampedJournal (TSJ) which supports point-in-time recovery for VMs. A log management component manages 110 stream logs, including log lifecycle management, log chain management, and so forth.

In some cases, a log chain may become very long. For example, if a snapshot frequency is much longer than log retention, instances may arise where many logs expire, but the expired logs cannot be GC'd because of dependent logs. If the protected VM is extremely I/O intensive and the change rate is fairly high, logs may be rolled over frequently, and excessive logs may be generated. In any case, applying too many logs during mount or recovery may take more time and may not meet a user's expectation of RTO.

In space saving applications, TSJs may take more space than patch files as they are not optimized for overwrites. Maintaining a long chain of logs may also occupy more space. Some examples thus consolidate and garbage collect (GC) logs out of the applicable retention window as soon as possible to improve recovery times and save space as well. Even for logs within the retention window, some examples still consolidate these even though space saving options are impacted because the TSJs are retained to support a granularity of point-in-time recoveries.

A CDP-enabled VM may include two ingestion paths: continuous stream logs and discrete snapshots. Some examples ingest all the requisite data from stream logs and may avoid taking snapshots. In some examples, once a VM is enabled for protection by CDP, unnecessary (if any) snapshots are taken and instead some examples automatically construct snapshots by converting TSJs to patch files. The use of patch files or taking snapshots by an external source may reduce work, allow computation to happen in a datacenter, but may increase network bandwidth yet ensure application consistency. Constructing snapshots in a backup site may involve extra non-trivial work, allow computation to happen in a cluster, may decrease consumption of network bandwidth, yet there may be little or no application consistency. While dual ingestion may not present a big issue for backup because it is usually done within a data center, this can present an issue for replication. Replication traffic communicated over the internet (or VPN pipes) may have bandwidth limitations. Avoiding dual transfer may thus be very convenient for users. Thus, some examples make a distinction between content (the data being stored, like a complete snapshot) and representation (how the content is stored in the chain, likely spread among multiple patches).

Figure 23:
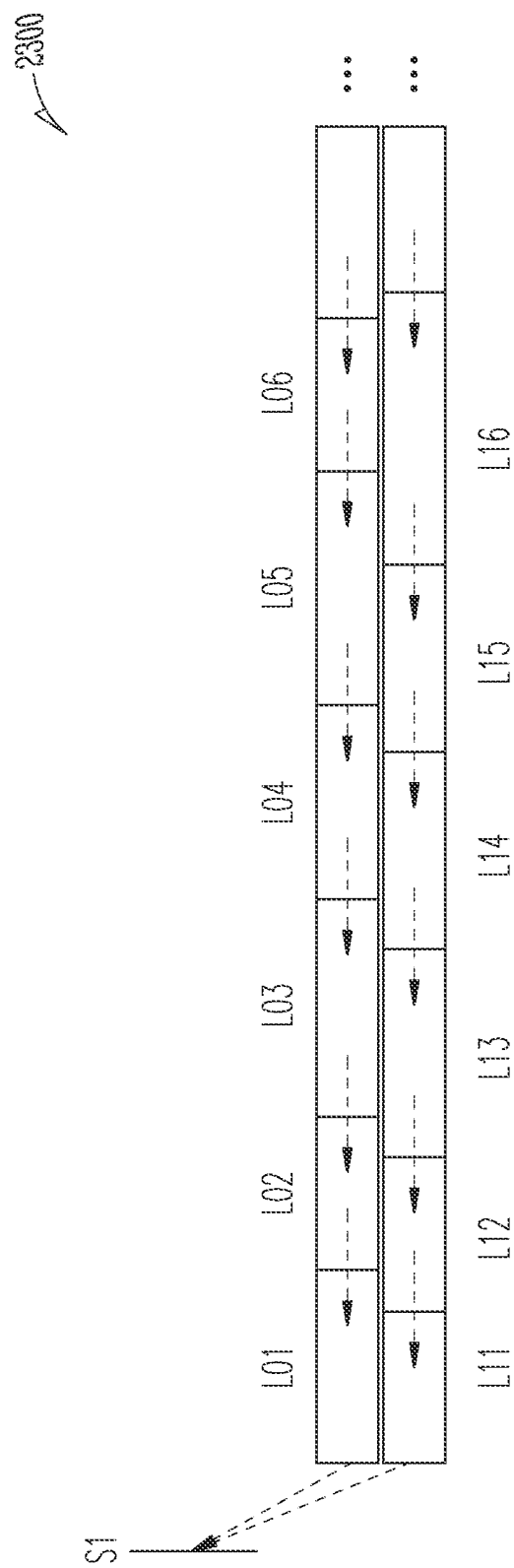

With reference to FIG. 23, a log chain 2300 is based on two stream sources (i.e., virtual disks) of one VM. If a log chain is dependent on a base snapshot it may become very long, the number of logs to be replayed during recovery will be increasing over time and a log replayer will take more and more time to replay all the TSJs. To address these challenges, two options may be possible. In a first option, a significant issue may be the need to replay many TSJs. To address this issue, some examples periodically scan the log chain 2300. If it becomes excessively long (based on a threshold for example), the examples consolidate the logs by converting TSJs to patch files. Multiple patch files are generated for a long log chain. A log store may keep track of both original TSJs and the converted patch files. Some examples only use the most recent unconverted TSJs along with the converted patch files during mount or recovery.

Figure 24:
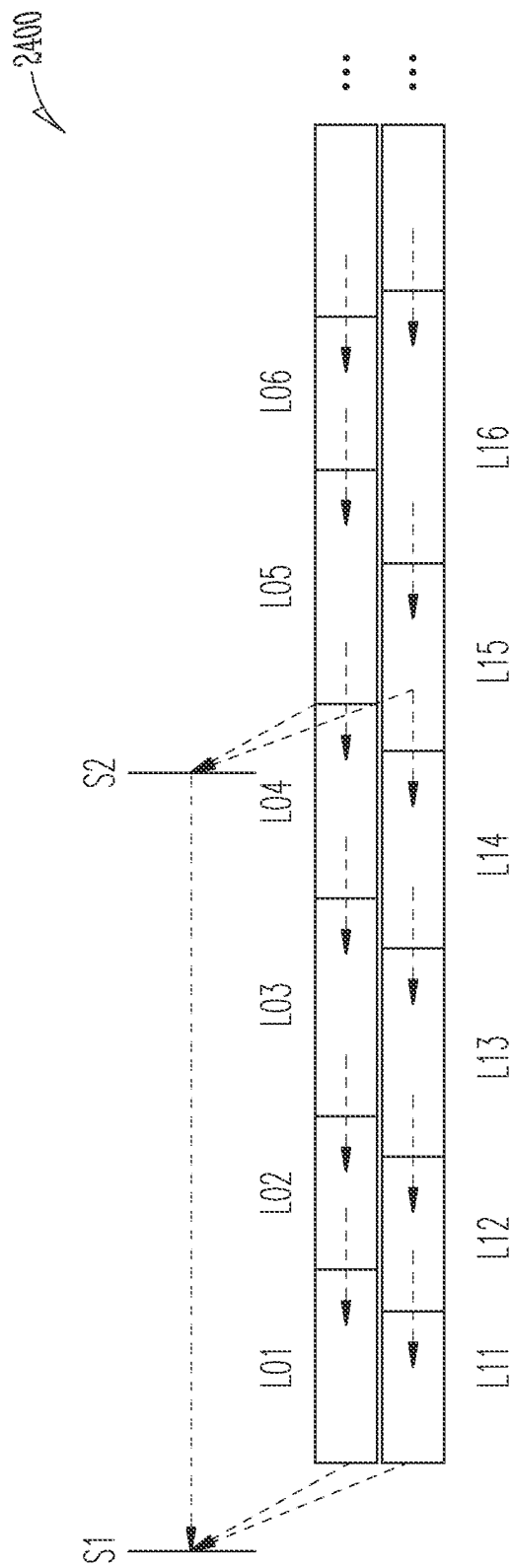

A second option includes periodically scanning the log chain 2300 and converting TSJs to patch files on demand. However, instead of tracking the converted patch files, some examples construct a new snapshot from the converted patch files. This snapshot is added as a new base on the log chains, for example as shown in log chain 2400 in FIG. 24. Snapshot S2 is created as an incremental patch depending on S1. In some examples, the next ingested snapshot (S3) is created based on S2. If that is not possible, both S2 and S3 will be based on S1. The chain 2400 will get diverged and become a differential tree.

Some examples perform log consolidation using a ConsolidateStreamLogs operation which is run per VM and in some examples includes two sub tasks. A first task includes a preparation operation. This operation determines tail logs for each stream source. A tail log is one which no other logs depend on. The log chains (one chain for each stream source) are traversed backward until a common base snapshot is found. A total size is calculated for all log chains from the tail log to the common base snapshot (these are the sub chains that will be used for recovery). If the total size reaches a predefined threshold, the visited logs to be consolidated are saved. The total size is reset, and the preparation operation is repeated from the new base snapshot. The preparation process is terminated if it reaches the head of any log chains.

The first task may also include a stream consolidation operation. This operation, for each stream source, creates an incremental patch based on the current base snapshot, and calls a log converter API to convert the stream logs collected by the preparation operation to the new patch file. For the VM, a new snapshot is created from the patch files generated from the above operations. The constructed snapshot is added as a new base snapshot on the log chains for the given VM.

Figure 25:
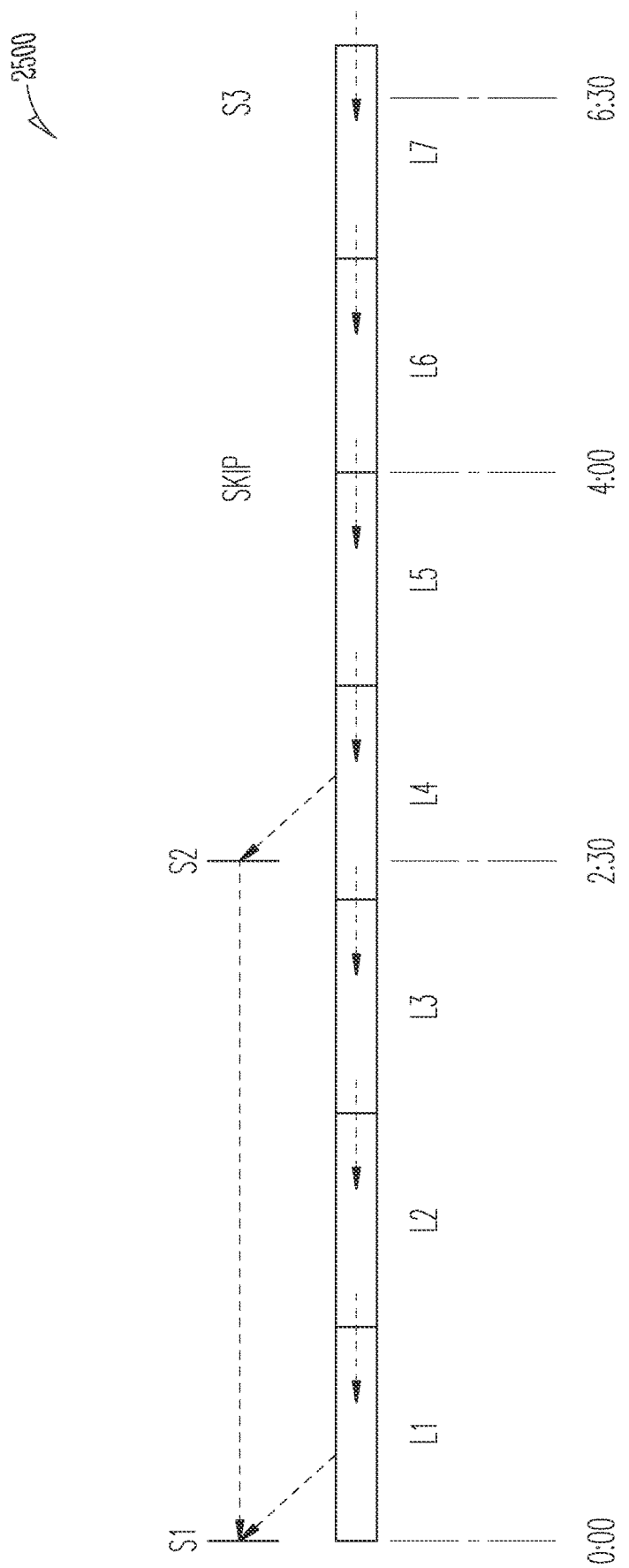

In a second task for avoiding dual ingestion, an existing snapshot ingestion path is disabled, and some examples rely solely on a CDP log stream ingestion path. In some examples, the consolidation operation is enhanced to take the snapshot SLA into account as well. A consolidation operation is scheduled more frequently than or at least equal to an SLA-defined snapshot frequency. Log chains are consolidated and converted to snapshots before the log chain becomes too long. In this case, at lower frequencies, an SLA obligation can be met accordingly. If an SLA snapshot frequency is higher, log consolidation may occur before the SLA obligation is due, for example as shown in the example log chain 2500 in FIG. 25. In this case, SLA is defined to take a snapshot every 4 hours. However, because there are excessive logs (based on a threshold for example), the consolidation operation has constructed a new snapshot S2 at time 2:30. In this event, one option is to skip the snapshot operation scheduled at 4:00 and defer (or reschedule) it to 6:30. An appropriate API may be provided to support conversion of TSJs to a patch file.

Figure 26:
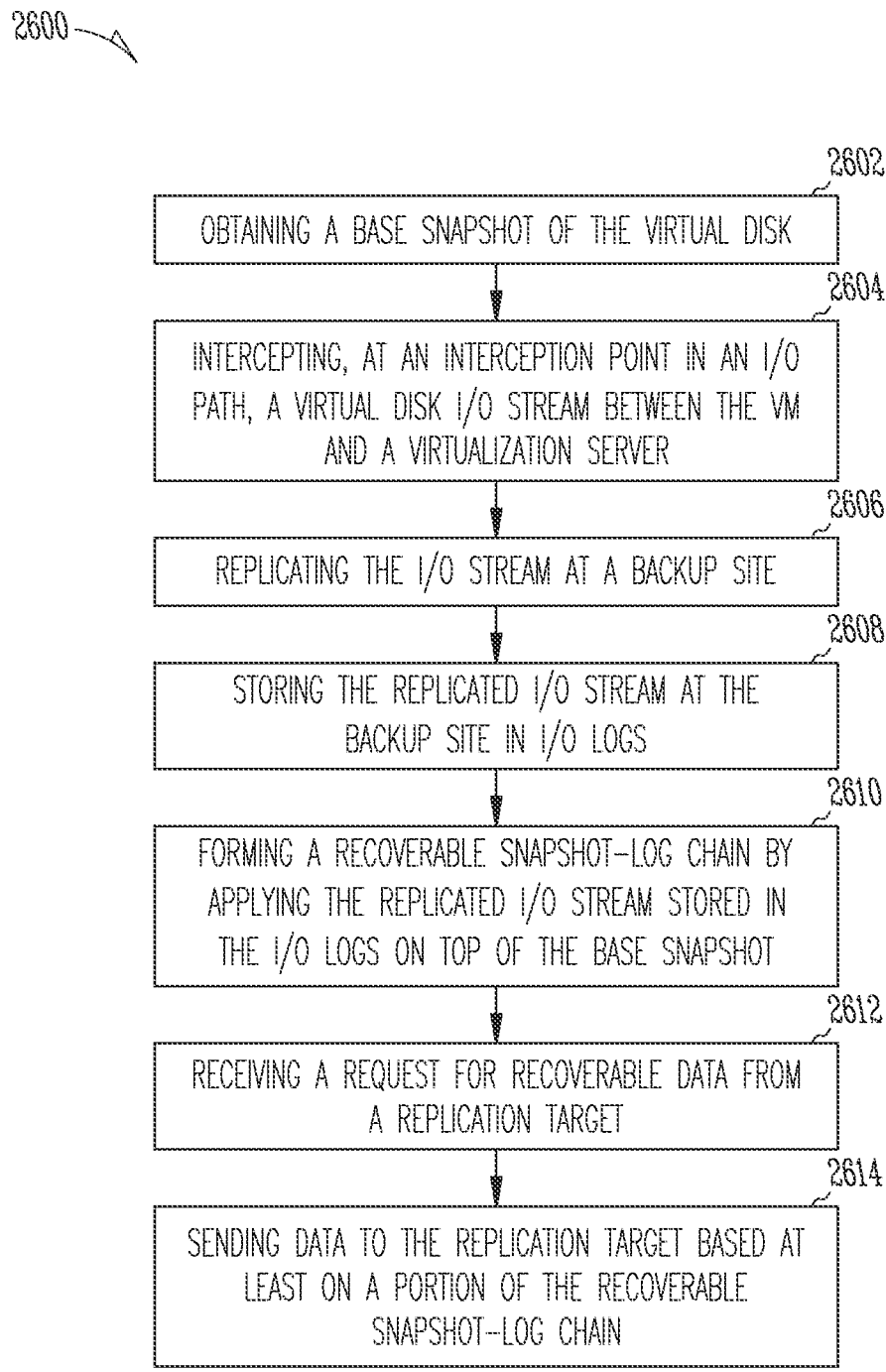
FIGS. 26-31 are flow charts depicting example operations in methods, according to examples.

Thus, some examples of the present disclosure include method examples. With reference to FIG. 26, an example method 2600 for continuous data protection for a virtual machine (VM) having a virtual disk comprises at least the following operations: at 2602, obtaining a base snapshot of the virtual disk; at 2604, intercepting, at an interception point in an I/O path, a virtual disk I/O stream between the VM and a virtualization server; at 2606, replicating the I/O stream at a backup site; at 2608, storing the replicated I/O stream at the backup site in I/O logs; at 2610, forming a recoverable snapshot-log chain by applying the replicated I/O stream stored in the I/O logs on top of the base snapshot; at 2612, receiving a request for recoverable data from a replication target; and at 2614, sending data to the replication target based at least on a portion of the recoverable snapshot-log chain.

The operations in method 2600 may further comprise establishing a filter framework at the interception point, the filter framework including an I/O stack and an I/O filter. The virtualization server may be an ESX hypervisor server and the operations may further comprise including a filter driver for the filter framework within the ESX hypervisor server. The operations may further comprise configuring the filter framework to enable an I/O touch point in the I/O stream. The I/O stream may include an I/O cancellation and the operations further comprise configuring the filter driver to intercept only completed I/Os in the I/O stream using the enabled I/O touch point. The I/O cancellation may be a distributed I/O cancellation and the operations may further comprise managing the distributed I/O cancellation at the I/O stack and not at the I/O filter of the filter framework.

Figure 27:
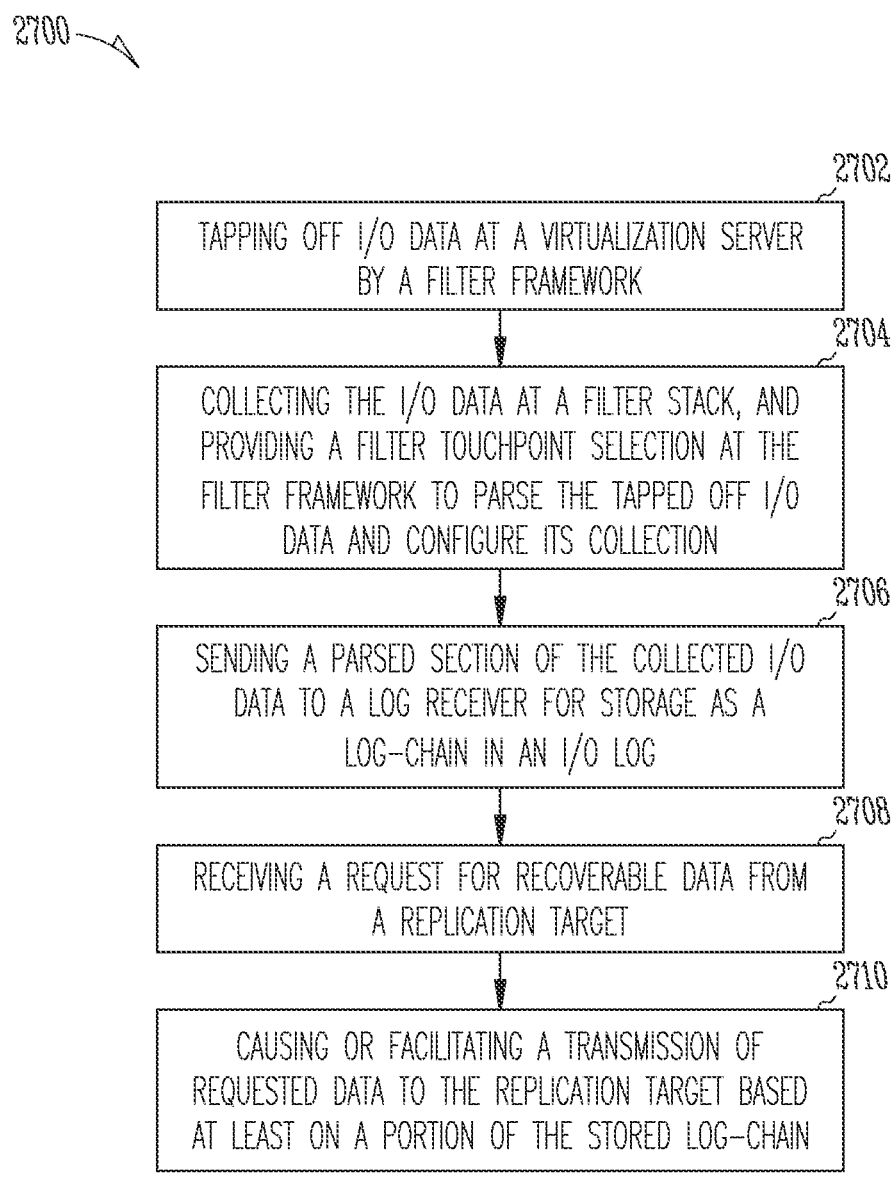

With reference to FIG. 27, an example method 2700 is provided for optimizing a recovery point objective (RPO) in a virtual machine (VM) having a virtual disk. The method 2700 may comprise at least the following operations: at 2702, tapping off I/O data at a virtualization server by a filter framework; at 2704, collecting the I/O data at a filter stack, and providing a filter touchpoint selection at the filter framework to parse the tapped off I/O data and configure its collection; at 2706, sending a parsed section of the collected I/O data to a log receiver for storage as a log-chain in an I/O log; at 2708, receiving a request for recoverable data from a replication target; and at 2710, causing or facilitating a transmission of requested data to the replication target based at least on a portion of the stored log-chain.

The parsed section of the I/O data may include only completed I/O requests exchanged between the VM and the virtualization server. The parsed section of the I/O data may exclude cancelled I/O requests exchanged between the VM and the virtualization server. The operations of method 2700 may further comprise forming a recoverable snapshot-log chain by applying the log-chain to a base snapshot of the virtual disk. The operations may further comprise establishing a network cache for the parsed section of the collected I/O data between the filter framework and the log receiver. The operations may further comprise establishing a cache for the parsed section of the collected I/O data at the log receiver.

Figure 28:
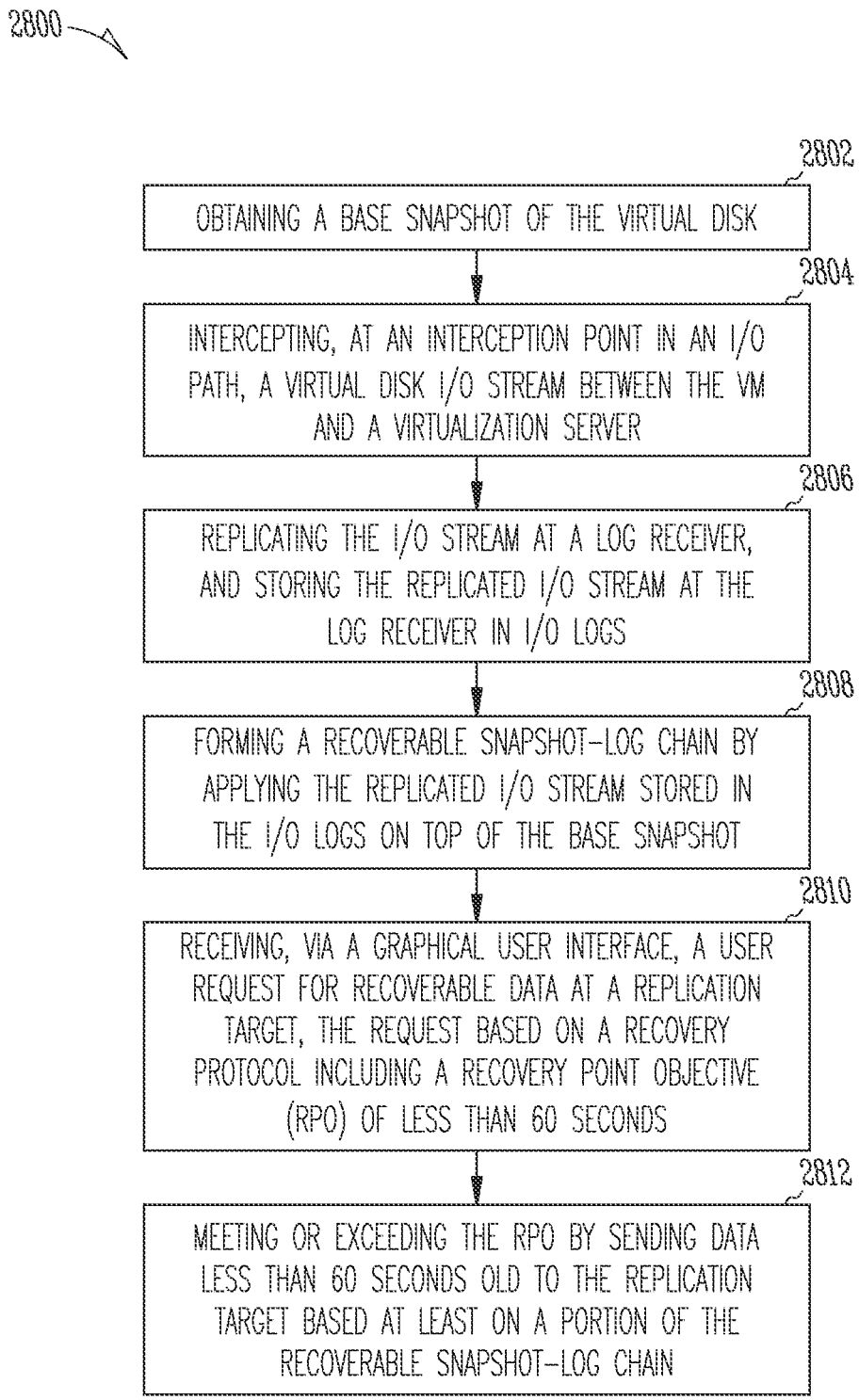

With reference to FIG. 28, an example method 2800 is provided for continuous data protection for a virtual machine (VM) having a virtual disk. The method 2800 may comprise at least the following operations: at 2802, obtaining a base snapshot of the virtual disk, at 2804, intercepting, at an interception point in an I/O path, a virtual disk I/O stream between the VM and a virtualization server; at 2806, replicating the I/O stream at a log receiver, and storing the replicated I/O stream at the log receiver in I/O logs; at 2808, forming a recoverable snapshot-log chain by applying the replicated I/O stream stored in the I/O logs on top of the base snapshot; at 2810, receiving, via a graphical user interface, a user request for recoverable data at a replication target, the request based on a recovery protocol including a recovery point objective (RPO) of less than 60 seconds; and at 2812, meeting or exceeding the RPO by sending data less than 60 seconds old to the replication target based at least on a portion of the recoverable snapshot-log chain.

The operations may further comprise establishing a filter framework at the interception point, the filter framework including an I/O stack and an I/O filter. The virtualization server may be an ESX hypervisor server and the operations may further comprise including a filter driver for the filter framework within the ESX hypervisor server. The operations may further comprise configuring the filter framework to enable an I/O touch point in the I/O stream. The I/O stream may include an I/O cancellation and the operations may further comprise configuring the filter driver to intercept only completed I/Os in the I/O stream using the enabled I/O touch point. The I/O cancellation may be a distributed I/O cancellation and the operations may further comprise managing the distributed I/O cancellation at the I/O stack and not at the I/O filter of the filter framework.

Figure 29:
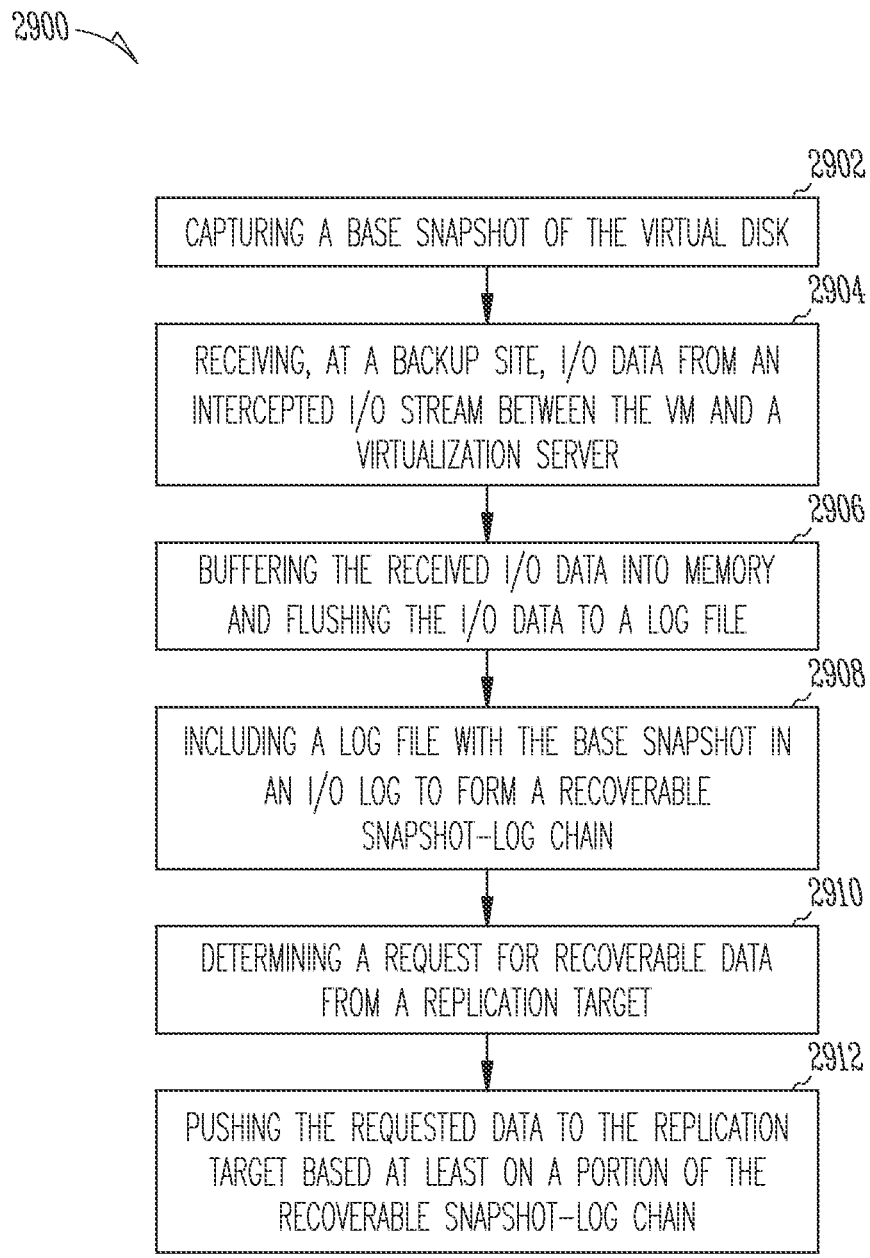

With reference to FIG. 29, an example method 2900 is provided for continuous data protection for a virtual machine (VM) having a virtual disk. The method 2900 may comprise at least the following operations: at 2902, capturing a base snapshot of the virtual disk; at 2904, receiving, at a backup site, I/O data from an intercepted I/O stream between the VM and a virtualization server; at 2906, buffering the received I/O data into memory and flushing the I/O data to a log file; at 2908, including a log file with the base snapshot in an I/O log to form a recoverable snapshot-log chain; at 2910, determining a request for recoverable data from a replication target; and at 2912, pushing the requested data to the replication target based at least on a portion of the recoverable snapshot-log chain.

The operations may further comprise establishing an instance of a log replication sender at the backup site to communicate with a log replication receiver at the replication target. The operations may further comprise configuring the log replication receiver at the replication target to run at an unmodified existing snapshot recovery service. The operations may further comprise configuring a CDP metadata service to communicate with the log replication sender and the log replication receiver. The operations may further comprise configuring the log replication sender to identify a log file to be replicated and, based on the identified log file including a closed file, including the contents of the log file in a closed replication. The operations may further comprise configuring the log replication sender to identify a log file to be replicated and, based on the identified log file including an open file receiving I/O data from the intercepted I/O stream, including the I/O data in a live replication.

Figure 30:
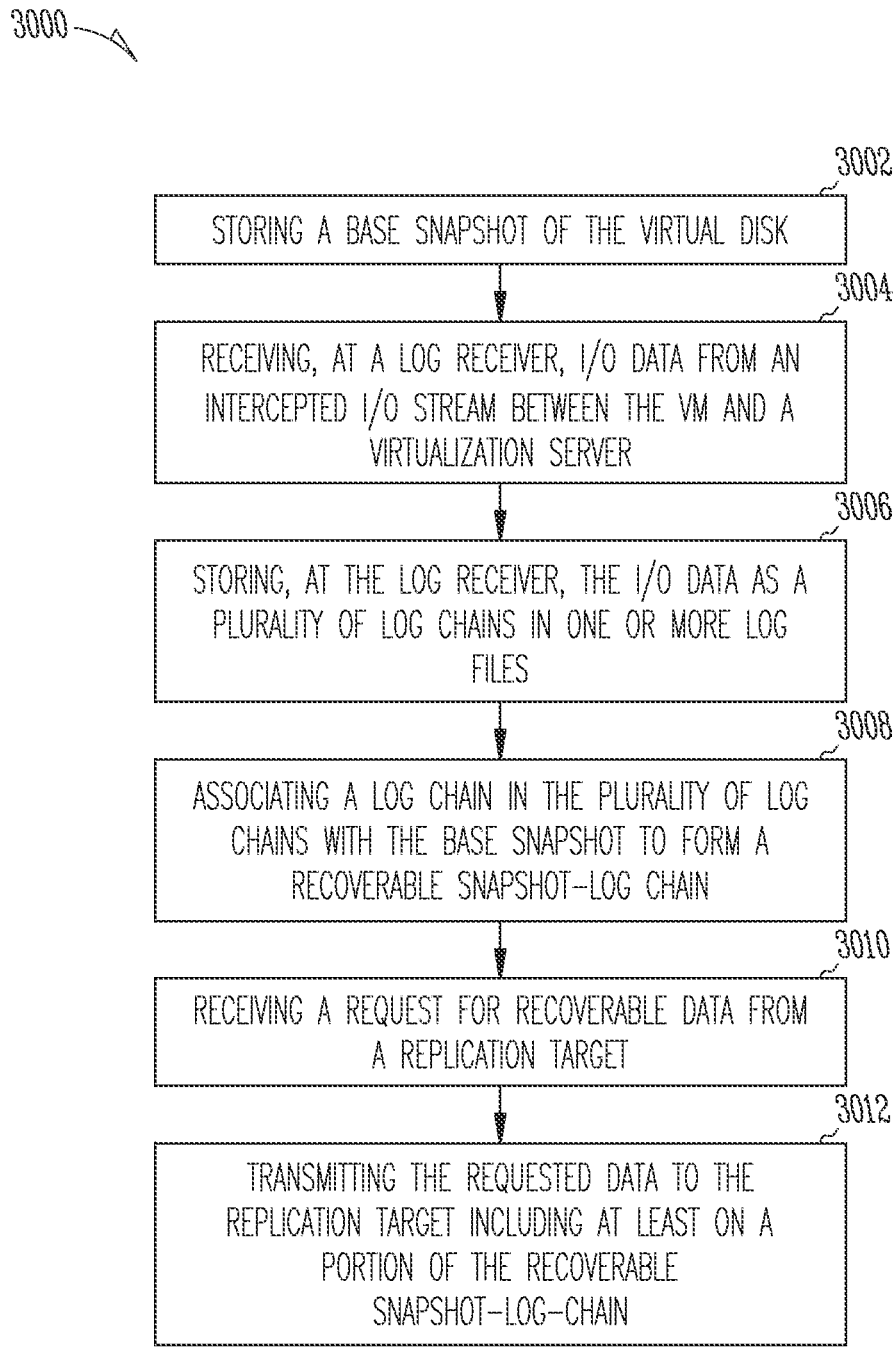

With reference to FIG. 30, an example method 3000 is provided for optimizing a recovery point objective (RPO) for a virtual machine (VM) having a virtual disk. The method 3000 may comprise at least the following operations: at 3002, storing a base snapshot of the virtual disk; at 3004, receiving, at a log receiver, I/O data from an intercepted I/O stream between the VM and a virtualization server; at 3006, storing, at the log receiver, the I/O data as a plurality of log chains in one or more log files, at 3008, associating a log chain in the plurality of log chains with the base snapshot to form a recoverable snapshot-log chain; at 3010, receiving a request for recoverable data from a replication target; and at 3012, transmitting the requested data to the replication target including at least on a portion of the recoverable snapshot-log chain.

The operations may further comprise establishing an instance of a log replication sender at the log receiver to communicate with a log replication receiver at the replication target. The operations may further comprise configuring the log replication receiver at the replication target to run at an unmodified existing snapshot recovery service. The operations may further comprise configuring a CDP metadata service to communicate with the log replication sender and the log replication receiver. The operations may further comprise configuring the log replication sender to identify a log file to be replicated and, based on the identified log file including a closed file, including the contents of the log file in a closed replication. The operations may further comprise configuring the log replication sender to identify a log file to be replicated and, based on the identified log file including an open file receiving I/O data, including the I/O data in a live replication.

Figure 31:
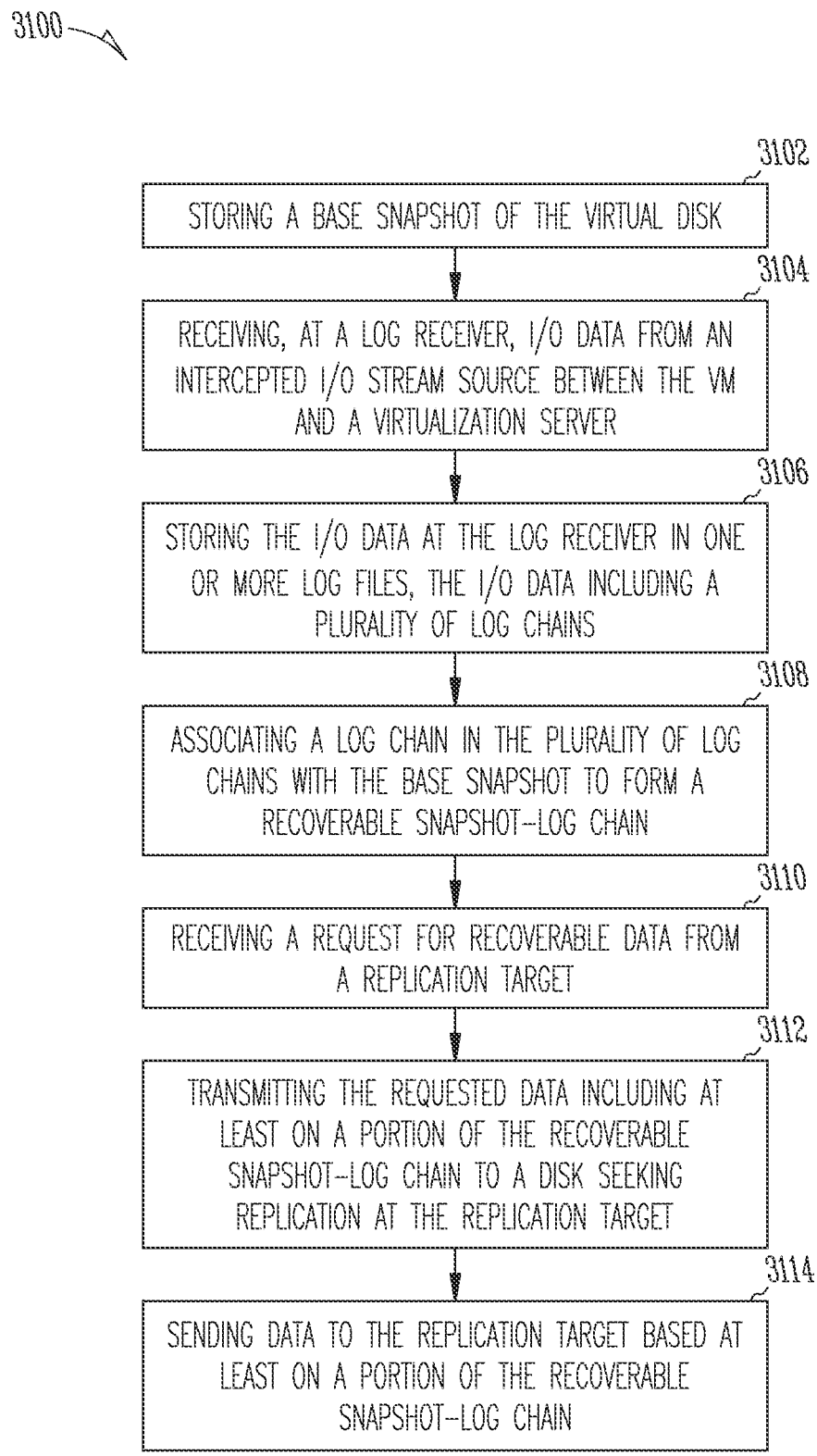

With reference to FIG. 31, an example method 3100 is provided for optimizing a recovery point objective (RPO) for a virtual machine (VM) having a virtual disk. The method 3100 may comprise at least the following operations: at 3102, storing a base snapshot of the virtual disk; at 3104, receiving, at a log receiver, I/O data from an intercepted I/O stream source between the VM and a virtualization server; at 3106, storing the I/O data at the log receiver in one or more log files, the I/O data including a plurality of log chains; at 3108, associating a log chain in the plurality of log chains with the base snapshot to form a recoverable snapshot-log chain; at 3110, receiving a request for recoverable data from a replication target; at 3112, transmitting the requested data including at least on a portion of the recoverable snapshot-log chain to a disk seeking replication at the replication target; and at 3114, sending data to the replication target based at least on a portion of the recoverable snapshot-log chain.

The operations may further comprise establishing a continuous data protection (CDP) metadata service in communication with the log receiver to scan disks seeking replication periodically to determine and assign a replication owner node for the disk seeking replication at the replication target.

The operations may further comprise assigning a worker pool to process each disk seeking replication from the replication owner node. The operations may further comprise configuring the CDP metadata service to communicate with a log replication sender at the log receiver, and a log replication receiver at the replication target. The operations may further comprise configuring a CDP replication orchestrator to identify the I/O stream source from a plurality of I/O stream sources and identify replication metadata including an owner node identification and a claim time. The operations may further comprise configuring the CDP replication orchestrator to identify a next log chain to replicate in a snapshot-log chain replication.

Figure 34:
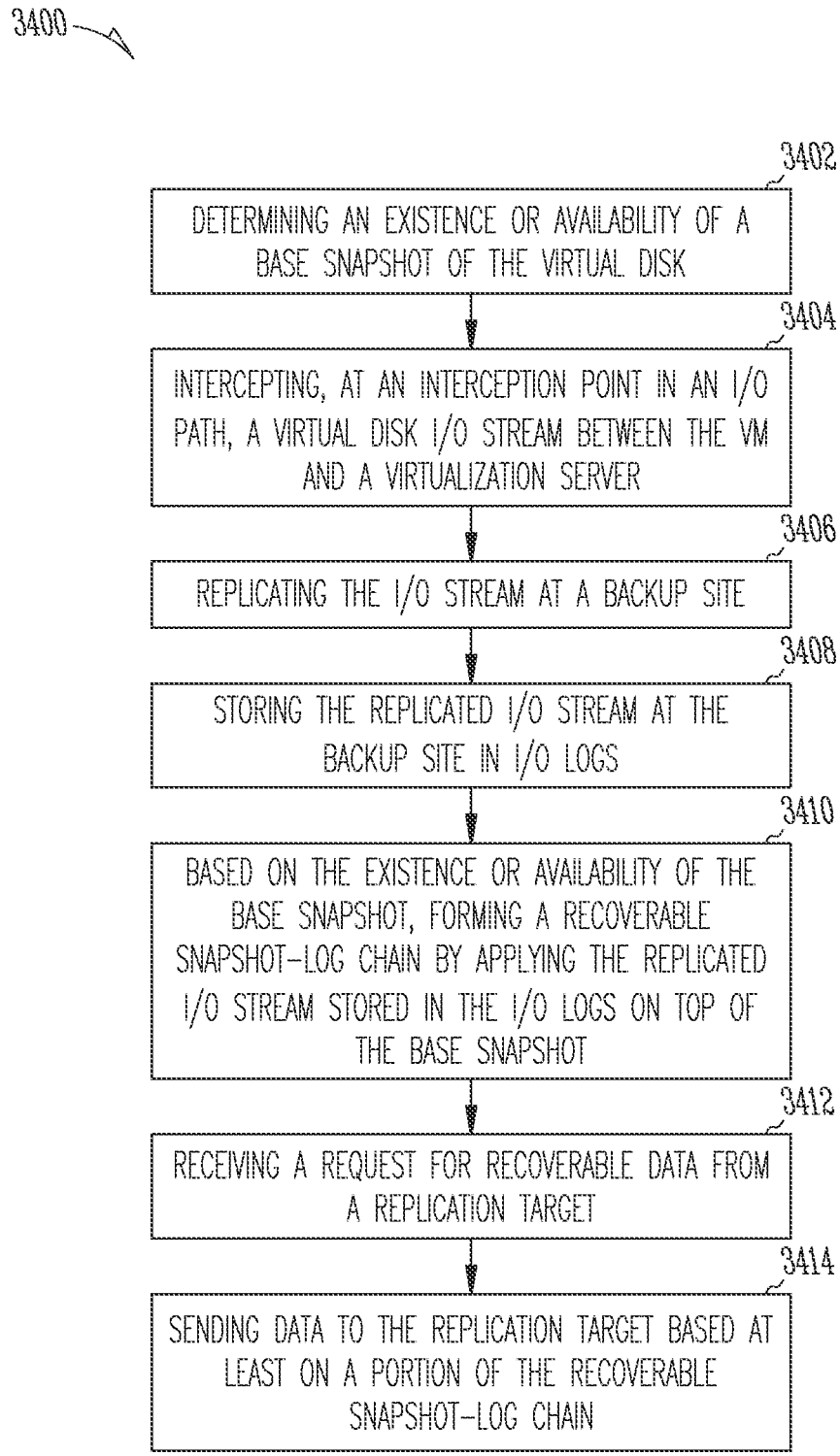
FIGS. 34-37 are flow charts depicting example operations in methods, according to examples.

With reference to FIG. 34, an example method 3400 is provided for continuous data protection for a virtual machine (VM) having a virtual disk, the method 3400 comprising at least the following operations: at 3402, determining an existence or availability of a base snapshot of the virtual disk; at 3404, intercepting, at an interception point in an I/O path, a virtual disk I/O stream between the VM and a virtualization server; at 3406, replicating the I/O stream at a backup site; at 3408, storing the replicated I/O stream at the backup site in I/O logs; at 3410, based on the existence or availability of the base snapshot, forming a recoverable snapshot-log chain by applying the replicated I/O stream stored in the I/O logs on top of the base snapshot; at 3412, receiving a request for recoverable data from a replication target; and at 3414, sending data to the replication target based at least on a portion of the recoverable snapshot-log chain.

Figure 35:
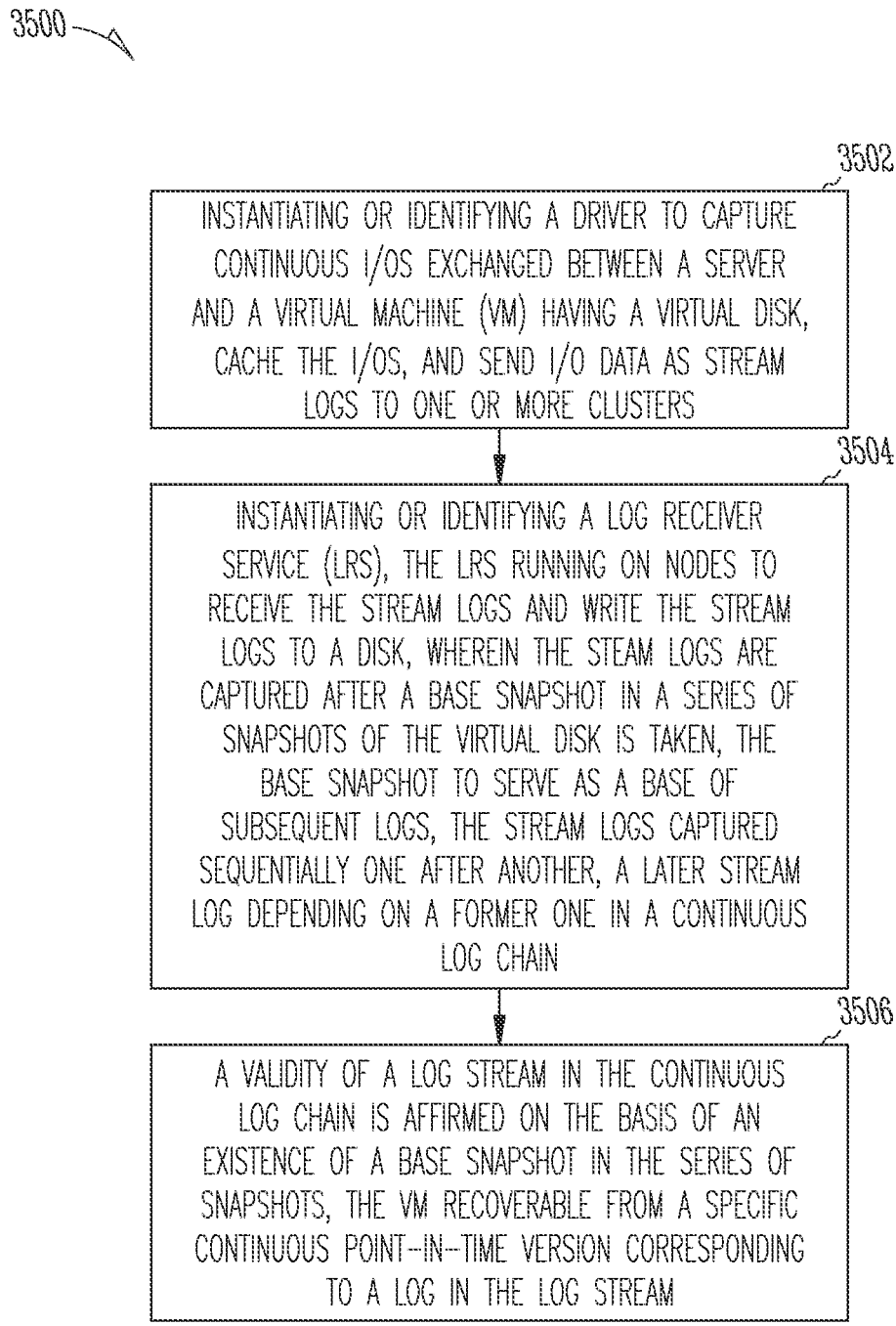

With reference to FIG. 35, an example method 3500 is provided for establishing a system for continuous data protection, the method 3500 including operations comprising, at least: at 3502, instantiating or identifying a driver to capture continuous I/Os exchanged between a server and a virtual machine (VM) having a virtual disk, cache the I/Os, and send I/O data as stream logs to one or more clusters; at 3504, instantiating or identifying a log receiver service (LRS), the LRS running on nodes to receive the stream logs and write the stream logs to a disk, wherein the steam logs are captured after a base snapshot in a series of snapshots of the virtual disk is taken, the base snapshot to serve as a base of subsequent logs, the stream logs captured sequentially one after another, a later stream log depending on a former one in a continuous log chain; and wherein, at 3506, a validity of a log stream in the continuous log chain is affirmed on the basis of an existence of a base snapshot in the series of snapshots, the VM recoverable from a specific continuous point-in-time version corresponding to a log in the log stream.

Figure 36:
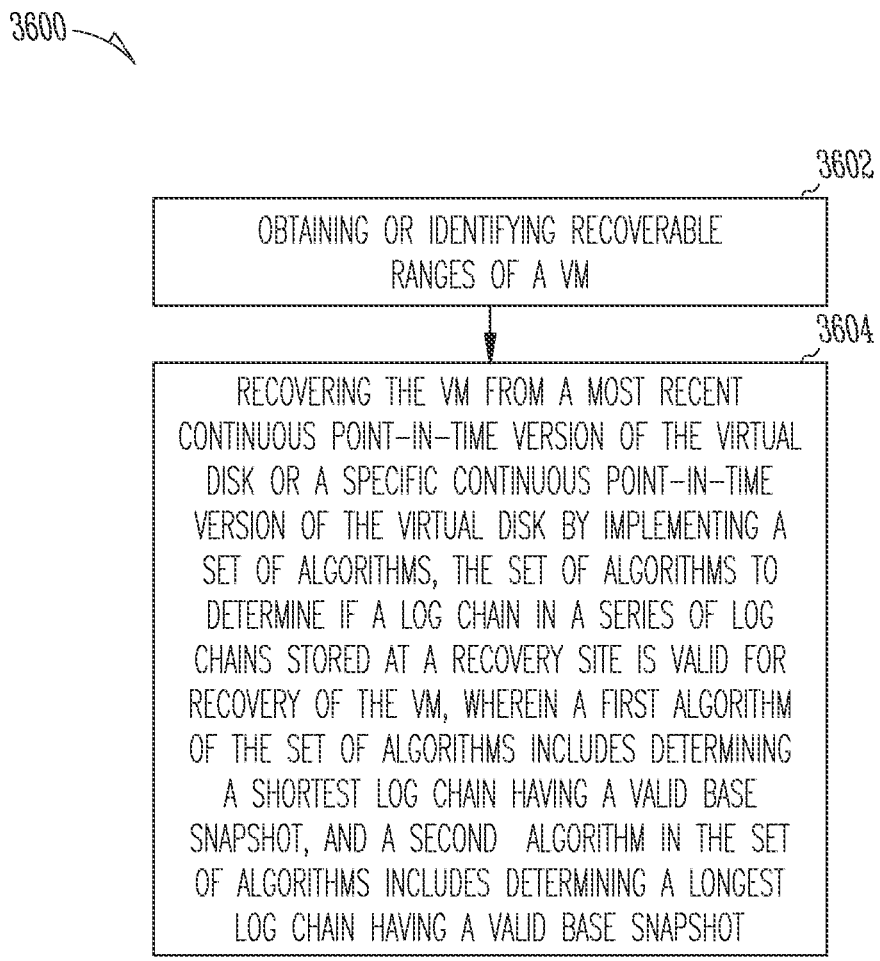

With reference to FIG. 36, an example method 3600 is provided for continuous data protection for a virtual machine (VM) having a virtual disk, the method 3600 comprising at least the following operations: at 3602, obtaining or identifying recoverable ranges of a VM; and at 3604, recovering the VM from a most recent continuous point-in-time version of the virtual disk or a specific continuous point-in-time version of the virtual disk by implementing a set of algorithms, the set of algorithms to determine if a log chain in a series of log chains stored at a recovery site is valid for recovery of the VM, wherein a first algorithm of the set of algorithms includes determining a shortest log chain having a valid base snapshot, and a second algorithm in the set of algorithms includes determining a longest log chain having a valid base snapshot.

Figure 37:
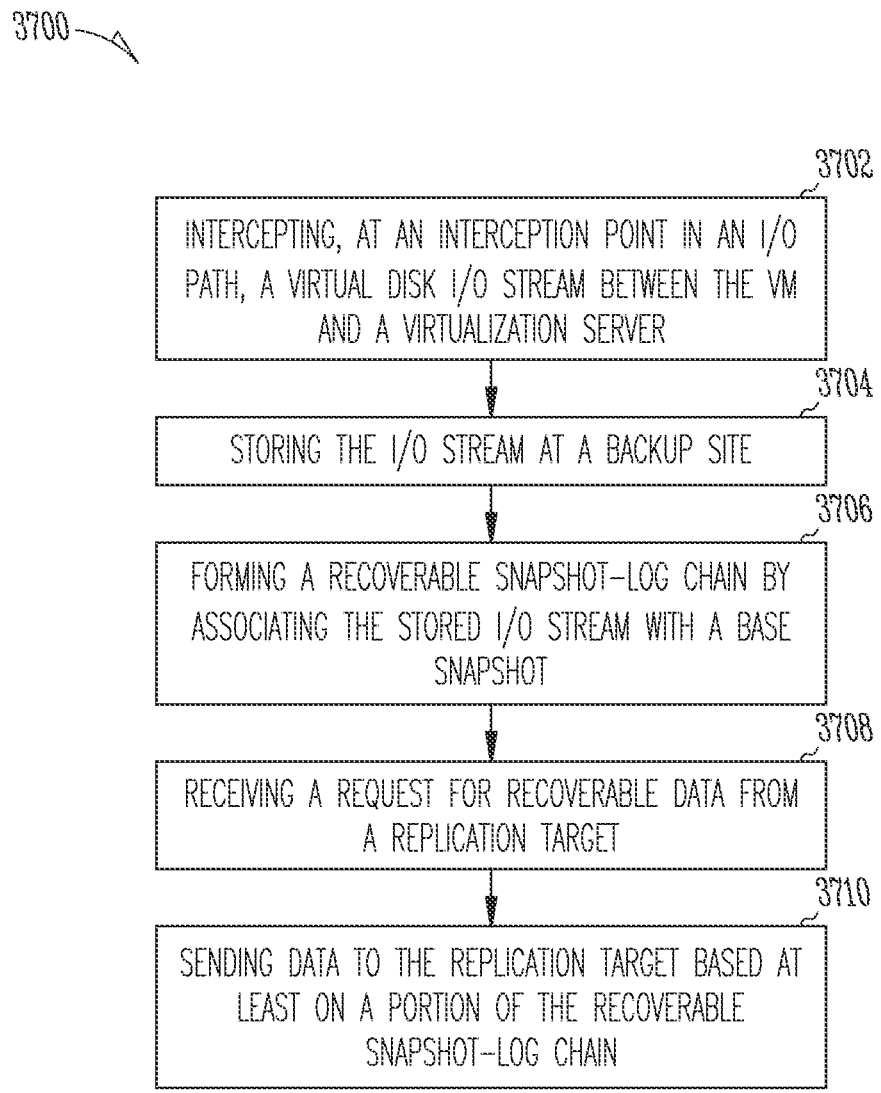

With reference to FIG. 37, an example method 3700 is provided for continuous data protection for a virtual machine (VM) having a virtual disk, the method 3700 comprising at least the following operations: at 3702, intercepting, at an interception point in an I/O path, a virtual disk I/O stream between the VM and a virtualization server; at 3704, storing the I/O stream at a backup site; at 3706, forming a recoverable snapshot-log chain by associating the stored I/O stream with a base snapshot; at 3708, receiving a request for recoverable data from a replication target; and, at 3710, sending data to the replication target based at least on a portion of the recoverable snapshot-log chain.

Some examples include systems as summarized further above, or specifically described herein, that include processors configured to perform one or more of the method operations summarized above or described herein. Some examples also include non-transitory machine-readable media that include instructions for performing one or more of the method operations summarized above or described herein.

Ransomware Detection

As mentioned above, a Network Attached Storage (NAS) system is a storage device connected to a network that allows storage and retrieval of data from a centralized location for authorized network users and heterogeneous clients. Most NAS filers provide a method to generate audit events whenever files on a shared folder are created, read, written, or deleted. Examples of the present disclosure capture, de-duplicate ("de-dupe"), and analyze these file system audit events to identify anomalous activity such as ransomware, insider-threats (e.g., actions of a rogue employee), and misappropriation of credentials.

Figure 38:
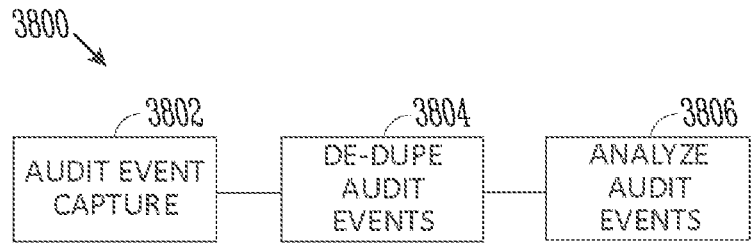
FIG. 38 depicts a block flow chart indicating example operations in a method of the present disclosure, according to an example.

Viewed broadly, FIG. 38 provides a block flow chart indicating example steps in a method 3800 of the present disclosure to detect ransomware or other anomalies in a file system of the type described further above with reference to FIG. 1, for example. An NAS device may be included in a storage device, for example a storage device 156 described above. The storage device 156 may generate audit events. At operation 3802, an audit event is captured by implementing a file system auditing configuration on one or more NAS filers and setting an appropriate audit policy on the files and folders within the file system stored in the storage device 156. Operation 3802 generates audit events including user-log or file system metadata information such as user ID, file name, type of access and timestamp. At operation 3804, a de-dupe operation is performed. For example, in this regard a typical enterprise may see tens of millions of file access events every day, but some examples of the present disclosure seek to identify only a unique, specific, or pattern of access to a file by a user in the course of detecting an anomalous event. De-duplication logic associated with operation 3804 filters out similar information (e.g., same user ID, same file) to reduce the subsequent audit event load in operation 3806. At operation 3806, an analysis audit of the de-duped events may be performed based on certain heuristics to detect anomalous events in the files or folders in the file system.

Example heuristics or problem-solving techniques may include the following. A ransomware attack typically encrypts copies of all of a user's files and deletes the unencrypted original files. An example heuristic to detect this activity is to track audit event metadata over time and watch for a large number of file deletions occurring in a short period of time. Similarly, insider threats (also termed system threats herein) such as damaging actions of a disgruntled employee or the copying of many files before departure, can be detected by noticing a spike in the number of files read (copied) in a short period of time. The misappropriation of credentials can be detected by comparing a normal pattern of user file access with a sudden and large number of new files accessed within a short period of time. Other examples identify file access at odd (abnormal, or unexpected) hours of the day, for example outside office hours. Access to or the misappropriation of credentials may be flagged in some examples based on an anomaly in both file reads per user and unusual access times.

Referring again to FIG. 38, further example aspects of the de-dupe operation 3804 are now described. In some examples, a finite state machine de-dupes file system audit events for use in data governance and anomaly detection. An example finite state machine may be constituted by or include an audit event object store. The finite state machine may be included in the data management system 102 described above. A typical user editing a Word document within the system files or folders for example may generate many write or read events as the user edits the document. Examples of the present disclosure are interested only in the fact that the user edited the document once within a given timeframe and each of the additional audit events which repeat this information is unnecessary for purposes of detecting anomalies of the type described herein, such as the real-time detection of ransomware. The focus on an individual audited event within a given timeframe helps to reduce noise and the great number of audit events that the finite state machine would otherwise have to store and process.

Figure 39:
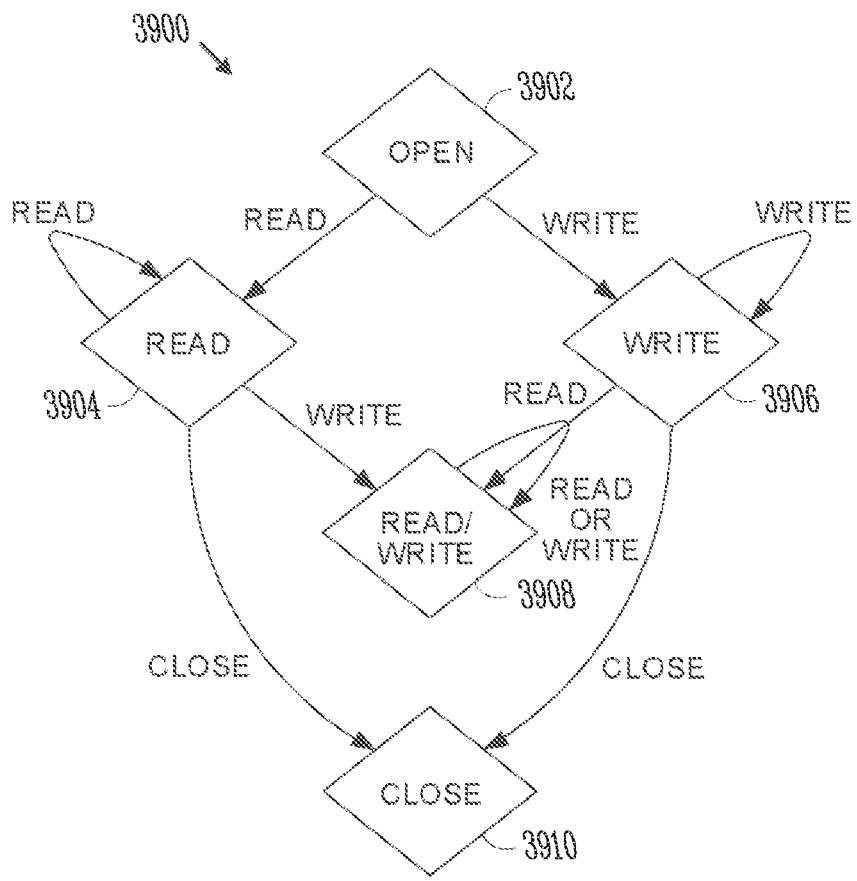
FIG. 39 illustrates example aspects of a de-duplication operation, according to an example.

A state map 3900 is maintained depicting a state of the finite state machine. An example state map 3900 may perform state mapping and store or include a (user_id, file_path) state of a file. An example file may include the Word document discussed in the example above. A state map 3900 of the file may be represented in real-time in the finite state machine as shown in FIG. 39 and include example states such as file open state 3902, a file read state 3904, a file write state 3906, a file read/write state 3908, and a file close state 3910. The file states 3902-3910 may be memorialized or stored by the data management system 102 in a key-value object store.

In some examples, the de-dupe operation 3804 occurs in the (read, write, read/write) states as follows. Once a (user_id, file_name) enters any of the states, successive events that do not lead to a change in state will be de-duped. For example, if the system has seen (userX, fileY) ⇒ {open, read} events followed by another read event, the second read event and any succeeding read events will be de-duped because the (user_id, file_path) does not advance to another state in the finite state machine.

There is some information value if the same (user_id, file_path) ⇒ {open, read} state event occurs many hours apart, for example, as the file could have changed in the interim. In some examples, the de-dupe logic is therefore relaxed to de-dupe events only occurring within a relatively short period of time, for example, 15 minutes or 1 hour as may be configured by a user. Other time periods are possible. In some examples, a clean state map 3900 may be started after every 15 minutes or 1-hour time period, respectively.

Further example aspects of the analysis audit operation 3806 are now described. In some examples, detected anomalies include ransomware, insider threat and the misappropriation (or mere existence) of credentials. Some examples of the present disclosure apply Seasonal-Trend Decomposition Procedure Based on Loess (STL) decomposition to remove seasonal and trend components and use the residue to detect anomalies. STL is a filtering procedure for decomposing a time series into trend, seasonal, and remainder components. STL has a simple design that includes a sequence of applications of the Loess smoother. The simplicity allows analysis of the properties of a procedure and allows fast computation, even for longtime series and high levels of trend and seasonal smoothing. Other features of STL allow the specification of amounts of seasonal and trend smoothing that may range in a nearly continuous way from a very small amount of smoothing to a very large amount of smoothing. STL also allows robust estimates of the trend and seasonal components that are not distorted by aberrant behavior in the data, the specification of the period of the seasonal component to any integer multiple of the time sampling interval greater than one, and the ability to decompose time series with missing values.

Some examples of the present disclosure apply an Exploratory Data Analysis (ESD) test to detect outliers (or anomalies). An outlier may be an observation that deviates so much from other observations as to arouse suspicions that it was generated by a different mechanism. An outlier may point to the existence of ransomware, insider threat or the misappropriation (or mere existence) of credentials In some examples, the STL decomposition and/or ESD test may be used to generate time series data for the purpose of detecting anomalous user activity using certain features. An example feature may include a file delete. Here, an example may count the number of file deletes per user every day and collect this count for a month to generate the time series data. Other time periods are possible. The example may limit file deletes to human-readable files such as Word documents, Excel files, PDF files, source code files and the like, and ignore machine-generated files such as XML, JSON, and so forth.

A further example feature may include a file read. Here, an example may count the number of unique file reads on a per user basis every day and collect this count over one month to generate the time series data. Other time periods are possible. Another example feature may include an access time. Here, an example may generate two (or more) time series by counting file accesses per user on hourly and daily basis over a month. Other time periods are possible. An example time series may show non-zero values during normal business hours and zero (or very low) values during weekends and off-peak hours. An example may flag detection of an anomaly on a positive deviation from a time series (i.e., the observed value is greater than the historical count, not less). This approach seeks to filter out inactivity due to holidays, paid time off and so forth. A deviation from this observed behavior can be flagged as an anomaly. Some examples may declare a ransomware attack based on an anomaly in the count of file deletes as discussed above. Some examples may flag an insider threat based on an anomaly in file reads per user. Access to or the misappropriation of credentials may be flagged in some examples based on an anomaly in both file reads per user and unusual access times.

Figure 40:
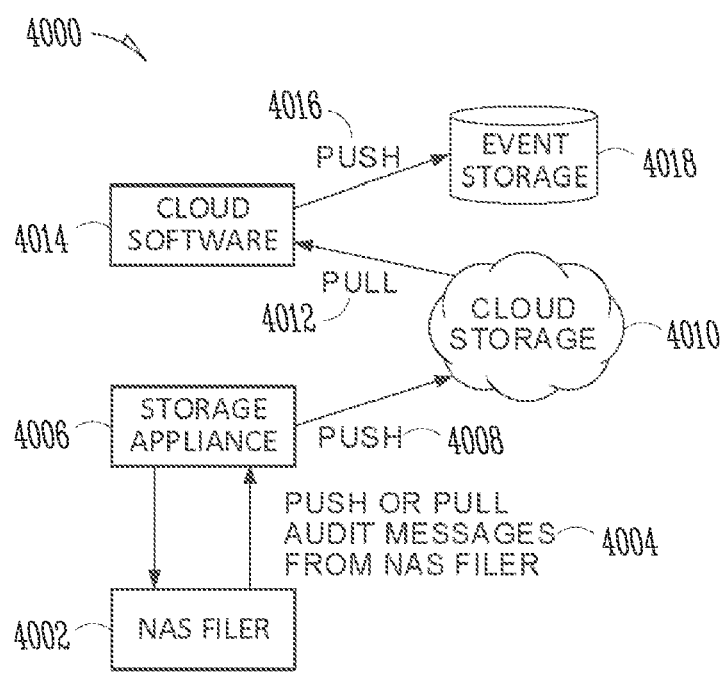
FIG. 40 illustrates a data pipeline, according to an example.

FIG. 40 illustrates a data pipeline 4000 according to an example. The data pipeline 4000 includes an NAS filer 4002. The data may include audit messages or events. As mentioned above, a Network Attached Storage (NAS) system is a storage device connected to a network that allows storage and retrieval of data from a centralized location for authorized network users and heterogeneous clients. Most NAS filers provide a method to generate audit events whenever files on a shared folder are created, read, written, or deleted. Examples of the present disclosure capture, de-duplicate ("de-dupe"), and analyze these file system audit events to identify anomalous activity such as ransomware, insider-threats (e.g., actions of a rogue employee), and misappropriation of credentials.

In the illustrated data pipeline 4000, at operation 4004 a storage appliance 4006 pushes or pulls audit messages to or from the NAS filer 4002. At operation 4008, the storage appliance 4006 pushes data to a cloud storage 4010. At operation 4012, cloud software 4014 pulls data from the cloud storage 4010. At operation 4016, the cloud software 4014 pushes data to an event store 4018. The event store 4018 may include a finite state machine constituted by or including an audit event object store.

Figure 41:
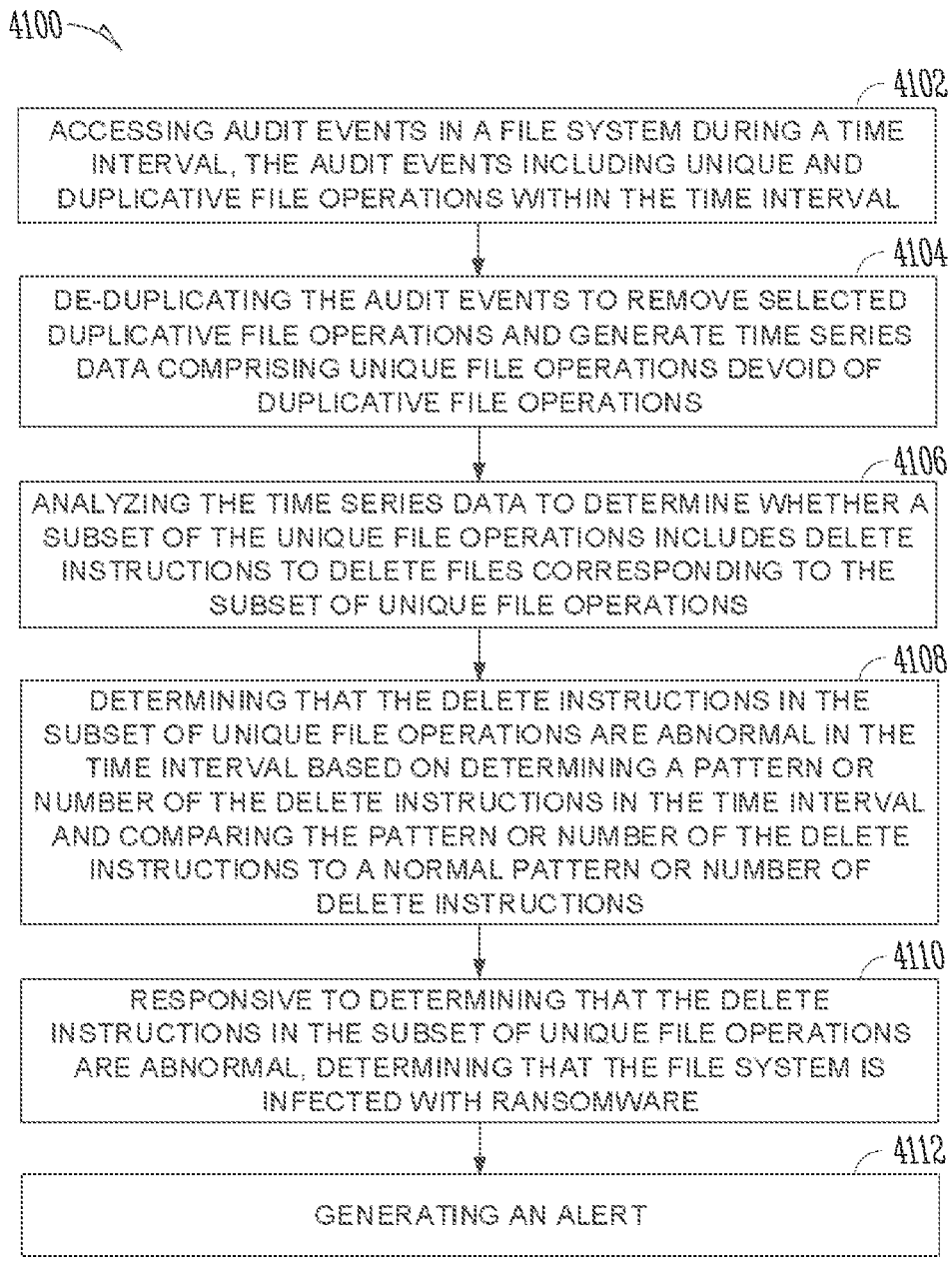
FIGS. 41-43 depict block flow charts indicating example operations in methods of the present disclosure, according to examples.

Some examples of the present disclosure include methods. With reference to FIG. 41, an example method 4100 for the real-time detection of ransomware may include, at operation 4102, accessing audit events in a file system during a time interval, the audit events including unique and duplicative file operations within the time interval; at operation 4104, de-duplicating the audit events to remove selected duplicative file operations and generate time series data comprising unique file operations devoid of duplicative file operations; at operation 4106, analyzing the time series data to determine whether a subset of the unique file operations includes delete instructions to delete files corresponding to the subset of unique file operations; at operation 4108, determining that the delete instructions in the subset of unique file operations are abnormal in the time interval based on determining a pattern or number of the delete instructions in the time interval and comparing the pattern or number of the delete instructions to a normal pattern or number of delete instructions; at 4110, responsive to determining that the delete instructions in the subset of unique file operations are abnormal, determining that the file system is infected with ransomware; and, at operation 4112, generating an alert.

In some examples, the audit events include information comprising, for each audit event, a user ID, a file name, a type of access, and a timestamp.

In some examples, the method 4100 further comprises determining whether the subset of the file operations includes instructions to encrypt copies of the deleted files corresponding to the subset of file operations, and to delete the unencrypted original files.

In some examples, the selection of duplicative file operations for removal in the de-duplication of the audit events is based at least in part on an identification of successive file operations that do not lead to a change in a file state.

In some examples, the method 4100 further comprises generating a finite state machine including one or more file states, the file states including a file open state, a file read state, a file write state, a file read/write state, and a file close state; and storing the file states in the finite state machine in a key value object store.

In some examples, determining whether the delete instructions in the subset of the file operations files are abnormal comprises applying a set of machine learning models to the audit events, the set of machine learning models trained to determine the pattern or number of the file operations and to compare the pattern or number of the file operations to the normal pattern or number based on features representing a normal or expected behavior of the file system.

In some examples, de-duplicating the audit events includes maintaining a file system state based on the finite state machine.

In some examples, determining that the delete instructions in the subset of the file operations are abnormal comprises applying Seasonal-Trend Decomposition Procedure Based on Loess (STL) decomposition to file delete audit events to remove seasonal and trend components and using a residue of the decomposition to generate the time series data, and performing an Exploratory Data Analysis (ESD) test on the time series data.

Figure 42:
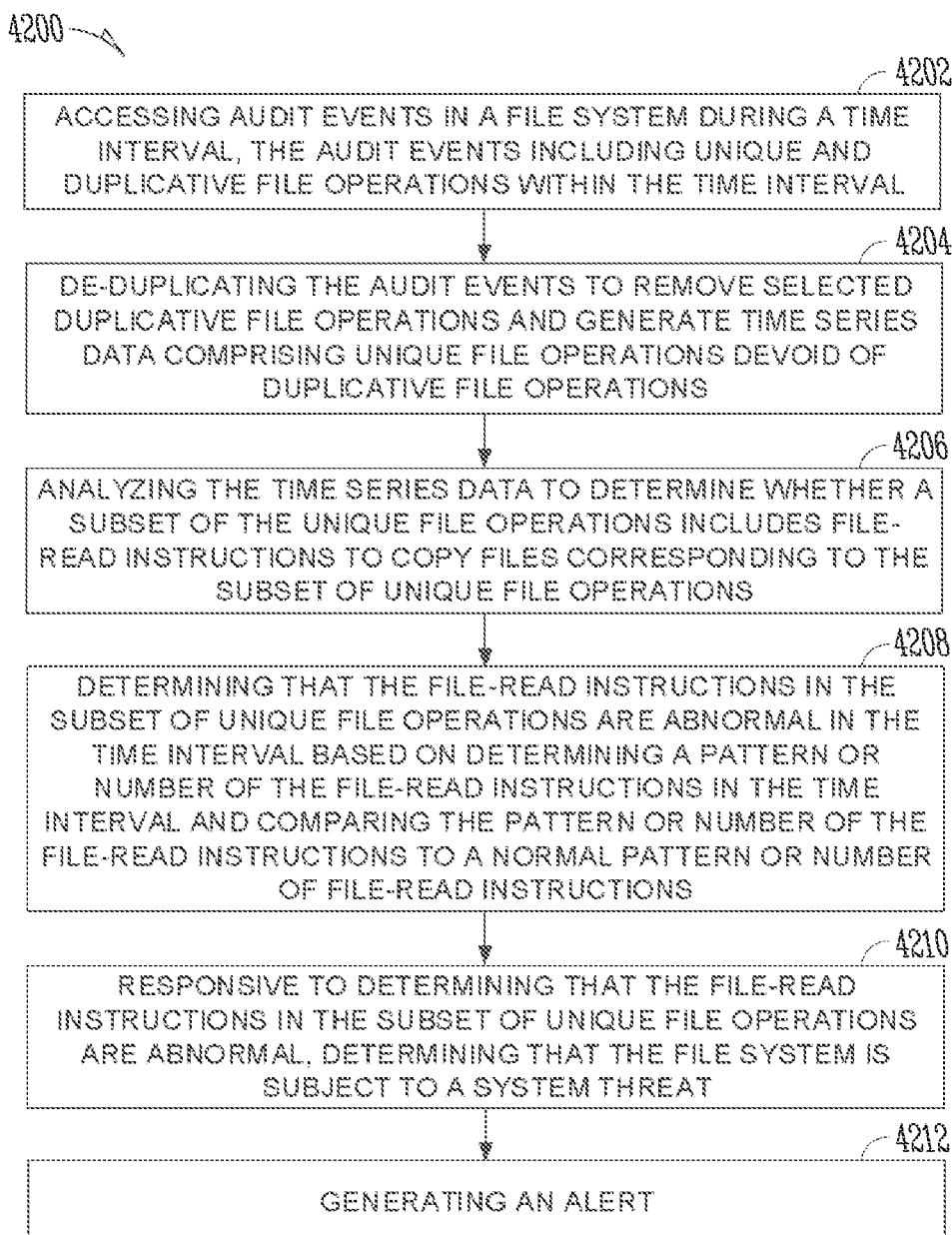

With reference to FIG. 42, an example method 4200 for the real-time detection of an anomaly in file systems relating to a potential system threat, may include, at operation 4202, accessing audit events in a file system during a time interval, the audit events including unique and duplicative file operations within the time interval; at operation 4204, de-duplicating the audit events to remove selected duplicative file operations and generate time series data comprising unique file operations devoid of duplicative file operations; at operation 4206, analyzing the time series data to determine whether a subset of the unique file operations includes file-read instructions to copy files corresponding to the subset of unique file operations; at operation 4208, determining that the file-read instructions in the subset of unique file operations are abnormal in the time interval based on determining a pattern or number of the file-read instructions in the time interval and comparing the pattern or number of the file-read instructions to a normal pattern or number of file-read instructions; at operation 4210, responsive to determining that the file-read instructions in the subset of unique file operations are abnormal, determining that the file system is subject to a system threat; and at operation 4212, generating an alert.

In some examples, the audit events include information comprising, for each audit event, a user ID, a file name, a type of access, and a timestamp.

In some examples, the selection of duplicative file operations for removal in the de-duplication of the audit events is based at least in part on an identification of successive file operations that do not lead to a change in a file state.

In some examples, the method 4200 further comprises generating a finite state machine including one or more file states, the file states including a file open state, a file read state, a file write state, a file read/write state, and a file close state: and storing the file states in the finite state machine in a key-value object store.

In some examples, determining whether the file-read instructions in the subset of the file operations files are abnormal comprises applying a set of machine learning models to the audit events, the set of machine learning models trained to determine the pattern or number of the file operations and to compare the pattern or number of the file operations to the normal pattern or number based on features representing a normal or expected behavior of the file system.

In some examples, de-duplicating the audit events includes maintaining a file system state based on the finite state machine.

In some examples, determining that the file-read instructions in the subset of the file operations are abnormal comprises applying Seasonal-Trend Decomposition Procedure Based on Loess (STL) decomposition to file delete audit events to remove seasonal and trend components and using a residue of the decomposition to generate the time series data, and performing an Exploratory Data Analysis (ESD) test on the time series data.

Figure 43:
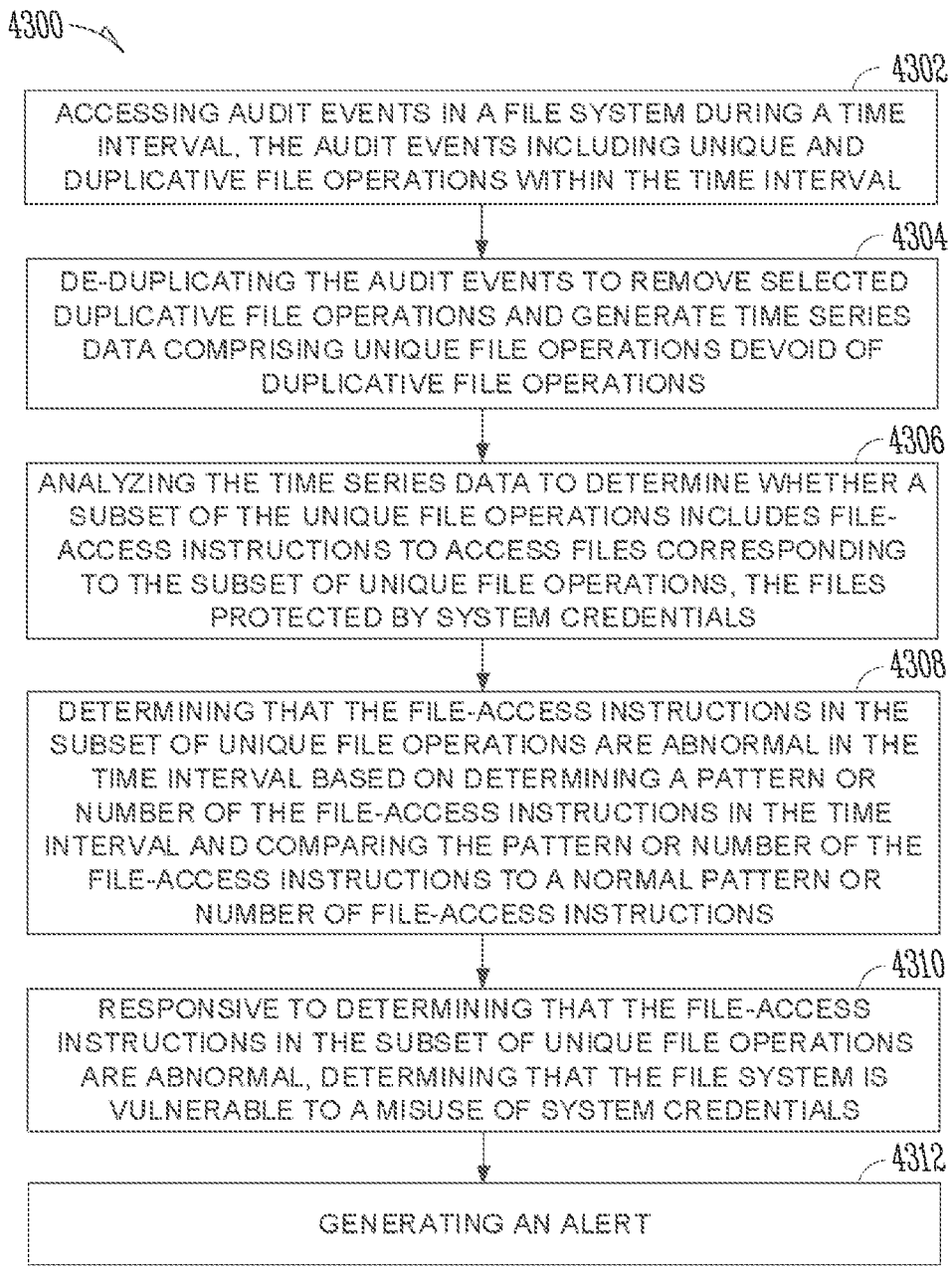

With reference to FIG. 43, an example method 4300 for the real-time detection of an anomaly in file systems relating to a potential misuse of system credentials may include, at operation 4302, accessing audit events in a file system during a time interval, the audit events including unique and duplicative file operations within the time interval; at operation 4304, de-duplicating the audit events to remove selected duplicative file operations and generate time series data comprising unique file operations devoid of duplicative file operations; at operation 4306, analyzing the time series data to determine whether a subset of the unique file operations includes file-access instructions to access files corresponding to the subset of unique file operations, the files protected by system credentials; at operation 4308, determining that the file-access instructions in the subset of unique file operations are abnormal in the time interval based on determining a pattern or number of the file-access instructions in the time interval and comparing the pattern or number of the file-access instructions to a normal pattern or number of file-access instructions; at operation 4310, responsive to determining that the file-access instructions in the subset of unique file operations are abnormal, determining that the file system is vulnerable to a misuse of system credentials; and, at operation 4312, generating an alert.

In some examples, the audit events include information comprising, for each audit event, a user ID, a file name, a type of access, and a timestamp.

In some examples, the selection of duplicative file operations for removal in the de-duplication of the audit events is based at least in part on an identification of successive file operations that do not lead to a change in a file state.

In some examples, the method 4300 further comprises generating a finite state machine including one or more file states, the file states including a file open state, a file read state, a file write state, a file read/write state, and a file close state; and storing the file states in the finite state machine in a key value object store.

In some examples, determining whether the file-read instructions in the subset of the file operations files are abnormal comprises applying a set of machine learning models to the audit events, the set of machine learning models trained to determine the pattern or number of the file operations and to compare the pattern or number of the file operations to the normal pattern or number based on features representing a normal or expected behavior of the file system.

In some examples, de-duplicating the audit events includes maintaining a file system state based on the finite state machine.

In some examples, determining that the file-access instructions in the subset of the file operations are abnormal comprises applying Seasonal-Trend Decomposition Procedure Based on Loess (STL) decomposition to file delete audit events to remove seasonal and trend components and using a residue of the decomposition to generate the time series data, and performing an Exploratory Data Analysis (ESD) test on the time series data.

Figure 44:
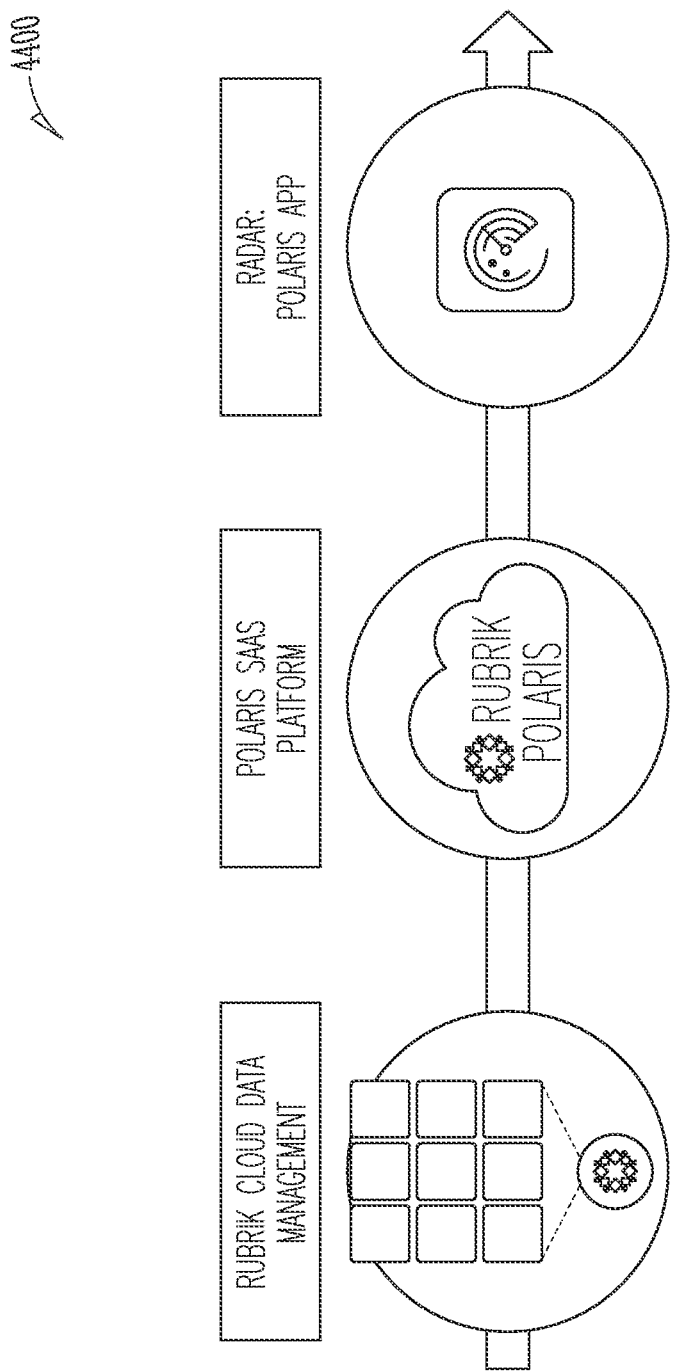
FIG. 44 depicts a high-level overview of example ransomware detection software architecture, according to an example.

A high-level overview of a further example anomaly and ransomware detection software architecture 4400 is shown in FIG. 44. As mentioned above, some example anomaly and ransomware detection systems described herein leverage machine learning to detect anomalies and ransomware on data backups with little or no impact on production systems. Ransomware may be characterized by an encryption profile in some instances. Some example anomaly and ransomware detection systems or applications of the present disclosure include or are based on a hybrid-cloud architecture to enable computational scaling. Some examples utilize snapshot metadata computed by a data backup system to minimize computational overhead while delivering high-precision prediction results. In some examples, significant computational processing is offloaded to a cloud-based SaaS platform to reduce computational stress placed on a primary machine being backed up.

Figure 45:
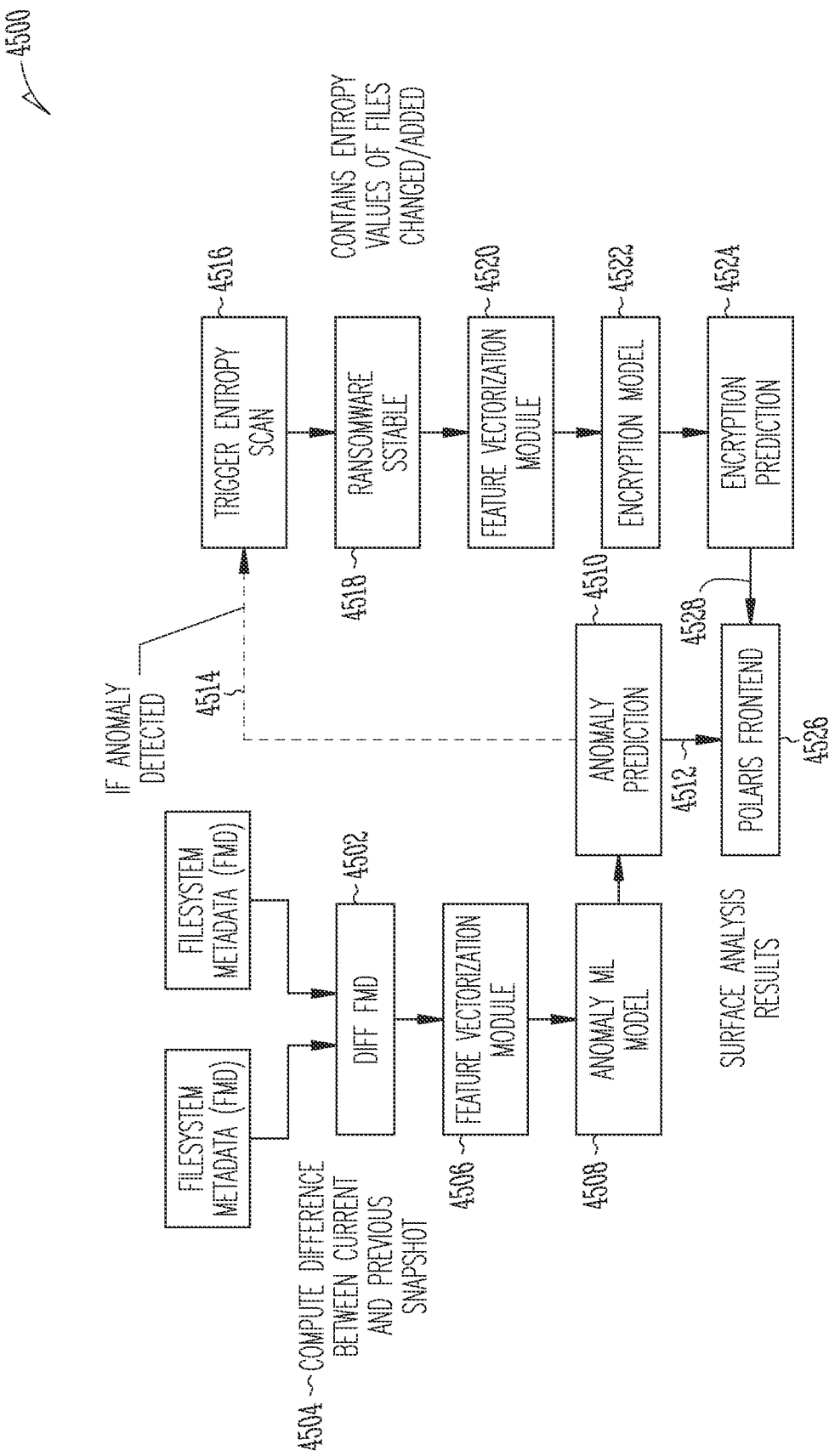
FIG. 45 depicts example workflow operations in an anomaly and ransomware (encryption) detection pipeline, according to an example.

Example workflow operations in an overview of an example anomaly and ransomware detection pipeline 4500 are shown in FIG. 45. The pipeline 4500 may include first and second machine learning systems in some examples. In the illustrated example, a filesystem metadata diff (diff FMD) file 4502 is created by a data backup system (for example, overseen by the virtualization manager 169 described further above) whenever a snapshot is taken for a primary machine. The diffFMD file 4502 contains a list of entries 4504 corresponding to files that have been created, deleted, or modified, and may include a log of all file changes that have taken place on the primary machine.

In some examples, one or more diff FMD files 4502 are used as training data by a first machine learning system that may include a feature vectorization module 4506 and an anomaly machine-learning (ML) model 4508 to generate an anomaly prediction 4510. The generated anomaly prediction 4510 is communicated at 4512 to a front-end web user interface 4526 of a SaaS platform (for example, as described above). In some examples, the components illustrated in the anomaly and ransomware detection pipeline 4500 operate only on snapshot metadata and not production data or infrastructure, and hence have minimal effect (if any) on a production system.

Furthermore, in some examples, instead of running the workflow pipeline 4500 on the data backup system, the data backup system uploads the diff FMD files 4502 to the SaaS platform to be processed by a pipeline residing in the cloud. In this arrangement, not only is there minimal impact on primary machine production, but also very limited impact on the performance of associated backup and recovery jobs.

In the illustrated workflow pipeline example, if a filesystem anomaly is detected by the first machine learning system, a request 4514 is made to the data backup system to initiate a second stage of the workflow pipeline 4500. During this second stage, the data backup system performs an entropy scan 4516 for all files that have changed on the primary machine since the last snapshot was taken. The results are saved to a file (for example, a ransomware SSTable 4518). The file is then uploaded to the SaaS platform for further processing by a second machine learning system. The second machine learning system includes a feature vectorization module 4520 and an encryption model 4522 trained to predict ransomware encryption events. The second machine learning system accesses and processes the SSTable 4518 in the file to determine whether a ransomware infection event has occurred on the primary machine. An encryption prediction 4524 is communicated at 4528 to the front-end web user interface 4526 of the SaaS platform.

By adopting a two-stage analysis architecture that ingests and processes snapshot metadata for anomaly and ransomware detection, the ransomware detection pipeline 4500 can scale up with ease, even for a cluster containing hundreds of thousands of primary machines. In some examples, as discussed, the components in the anomaly and ransomware detection pipeline 4500 include two machine-learning models. The anomaly detection model 4508 may be implemented using a deep neural network (DNN), and the encryption detection model 4522 may be implemented using a logistic regression model (LRM).

In some examples, both machine learning models 4508 and 4522 are trained using supervised learning, which may include presenting labelled data to the machine learning models as training data. Sufficient and appropriate labelled data is typically keenly sought as a key aspect of accurate training and may be especially significant for real-world applications. In order to train a well-calibrated model, it may be desirable to build a well-balanced labelled dataset that consists of a roughly equal proportion of data points corresponding to "normal" filesystem behavior and data points corresponding to "anomalous" and/or ransomware "encryption" activity.

Although the existence of ransomware presents an ever-increasing threat, the collection of the requisite labelled data may be difficult as the occurrence of ransomware encryption in a snapshot is statistically rare in a production environment. This renders a production environment an unreliable source for collecting data points corresponding to ransomware events. In order to address this shortcoming in the data sourcing process, some examples herein include or are based on a FMAT. A FMAT addresses data scarcity problems and can enable the building of significantly more complex machine learning models.

In some examples, a FMAT operates by repeatedly sampling metadata files from a seed corpus and merging them according to a pre-defined heuristic. The merging process "simulates" ransomware activity for a given snapshot, without the expensive overhead of actually setting up a machine to run ransomware infection experiments. This technique is highly scalable and can be applied across millions of snapshots to generate sufficient data to train the machine learning models 4508 and 4522 in example ransomware detection systems. In some FMAT examples, it is possible to synthesize a well-balanced dataset containing millions of data points from both positive and negative classes for machine learning. Moreover, the creation of such datasets can take place in a matter of hours rather than weeks or months as is typically the case for most data collection processes.

A typical scenario for a system infected with ransomware may begin with a user accidently downloading ransomware onto their filesystem. The user may accidentally or unknowingly execute malware masked as a harmless PDF document in an email attachment, for example. The ransomware then quickly encrypts a large number of documents in the user's filesystem with the decryption key hidden to the user. In most instances, the user will not know that they have been infected with ransomware until they attempt to open an encrypted file. Given the static nature of most filesystems, it is quite possible for ransomware to remain undiscovered for a significant period of time. This observation is also indicative of the fact that when a ransomware infection does occur, the event may be characterized by a sudden burst of activity in terms of the absolute number of files in the system that are created, deleted, and modified.

Figure 46:
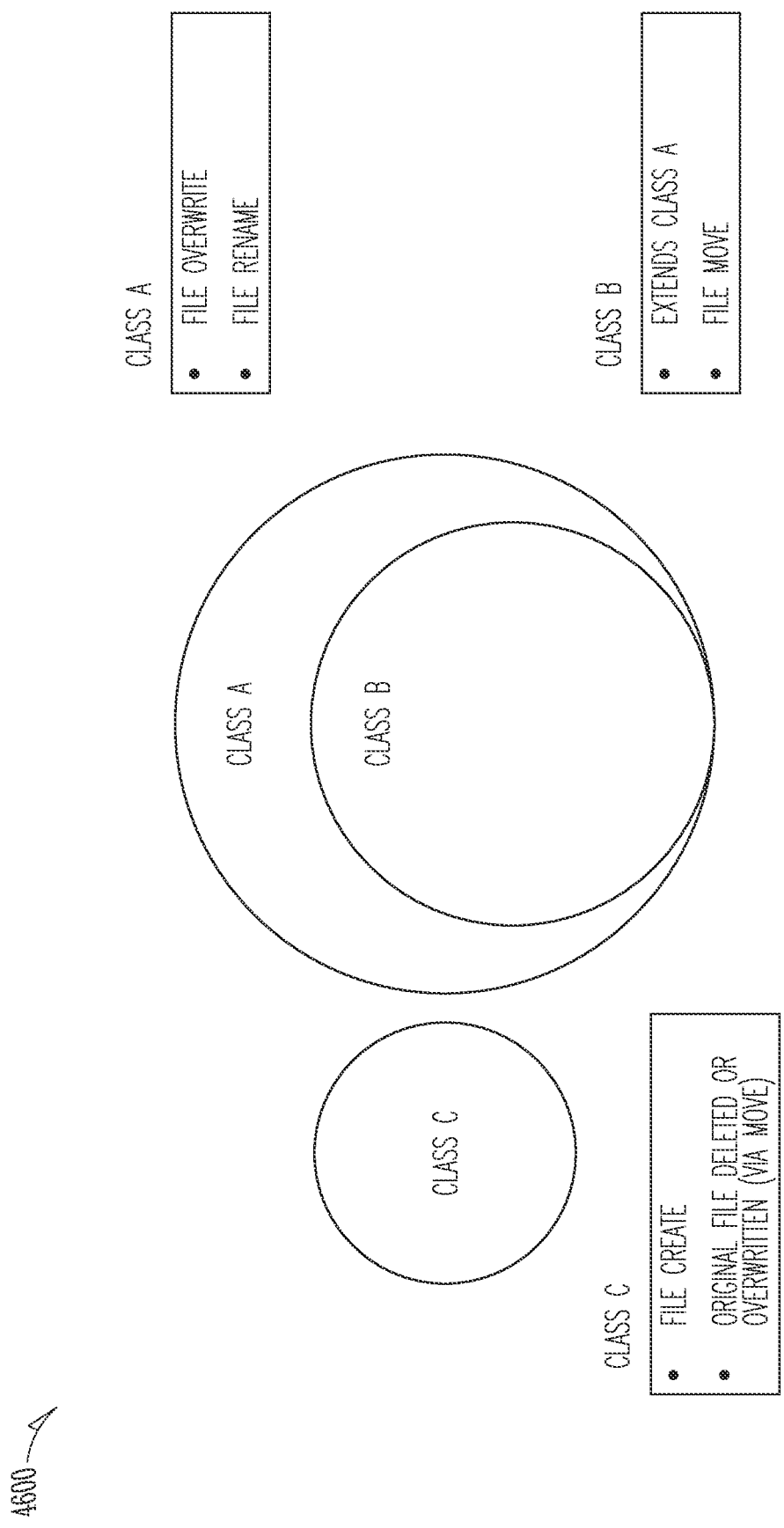
FIG. 46 depicts a ransomware classification, according to an example.

With reference to FIG. 46, it may be useful in this regard to categorize certain classes of ransomware to gain a deeper understanding of aspects of the present disclosure. A conceptual description for each of these example classes is provided according to the classification 4600 shown in the view. Class A ransomware overwrites the content of a file via encryption, with a possible renaming of the file. Class B ransomware extends Class A and moves files out of a user directory to a temporary directory, encrypts the files in the temporary directory, then moves them back. The file name may be changed during the move. Class C ransomware creates a new, independent, encrypted file. The original file is deleted or overwritten. It may be noted that each of these ransomware classes may share a high degree of overlap in terms of ransomware behavior. An example situation might include ransomware which both encrypts files by overwriting them and encrypts files by creating new ones and deleting the original file. Some example anomaly and ransomware detection pipelines may include a goal of being able to detect all three ransomware classes both independently and jointly.

To this end, certain factors may be utilized in anomaly and ransomware detection based on machine learning. A first factor may include an observation that most directories in a filesystem remain static over time, marked by sudden periods of high activity. Given that ransomware tends to run relatively quickly across a short period of time, it may be sufficient to simply examine the entropy changes of the files modified in a filesystem in order to detect an infection. This factor may improve scalability significantly, since it allows a ransomware detection pipeline to examine only the partial contents of a filesystem for ransomware.

A second factor may include an observation that ransomware encryption in a snapshot is a statistically rare event. In particular, the majority of snapshots will consist of little to no changes to the underlying machine being backed up. Thus, it is possible to make significant savings in computational processing by scanning only for ransomware on filesystems that show a non-trivial likelihood of being infected.

With reference to FIG. 47, these factors allow the configuration or categorization 4700 of an anomaly and ransomware detection pipeline comprising two stages. A first stage, which may be referred to as a Filesystem Behavior Analysis stage, includes a computationally "cheap" scan of filesystem metadata to detect and identify a first set 4702 of anomalous snapshot changes. A second stage, which may be referred to as a Filesystem Content Analysis stage, includes a relatively more expensive scan of the actual filesystem contents to detect and identify a second set 4704 of malicious encryption events. An intersection of sets 4702 and 4704 may include a prediction set 4706 of likely ransomware infection events that may be further investigated. By adopting a two-stage anomaly-encryption detection architecture for anomaly and ransomware detection, an example detection pipeline can be built to scale across millions of machines.

An example first stage (Filesystem Behavior Analysis) performs a preliminary analysis for anomalous events by examining the changes in the filesystem since a previous snapshot, typically the last snapshot. This stage is initiated by the upload of a diff FMD file from a data backup system as discussed above. The diffFMD file is a metadata file that lists the files that have changed in a filesystem since the last snapshot. These diff FMD files tend to be relatively small and are about 1 or 2 kilobytes in size when represented in a binary encoding. An example of some filesystem metadata in a diff FMD file is shown in human-readable format 4800 in FIG. 48.

The diff FMD file may be uploaded to a SaaS platform (for example, as described above), where it is used, for example, by the first machine learning system to predict for anomalies. In one example, a detection of a large number of files being added to or moved around a directory may be indicative of an anomaly such as a malware or ransomware infection. The computation carried out during this stage is relatively lightweight and highly scalable since it is primarily ingesting the file change statistics since the last snapshot, rather than the full snapshot itself. Thus the necessary data processing to predict anomalies is very fast.

In the course of taking a snapshot on a primary machine, for example, taken by a data backup system, the system mounts that snapshot and crawls the filesystem of the mounted machine. FMD is generated during the crawling step and the metadata file specifies the structure of the filesystem along with a set of metadata attributes for each file within it (such as the file path or file size).

As discussed above more generally, once the FMD file has been generated, it is compared with the FMD file from the previous snapshot to compute a diffFMD file, for example diff FMD file 4502 in FIG. 45. This diffFMD file 4502 contains a list of entries corresponding to files that have been created, deleted, or modified, and may include a complete log of the file changes that have taken place on the backup. The diff FMDs (as opposed to conventional FMDs) are ingested by the first machine learning system (for example, modules or models 4506 and 4508) to produce an initial anomaly prediction 4510. By modelling the anomaly detection problem using a deep neural network, the system is able to make highly accurate predictions on whether an anomalous event has occurred in a new snapshot. A high level of accuracy may be crucial during this first stage (Filesystem Behavior Analysis), since the subsequent encryption detection stage (Filesystem Content Analysis) is only triggered when an anomaly is detected during the first stage. Thus, in some examples, it is important that the anomaly and ransomware detection pipeline 4500 is capable of flagging any suspicious changes that may have been made by a bad actor.

One benefit of using a deep learning approach for anomaly detection is that the neural network model is capable of learning its own set of features when given the raw features from the data. This reduces the need for expensive hand-engineering of the features by an engineer or scientist. Thus, in some examples, certain feature vectors exposed to the deep learning model may include many raw statistics computed from a diff FMD file. Some examples of these statistics may include: file operation statistics such as the number of files created, deleted, and modified since the last snapshot; user activity metrics corresponding to files that have been changed by the user; system activity metrics corresponding to files that have been changed by the operating system or software running on the machine; and suspicious activity metrics corresponding to the number of files with suspicious names.

During training, the neural network learns a set of high-level features built on top of these low-level features to internally represent the snapshot changes. For example, the neural network may be able to infer that a ransomware encryption event has occurred from the fact that a large number of office documents has been modified or deleted in the system. These high-level features learned by the neural network enables it to ultimately predict what type of activity has occurred on the primary machine and whether this activity warrants an anomaly alert.

The second stage (Filesystem Content Analysis) is primarily responsible for detecting encryption activity made by ransomware and is initiated when an anomaly is detected by the anomaly detection model during filesystem behavior analysis. File encryption by ransomware tends to be characterized by a sharp increase in file entropy. Some examples detect whether a malicious encryption event has occurred by computing an entropy value for files that have changed since the last snapshot and evaluating these entropy readings using a machine learning model. Although analyzing the entropy of the file content may be effective towards detecting encryption activity, this is also a computationally expensive procedure that requires reading the binary contents of a file. Thus, in some examples, this stage is only triggered in the event of an anomaly alert raised by the initial anomaly detection stage.

In this regard, aspects of computing a ransomware SSTable for a file entropy are now described. When an anomaly is detected by a machine learning model, running on a SaaS platform, for example, a request is made to the data backup system to initiate the second stage of the ransomware detection pipeline. During this second stage, the data backup system performs an entropy scan for all the files that have changed on the primary machine since the last snapshot. The computed file entropy values are stored in a ransomware SSTable (RST) file (for example, ransomware SSTable 4518 of FIG. 45), which is uploaded to the SaaS platform to be processed by a ransomware (encryption) detection pipeline (assuming that an anomaly was detected during the first stage). The ransomware (encryption) detection pipeline may include modules or models 4520 and 4522 of FIG. 45. An example RST file may contain entropy values for files that have been added or modified since the last snapshot was taken. Entropy values may be computed by calculating a Shannon entropy for the first 4512 bytes (or more generally some number (N)) of the file. Example ransomware SStable content 4900 of an RST file is shown in FIG. 49.

Once the RST file has been uploaded, it is processed by the ransomware detection pipeline to predict whether a ransomware encryption event occurred on the primary machine. The ransomware detection pipeline will ingest the RST file to compute a set of features corresponding to entropy values on various sets of files on the primary machine. These features are then fed into the encryption detection model (for example, the encryption detection model 4522 of FIG. 45) to identify encryption activity. In some examples, the encryption detection model is also implemented using machine learning similar to the anomaly detection model. The underlying implementation uses LRM. The LRM is favored for its simplicity and scalability and is robust against noise in the data. The encryption detection model may be trained using supervised learning similar to the anomaly detection model.

Example features for predicting ransomware encryption events are now described. A set of features used for encryption detection (for example, set 4704) may be relatively small when compared with a set of features used for anomaly detection (for example, set 4702). Generally speaking, features of interest for encryption detection include: entropy statistics corresponding to the change in entropy levels detected in the backup, file operation statistics such as the number of files created and modified since the last snapshot, and suspicious activity metrics corresponding to the number of files with suspicious naming patterns. These features may assist in determining whether a malicious encryption event has occurred on the primary machine. These basic statistics do not require additional feature engineering since they are already highly correlated with the encryption signal. Consequently, a Logistic Regression model works effectively for encryption detection when given these features.

As mentioned above, the collection of "real" labelled data for machine learning may be time intensive and difficult. Use cases for labelled data may be two-fold: first, labelled data provides a learning input for a model during training and, second, provides a measure of the expected accuracy in production during testing. Without labelled data, the challenge of developing an effective machine learning model is high. Moreover, the volume and type of labelled data collected should account for the complexity of the machine learning problem.

Some examples herein obtain labelled data "artificially" by simulating the existence of ransomware within a development machine such as a virtual machine (VM). But some simulation approaches may nevertheless remain costly and not scale well for reasons that may include the following. Many ransomware samples sourced from the Internet, for example, are "dead-on-arrival" and will not run within a simulation environment. Moreover, ransomware behavior is sporadic and unpredictable. Running a sample of live ransomware is in itself a challenging task. The behavior of ransomware is unpredictable and the results from running ransomware varies from simulation to simulation. On some occasions, the ransomware will run within minutes and encrypt a whole host of directories on files. Yet on other occasions, it may remain static for long periods of time and only encrypt a small number of files. Further, a prototypical customer machine filesystem (i.e., susceptible or capable of having a snapshot taken of it or portions of it) should be simulated to an appropriate degree of accuracy. Attempting to simulate such an environment is technically complex given the wide range of possible machine environments that may exist in an array of clusters, for example. Some users could be using a machine as an email exchange server, whereas other users could be using their machines for running software builds. It is costly in terms of both computational resources and development time to build a simulation engine that will sufficiently capture all the variations of machine environments that may be desirable for machine learning.

For these reasons, simulating ransomware is typically a costly effort, which may unduly limit the number of data points that can be gathered. Some examples herein include or are based on an alternative approach that is more cost-effective in terms of compute and development time. The approach may include data augmentation using snapshot metadata.

Figure 50:
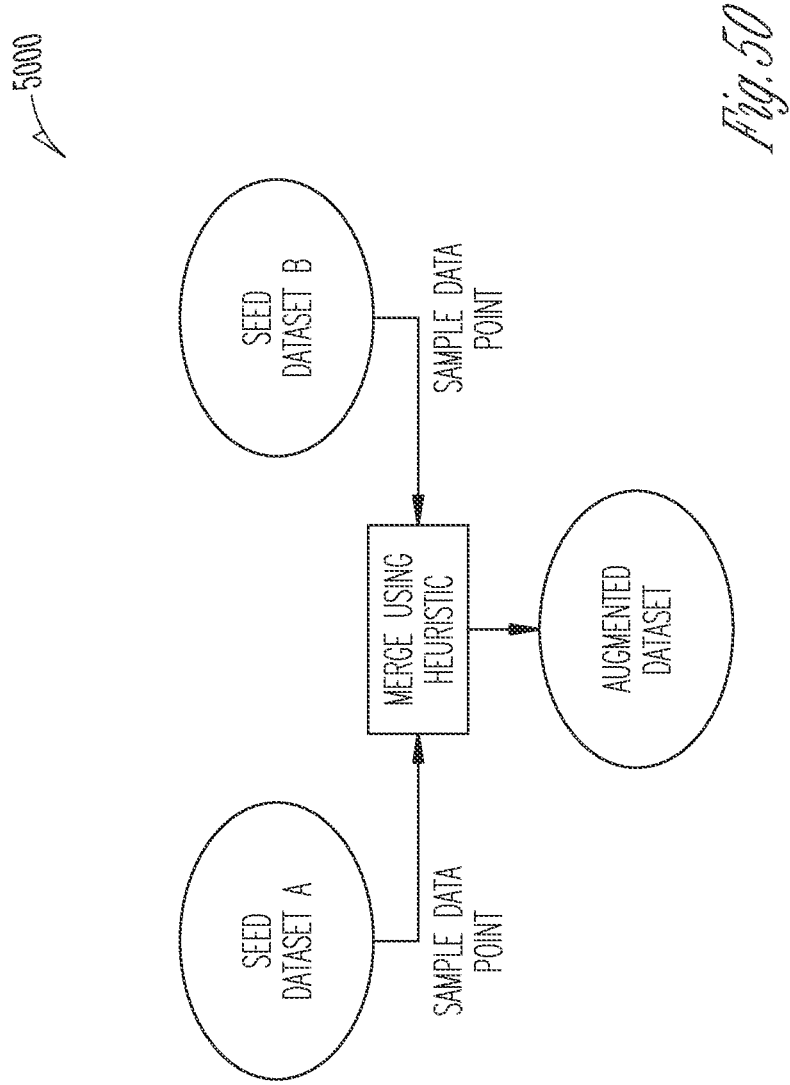
FIG. 50 depicts a flow chart showing operations in a training data augmentation method, according to an example.

Data augmentation may provide a convenient alternative to gathering data compared with more expensive approaches such as real or certain simulation techniques. FIG. 50 depicts a high-level flow chart 5000 for training data augmentation in FMAT. When using FMAT to generate more ransomware infection data points, the seed dataset A will consist of "normal" data points, whereas the seed dataset B will consist of data points corresponding to ransomware "infections." Metadata augmentation techniques as part of FMAT can generate appropriately accurate and useful quantities of labelled training data. This may allow the creation of significantly more complex machine learning models that materially improve the accuracy of a ransomware or encryption detection pipeline.

Some example data augmentation examples may include or be based on certain preconditions. A first example precondition may include the existence of a seed dataset containing "normal" filesystem metadata. This may be needed to provide the initial negative samples for performing data augmentation. A second precondition may include access to prototype data examples of a desired positive class. A prototype example may serve as a seed data point for constructing the desired positive dataset. In the case of a SaaS platform, this example might correspond to a snapshot metadata file containing the changes made by a ransomware program.

Further, certain assumptions may be made in some examples of data augmentation in FMAT. These may be satisfied during an initial data collection procedure. For example, hundreds of thousands of data points may be processed on a weekly basis, with almost all of these data points corresponding to normal user filesystem activity that occurs on a regular basis. Thus, there exists a large volume of seed data points for constructing a target normal dataset.

Figure 51:
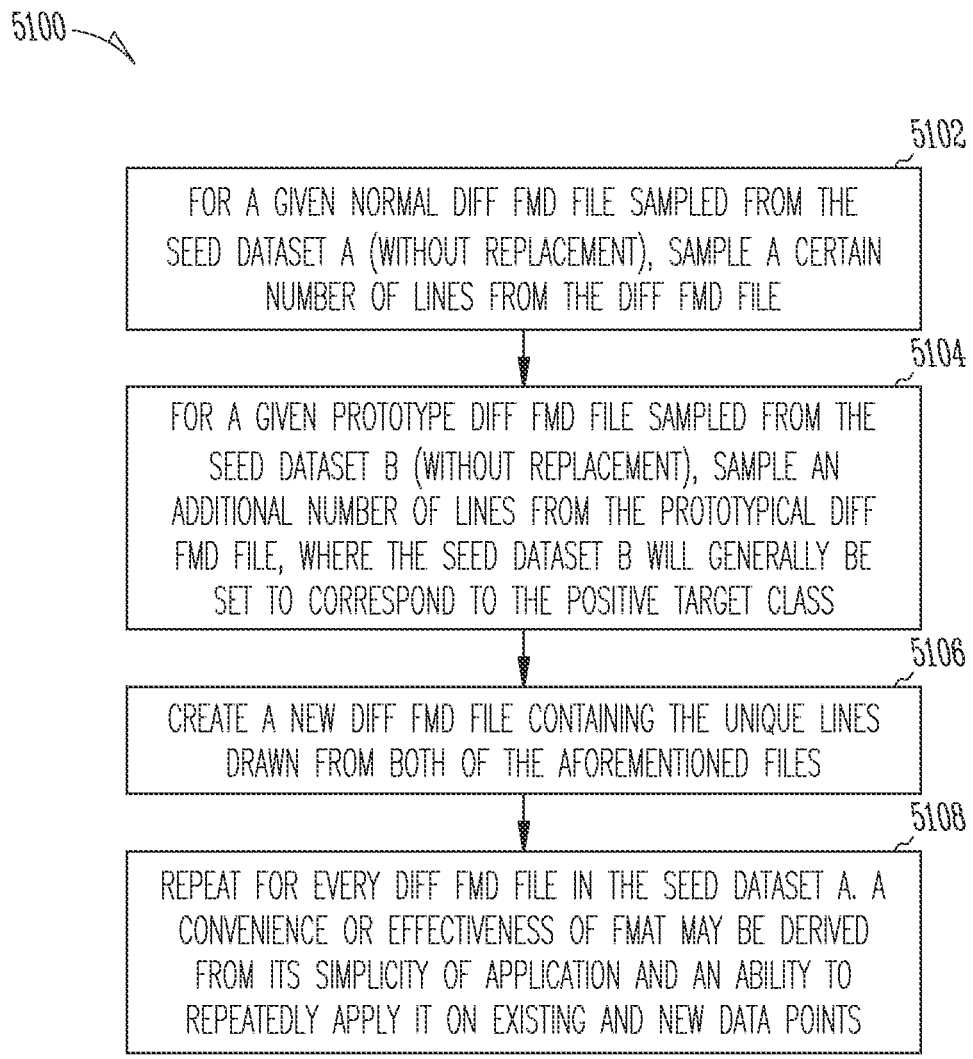
FIG. 51 depicts an example application of FMAT to generate training data, according to an example.

With reference to FIG. 51, an example application 5100 of FMAT to generate training data for an anomaly detection model may include the following operations. At operation 5102, for a given normal diffFMD file sampled from the seed dataset A (without replacement), sample a certain number of lines from the diff FMD file. At operation 5104, for a given prototype diff FMD file sampled from the seed dataset B (without replacement), sample an additional number of lines from the prototypical diff FMD file, where the seed dataset B will generally be set to correspond to the positive target class. At operation 5106, create a new diff FMD file containing the unique lines drawn from both of the aforementioned files. At operation 5108, repeat for every diff FMD file in the seed dataset A. A convenience or effectiveness of FMAT may be derived from its simplicity of application and an ability to repeatedly apply it on existing and new data points.

Benefits of this FMAT approach include the creation of well-balanced datasets. Datasets created using FMAT will typically contain a well-proportioned mixture of data examples from both the positive and negative classes (i.e., diff FMD files). A diversified collection of diff FMD files containing changes from the prototype diff FMD is created. This enables a machine learning model to observe filesystem changes contained in the prototype diffFMD under the context of a wide variety of snapshot changes. For example, if the prototype diff FMD contained filesystem changes from a ransomware infection, FMAT will ensure that these filesystem changes are observed by the machine learning model alongside many other types of "normal" filesystem changes. This helps to improve the model's ability to recognize ransomware behavior in a real-world environment.

In some examples, the application of FMAT will cause the dataset to double in size. From an empirical standpoint, some examples apply a data pruning procedure after applying FMAT to remove noisy data points. One example of an effective pruning procedure is to remove any augmented data point that is similar to data points in the seed datasets by using a data similarity metric.

In some examples, it is also possible to apply FMAT on a dataset already augmented by FMAT. This may be desirable in cases where a very large dataset is needed to effectively train and test a model. Although repeated applications of FMAT can grow the dataset at an exponential rate, it can also introduce a significant source of noise in the data due to the signal amplification effects of FMAT. Careful empirical testing and tuning is necessary when using FMAT in this setting.

Thus, in some examples, anomaly and ransomware detection is implemented using a two-stage anomaly-encryption detection pipeline. A ransomware detection system can be built to scale infinitely by utilizing the snapshot metadata inherently generated by a backup system for a primary machine.

Both the anomaly and encryption detection models may be implemented using machine learning methods. In some examples, the implementation for the anomaly detection model utilizes deep learning approaches and is based on a deep neural network trained using supervised learning. A deep neural network is capable of learning very sophisticated internal representations built on top of raw representations for snapshot metadata. This internal representation allows the model to make far more accurate anomaly predictions. In some examples, the encryption detection model is implemented using a Logistic Regression model and is similarly trained using supervised learning. Together, these two models form the backbone of a machine learning pipeline in a ransomware detection pipeline and may be used in conjunction towards anomaly and ransomware detection on snapshot metadata in a ransomware detection system.

Figure 52:
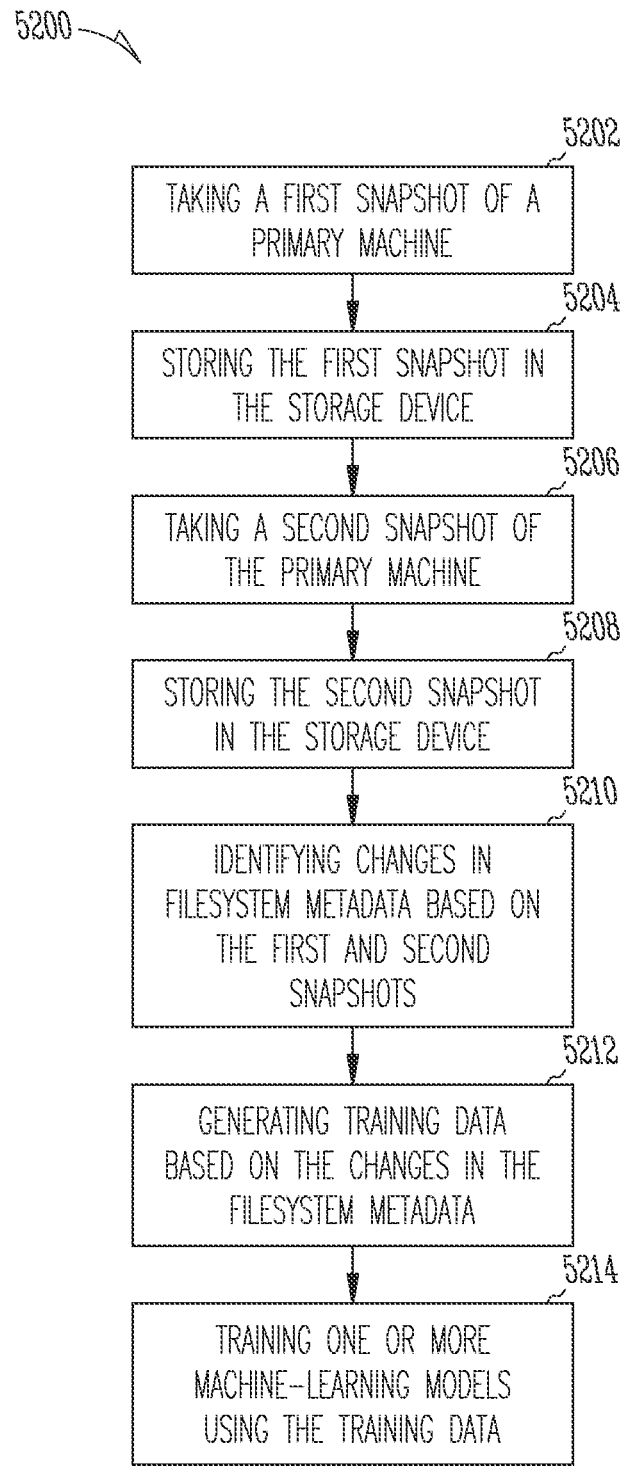
FIGS. 52-54 each depicts a block flow chart indicating example operations in a method of the present disclosure, according to an example.

Thus, some examples of the present disclosure include methods. With reference to FIG. 52, an example method 5200 may be performed at an anomaly and detection system, the system including one or more processors in communication with a storage device and a production system, the one or more processors configured to perform anomaly and ransomware operations including, at least: at operation 5202, taking a first snapshot of a primary machine; at operation 5204, storing the first snapshot in the storage device; at operation 5206, taking a second snapshot of the primary machine; at operation 5208, storing the second snapshot in the storage device; at operation 5210, identifying changes in filesystem metadata based on the first and second snapshots; at operation 5212, generating training data based on the changes in the filesystem metadata; and, at operation 5214, training one or more machine-learning models using the training data.

In some examples, the storage device is a backup storage device and the identified changes are sourced from a backup system that includes the backup storage device. In some examples, the anomaly and ransomware detection operations are performed without impacting the production system. In some examples, at least some of the anomaly and ransomware detection operations are offloaded to a cloud-based SaaS platform. In some examples, the one or more machine-learning models include an anomaly model and/or an encryption model. In some examples, the training of the one or more machine-learning models is based on training data derived solely on the snapshot-based metadata.

Figure 53:
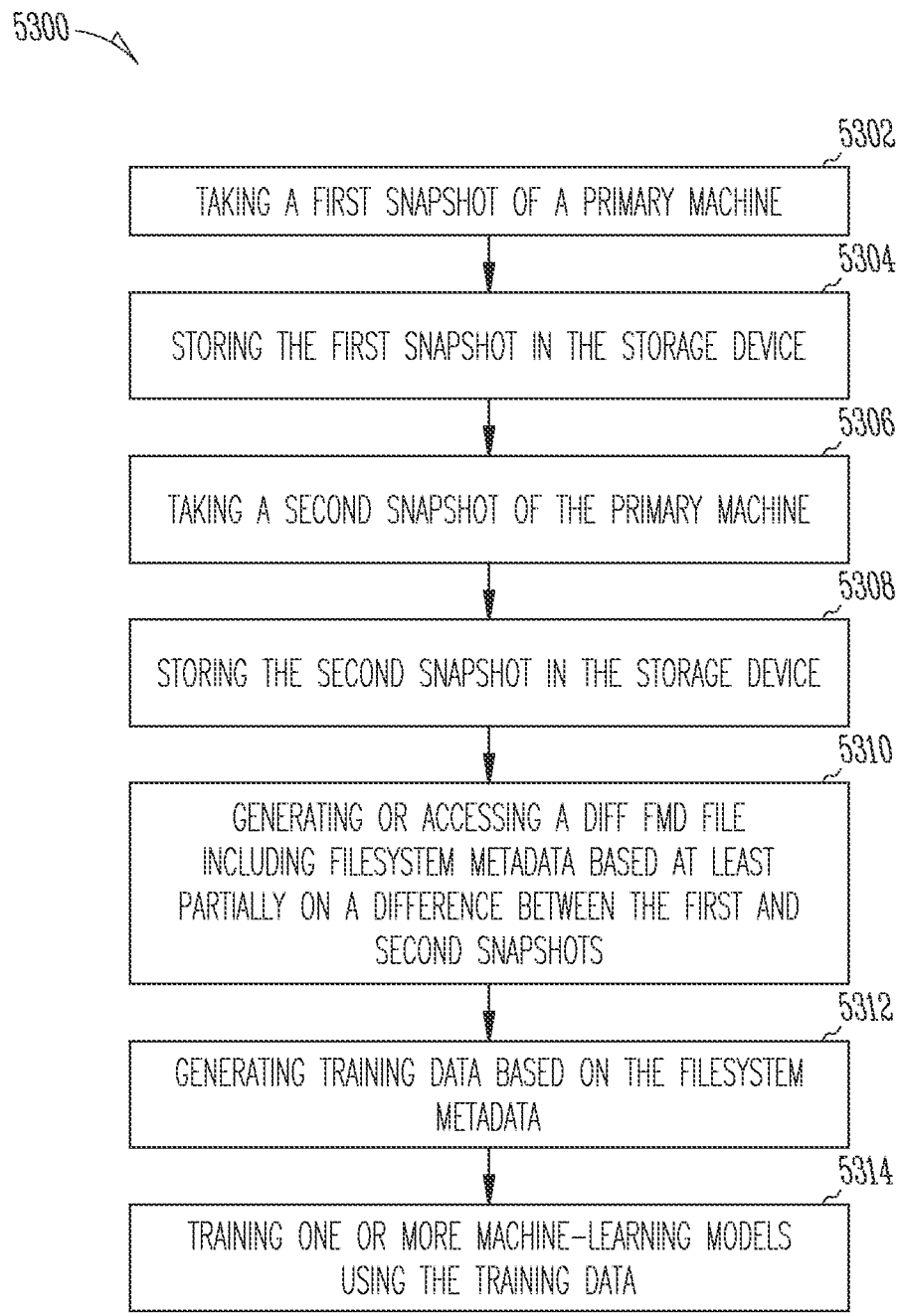

With reference to FIG. 53, an example method 5300 may be performed at an anomaly and detection system, the system including one or more processors in communication with a storage device and a production system, the one or more processors configured to perform anomaly and ransomware detection operations including, at least: at operation 5302, taking a first snapshot of a primary machine; at operation 5304, storing the first snapshot in the storage device; at operation 5306, taking a second snapshot of the primary machine; at operation 5308, storing the second snapshot in the storage device; at operation 5310, generating or accessing a diff FMD file including filesystem metadata based at least partially on a difference between the first and second snapshots; at operation 5312, generating training data based on the filesystem metadata; and, at operation, 5314, training one or more machine-learning models using the training data.

In some examples, the storage device is a backup storage device and the generated or accessed metadata is received from a backup system that includes the backup storage device. In some examples, the anomaly and ransomware detection operations are performed without impacting the production system. In some examples, at least some of the anomaly and ransomware detection operations are offloaded to a cloud-based SaaS platform. In some examples, the one or more machine-learning models includes an anomaly model and/or an encryption model. In some examples, the training of the one or more machine-learning models is based on training data derived solely from the snapshot-based metadata.

Figure 54:
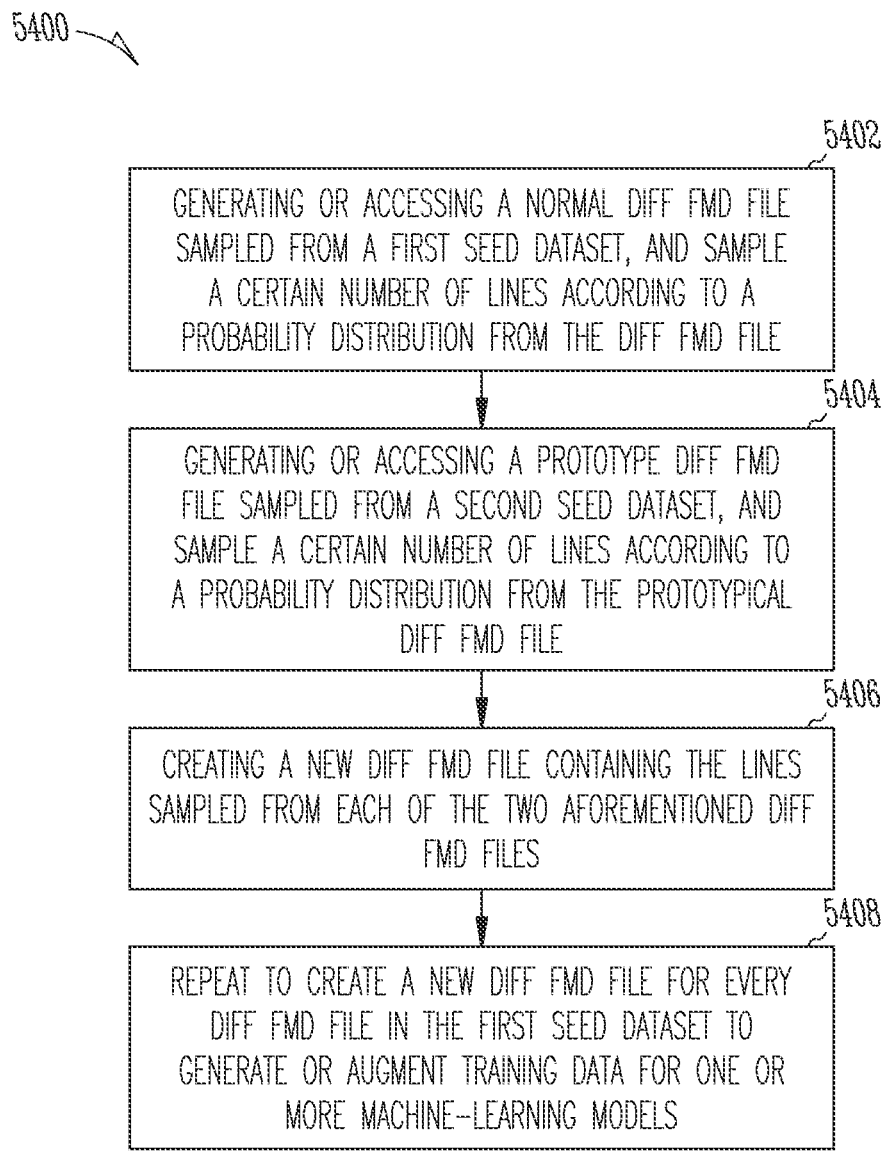

With reference to FIG. 54, an example method 5400 may be performed by an FMAT system, the FMAT system including one or more processors configured to training data augmentation operations including, at least: at operation 5402, generating or accessing a normal diff FMD file sampled from a first seed dataset and sampling a certain number of lines according to a probability distribution from the diff FMD file; at operation 5404, generating or accessing a prototype diff FMD file sampled from a second seed dataset and sampling a certain number of lines according to a probability distribution from the prototypical diff FMD file; at operation 5406, creating a new diff FMD file containing the lines sampled from each of the two aforementioned diff FMD files; and, at operation 5408, repeating to create a new diff FMD file for every diff FMD file in the first seed dataset to generate or augment training data for one or more machine-learning models.

In some examples, the first seed dataset corresponds to a negative target class. In some examples, the second dataset corresponds to a positive target class. In some examples, the training data augmentation operations are performed by a backup system without impacting production operations in a production system served by the backup system. In some examples, at least some of the training data augmentation operations are offloaded by the FMAT system to a cloud-based computing platform. In some examples, the one or more machine-learning models includes an anomaly model and/or an encryption model. A data management and storage (DMS) cluster of peer DMS nodes manages failover and failback of application(s) between a primary compute infrastructure and a secondary compute infrastructure. The primary compute infrastructure may be a production environment and the secondary compute infrastructure may be a remote cloud computing environment used primarily for backup purposes. The application(s) may execute on virtual machines such as database servers, file servers, and web servers. The DMS cluster generates incremental snapshots of the virtual machines executing on the primary compute infrastructure. For convenience, these snapshots will be referred to as primary snapshots, where "primary" indicates only that the snapshots originate from the primary compute infrastructure. The DMS cluster may store the primary snapshots and may also transfer the primary snapshots to the secondary compute infrastructure in a form appropriate for the secondary compute infrastructure.

Application Migration (Also Known as "App Flows")

Responsive to a failure in the primary compute environment, a failover process is performed where the primary snapshots on the secondary compute infrastructure are deployed as virtual machines on the secondary compute infrastructure, with the secondary compute infrastructure now serving as the production environment. During this failover mode, a DMS cluster for the secondary compute infrastructure generates incremental snapshots of the virtual machines executing on the secondary compute infrastructure. For convenience, these will be referred to as secondary snapshots, where "secondary" indicates only that these snapshots originate from the secondary compute infrastructure. The secondary snapshots are also transferred to the primary compute infrastructure in an appropriate form.

Responsive to a resolution of the failure in the primary compute infrastructure, a failback process is performed to return the production environment to the primary compute infrastructure. The primary snapshots before failover are combined with the secondary snapshots during failover to recreate the current state of the production environment, which is deployed on the primary compute infrastructure. The virtual machines in the secondary compute infrastructure may be shut down, and the DMS cluster may resume generating primary snapshots of the virtual machines on the primary compute infrastructure.

Among other present reasons for using the disclosed techniques, the application(s) may be migrated across different types of computing environments for failover and failback operations. Furthermore, using incremental snapshots reduces the network traffic for data transfer between the primary and secondary computing infrastructures. It also avoids having to recreate the production environment from scratch during failback and avoids the use of check sum processing to validate the recreated environment, because of the known relationship between the primary snapshots, secondary snapshots and current state of the production environment.

Figure 55:
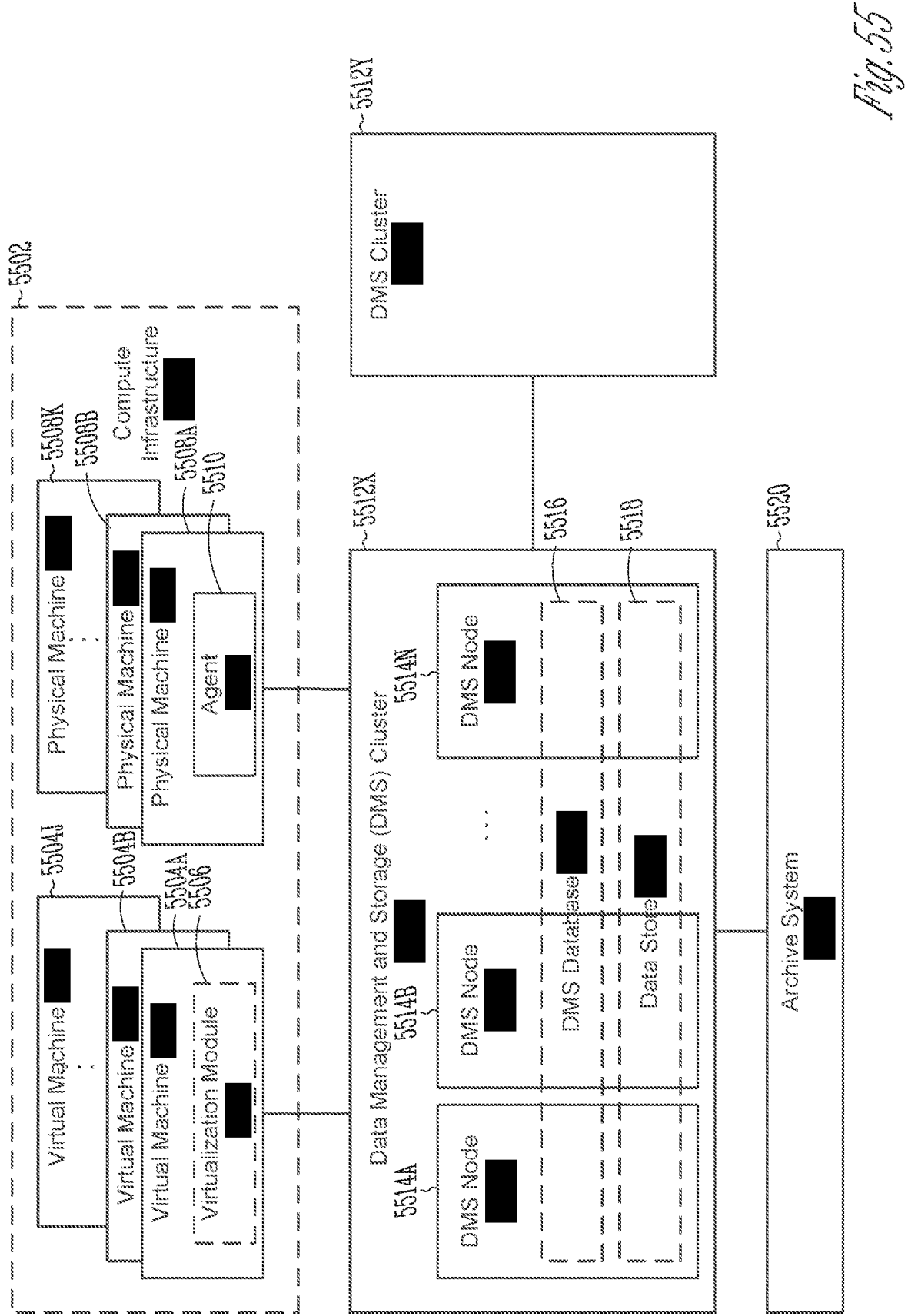
FIG. 55 is a block diagram of a system for managing and storing data, according to one example.

In more detail, FIG. 55 is a block diagram illustrating a system for managing and storing data, according to one examples. The system includes a data management and storage (DMS) cluster 5512$x$, a secondary DMS cluster 5512$y$ and an archive system 5520. The DMS system provides data management and storage services to a compute infrastructure 5502, which may be used by an enterprise such as a corporation, university, or government agency. Many different types of compute infrastructures 5502 are possible. Some examples include serving web pages, implementing e-commerce services and marketplaces, and providing compute resources for an enterprise's internal use. The compute infrastructure can include production environments, in addition to development or other environments.

In this example, the compute infrastructure 5502 includes both virtual machines (VMs) 5504$a$-$j$ and physical machines (PMs) 5508$a$-$k$. The VMs 5504 can be based on different protocols. VMware, Microsoft Hyper-V, Microsoft Azure, GCP (Google Cloud Platform), Nutanix AHV, Linux KVM (Kernel-based Virtual Machine), and Xen are some examples. The physical machines 5508$a$-$k$ can also use different operating systems running various applications. Microsoft Windows running Microsoft SQL or Oracle databases, and Linux running web servers are some examples.

The DMS clusters 5512$x$-$y$ manage and store data for the compute infrastructure 5502. This can include the states of machines 5504, 5508, configuration settings of machines 5504, 5508, network configuration of machines 5504, 5508, and data stored on machines 5504, 5508. Example DMS services include backup, recovery, replication, archival, and analytics services. The primary DMS cluster 5512$x$ enables recovery of backup data. Derivative workloads (e.g., testing, development, and analytic workloads) may also use the DMS cluster 5512$x$ as a primary storage platform to read and/or modify past versions of data.

In this example, to provide redundancy, two DMS clusters 5512$x$-$y$ are used. From time to time, data stored on DMS cluster 5512$x$ is replicated to DMS cluster 5512$y$. If DMS cluster 5512$x$ fails, the DMS cluster 5512$y$ can be used to provide DMS services to the compute infrastructure 5502 with minimal interruption.

Archive system 5520 archives data for the computer infrastructure 5502. The archive system 5520 may be a cloud service. The archive system 5520 receives data to be archived from the DMS clusters 5512. The archived storage typically is "cold storage," meaning that more time can be spent to retrieve data stored in archive system 5520. In contrast, the DMS clusters 5512 provide faster data retrieval, such as for backup recovery.

The following examples illustrate operation of the DMS clusters 5512$x$-$y$ for backup and recovery of VMs 5504. The same principles apply also to PMs 5508 and to other DMS services.

Each DMS cluster 5512 includes multiple peer DMS nodes 5514$a$-$n$ that operate autonomously to collectively provide the DMS services, including managing and storing data. A DMS node 5514 includes a software stack, processor and data storage. DMS nodes 5514 can be implemented as physical machines and/or as virtual machines. The DMS nodes 5514 are interconnected with each other, for example, via cable, fiber, backplane, and/or network switch. The end user does not interact separately with each DMS node 5514 but interacts with the DMS nodes 5514$a$-$n$ collectively as one entity, namely, the DMS cluster 5512.

The DMS nodes 5514 are peers and preferably each DMS node 5514 includes the same functionality. The DMS cluster 5512 automatically configures the DMS nodes 5514 as new nodes are added or existing nodes are dropped or fail. For example, the DMS cluster 5512 automatically discovers new nodes. In this way, the computing power and storage capacity of the DMS cluster 5512 is scalable by adding more nodes 5514.

The DMS cluster 5512 includes a DMS database 5516 and a data store 5518. The DMS database 5516 stores data structures used in providing the DMS services, as will be described in more detail in FIG. 2. In the following examples, these are shown as tables, but other data structures could also be used. The data store 5518 contains the backup data from the compute infrastructure 5502, for example snapshots of VMs or application files. Both the DMS database 5516 and the data store 5518 are distributed across the nodes 5514, for example using Apache Cassandra. That is, the DMS database 5516 in its entirety is not stored at any one DMS node 5514. Rather, each DMS node 5514 stores a portion of the DMS database 5516 but can access the entire DMS database 5516. Data in the DMS database 5516 preferably is replicated over multiple DMS nodes 5514 to increase the fault tolerance and throughput, to optimize resource allocation, and/or to reduce response time. In one approach, each piece of data is stored on at least three different DMS nodes 5514. The data store 5518 has a similar structure, although data in the data store 5518 may or may not be stored redundantly. Accordingly, if any DMS node 5514 fails, the full DMS database 5516 and the full functionality of the DMS cluster 5512 will still be available from the remaining DMS nodes 5514. As a result, the DMS services can still be provided.

Considering each of the other components shown in FIG. 55, a virtual machine (VM) 5504 is a software simulation of a computing system. The virtual machines 5504 each provide a virtualized infrastructure that allows execution of operating systems as well as software applications such as a database application or a web server. A virtualization module 5506 resides on a physical host (i.e., a physical computing system) (not shown), and creates and manages the virtual machines 5504. The virtualization module 5506 facilitates backups of virtual machines along with other virtual machine related tasks, such as cloning virtual machines, creating new virtual machines, monitoring the state of virtual machines, and moving virtual machines between physical hosts for load balancing purposes. In addition, the virtualization module 5506 provides an interface for other computing devices to interface with the virtualized infrastructure. In the following example, the virtualization module 5506 is assumed to have the capability to take snapshots of the VMs 5504. An agent could also be installed to facilitate DMS services for the virtual machines 5504.

A physical machine 5508 is a physical computing system that allows execution of operating systems as well as software applications such as a database application or a web server. In the following example, an agent 5510 is installed on the physical machines 5508 to facilitate DMS services for the physical machines 5508.

The components shown in FIG. 55 also include storage devices, which for example can be a hard disk drive (HDD), a magnetic tape drive, a solid-state drive (SSD), or a disk array (e.g., a storage area network (SAN) storage device, or a networked-attached storage (NAS) device). A storage device can be separate from or integrated with a physical machine.

The components in FIG. 55 are interconnected with each other via networks, although many different types of networks could be used. In some cases, the relevant network uses standard communications technologies and/or protocols and can include the Internet, local area networks, and other types of private or public networks. The components can also be connected using custom and/or dedicated data communications technologies.

Figure 56:
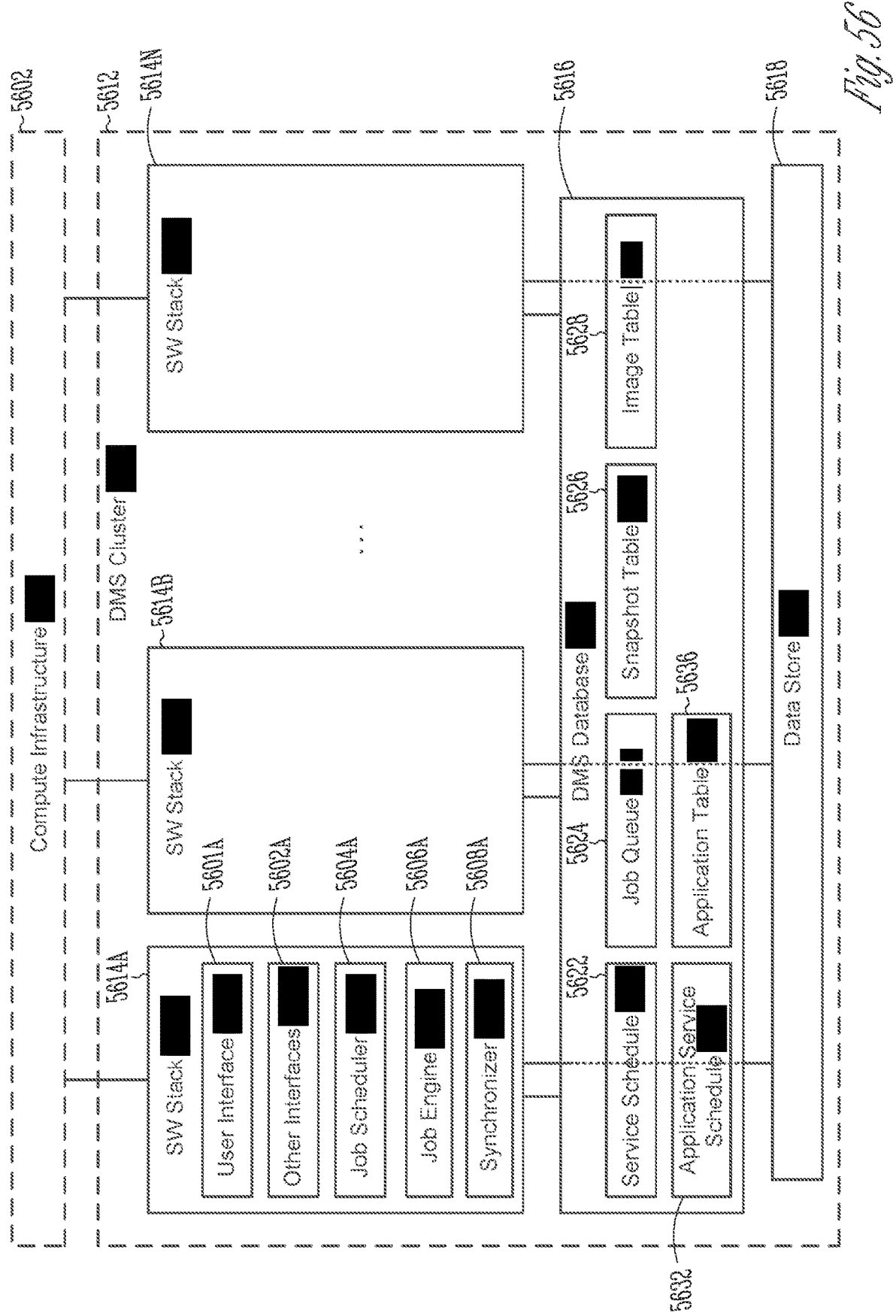
FIG. 56 is a logical block diagram of a data management and storage (DMS) cluster, according to one example.

FIG. 56 is a logical block diagram illustrating an example DMS cluster 5512, according to one example. This logical view shows the software stack 5614a-n for each of the DMS nodes 5514a-n of FIG. 55. Also shown are the DMS database 5516 and data store 5518, which are distributed across the DMS nodes 5514a-n. Preferably, the software stack 5614 for each DMS node 5514 is the same. This stack 5614a is shown only for node 5514a in FIG. 56. The stack 5614a includes a user interface 5601a, other interfaces 5602a, job scheduler 5604a and job engine 5606a. This stack is replicated on each of the software stacks 5614b-n for the other DMS nodes. The DMS database 5516 includes the following data structures: a service schedule 5622, a job queue 5624, a snapshot table 5626 and an image table 5628. The DMS database 5516 can also include an application service schedule 5632 and an application table 5636 in some examples. In the following examples, these are shown as tables, but other data structures could also be used.

The user interface 5601 allows users to interact with the DMS cluster 5512. Preferably, each of the DMS nodes includes a user interface 5601, and any of the user interfaces can be used to access the DMS cluster 5512. This way, if one DMS node fails, any of the other nodes can still provide a user interface. The user interface 5601 can be used to define what services should be performed at what time for which machines in the compute infrastructure (e.g., the frequency of backup for each machine in the compute infrastructure). In FIG. 56, this information is stored in the service schedule 5622. The user interface 5601 can also be used to allow the user to run diagnostics, generate reports, or calculate analytics. In some examples, the user interface 5601 provides for definition of a set of machines as an application. The DMS cluster 5512 may perform synchronized DMS services for the set of machines of the application. Information defining services for applications may be stored in the application service schedule 5632. In some examples, the application service schedule 5632 is integrated with the service schedule 5622. The set of machines of the application may include virtual machines 5504, physical machines 5508, or combinations of virtual machines 5504 and physical machines 5508.

The software stack 5614 also includes other interfaces 5602. For example, there is an interface 5602 to the compute infrastructure 5502, through which the DMS nodes 5514 may make requests to the virtualization module 5506 and/or the agent 5510. In one implementation, the VM 5504 can communicate with a DMS node 5514 using a distributed file system protocol (e.g., Network File System (NFS) Version 3) via the virtualization module 5506. The distributed file system protocol allows the VM 5504 to access, read, write, or modify files stored on the DMS node 5514 as if the files were locally stored on the physical machine supporting the VM 5504. The distributed file system protocol also allows the VM 5504 to mount a directory or a portion of a file system located within the DMS node 5514. There are also interfaces to the DMS database 5516 and the data store 5518, as well as network interfaces such as to the secondary DMS cluster 5512y and to the archive system 5520.

The job schedulers 5604 create jobs to be processed by the job engines 5606. These jobs are posted to the job queue 5624. Examples of jobs are pull snapshot (take a snapshot of a machine), replicate (to the secondary DMS cluster), archive, etc. In some examples, a set of jobs may be associated with an application and performed synchronously. For example, snapshots may be generated for the set of machines associated with the application to generate a snapshot of the application. Some of these jobs are determined according to the service schedule 5622 or the application service schedule 5632. For example, if a certain machine is to be backed up every 6 hours, then a job scheduler 5604 will post a "pull snapshot" job into the job queue 5624 at the appropriate 6-hour intervals. Other jobs, such as internal trash collection or updating of incremental backups, are generated according to the DMS cluster's operation separate from the service schedule 5622 or application service schedule 5632.

The job schedulers 5604 preferably are decentralized and execute without a master. The overall job scheduling function for the DMS cluster 5512 is executed by the multiple job schedulers 5604 running on different DMS nodes. Preferably, each job scheduler 5604 can contribute to the overall job queue 5624 and no one job scheduler 5604 is responsible for the entire queue. The job schedulers 5604 may include a fault tolerant capability, in which jobs affected by node failures are recovered and rescheduled for re-execution. In some examples, a job scheduler 5604 performs a scheduling function to cause the DMS cluster 5512 to perform a synchronized DMS service for multiple machines associated with an application.

The job engines 5606 process the jobs in the job queue 5624. When a DMS node is ready for a new job, it pulls a job from the job queue 5624, which is then executed by the job engine 5606. Preferably, the job engines 5606 all have access to the entire job queue 5624 and operate autonomously. Thus, a job scheduler 5604A from one node might post a job, which is then pulled from the job queue 5624 and executed by a different job engine 5606B (not pictured) from a different node.

The synchronizer 5608 performs a synchronization function for DMS services for multiple machines associated with an application. In particular, the synchronizer 5608 may communicate with job engines 5606 to ensure that each job associated with the application is ready for execution prior to authorizing execution of the jobs. As such, the job engines 5606 allocated to the DMS service for the multiple machines can execute synchronously to generate a snapshot of the application at a particular time.

In some cases, a specific job is assigned to or has preference for a particular DMS node (or group of nodes) to execute. For example, if a snapshot for a VM is stored in the section of the data store 5518 implemented on a particular node 5514x, then it may be beneficial for the job engine 5606x on that particular node 5514x to pull the next snapshot of the VM if that process includes comparing the two snapshots. As another example, if the previous snapshot is stored redundantly on three different nodes, then the preference may be for any of those three nodes.

The snapshot table 5626 and image table 5628 are data structures that index the snapshots captured by the DMS cluster 5512. In this example, snapshots are decomposed into images, which are stored in the data store 5518. The snapshot table 5626 describes which images make up each snapshot. For example, the snapshot of machine x taken at time y can be constructed from the images a,b,c. The image table 5628 is an index of images to their location in the data store 5518. For example, image a is stored at location aaa of the data store 5518, image b is stored at location bbb, etc.

The application table 5636 is a data structure that indexes the application snapshots captured by the DMS cluster 5512. An application snapshot may include a set of snapshots of individual machines. Each of the snapshots associated with the application may also be referenced in the snapshot table 5626. In some examples, the application table 5636 is integrated with the snapshot table 5626. More details of example implementations are provided in FIGS. 3, 4, and 5 below.

DMS database 5516 also stores metadata information for the data in the data store 5518. The metadata information may include file names, file sizes, permissions for files, and various times such as when the file was created or last modified.

FIGS. 57, 58, and 59 illustrate operation of the DMS system shown in FIGS. 55-56. FIGS. 57 and 58 illustrate management of individual machines of the computer infrastructure, while FIG. 59 illustrates management at a higher application level. FIG. 57A is an example of a service schedule 5622. The service schedule defines which services should be performed on what machines at what time. It can be set up by the user via the user interface, automatically generated, or even populated through a discovery process. In this example, each row of the service schedule 5622 defines the services for a particular machine. The machine is identified by machine_user_id, which is the ID of the machine in the compute infrastructure. It points to the location of the machine in the user space, so that the DMS cluster can find the machine in the compute infrastructure. In this example, there is a mix of virtual machines (VMxx) and physical machines (PMxx). The machines are also identified by machine_id, which is a unique ID used internally by the DM cluster.

The services to be performed are defined in the SLA (service level agreement) column. Here, the different SLAs are identified by text: standard VM is standard service for virtual machines. Each SLA includes a set of DMS policies (e.g., a backup policy, a replication policy, or an archival policy) that define the services for that SLA. For example, "standard VM" might include the following policies:

Backup policy: The following backups must be available on the primary DMS cluster 5512x: every 6 hours for the prior 2 days, every 1 day for the prior 30 days, every 1 month for the prior 12 months.

Replication policy: The backups on the primary DMS cluster for the prior 7 days must also be replicated on the secondary DMS cluster 5512y.

Archive policy: Backups that are more than 30 days old may be moved to the archive system 5520.

The underlines indicate quantities that are most likely to vary in defining different levels of service. For example, "high frequency" service may include more frequent backups than standard. For "short life" service, backups are not kept for as long as standard.

From the service schedule 5622, the job schedulers 5604 populate the job queue 5624. FIG. 57B is an example of a job queue 5624. Each row is a separate job. Job_id identifies a job and start time is the scheduled start time for the job. Job_type defines the job to be performed and job_info includes additional information for the job. Job 00001 is a job to "pull snapshot" (i.e., take backup) of machine m001. Job 00003 is a job to replicate the backup for machine m003 to the secondary DMS cluster. Job 00004 runs analytics on the backup for machine m002. Job 00005 is an internal trash collection job. The jobs in queue 5624 are accessible by any of the job engines 5606, although some may be assigned or preferred to specific DMS nodes.

FIG. 57C shows examples of a snapshot table 5626 and image table 5628, illustrating a series of backups for a machine m001. Each row of the snapshot table 5626 is a different snapshot and each row of the image table 5628 is a different image. The snapshot is whatever is being backed up at that point in time. In the nomenclature of FIG. 57C, m001.ss1 is a snapshot of machine m001 taken at time t1. In the suffix ".ss1", the .ss indicates this is a snapshot and the 1 indicates the time t1. m001.ss2 is a snapshot of machine m001 taken at time t2, and so on. Images are what is saved in the data store 5518. For example, the snapshot m001.ss2 taken at time t2 may not be saved as a full backup. Rather, it may be composed of a full backup of snapshot m001.ss1 taken at time t1 plus the incremental difference between the snapshots at times t1 and t2. The full backup of snapshot m001.ss1 is denoted as m001.im1, where ".im" indicates this is an image and "1" indicates this is a full image of the snapshot at time t1. The incremental difference is m001.im1-2 where "1-2" indicates this is an incremental image of the difference between snapshot m001.ss1 and snapshot m001.ss2.

In this example, the service schedule 5622 indicates that machine m001 should be backed up once every 6 hours. These backups occur at 3 am, 9 am, 3 pm and 9 pm of each day. The first backup occurs on Oct. 1, 2017 at 3 am (time t1) and creates the top rows in the snapshot table 5626 and image table 5628. In the snapshot table 5626, the ss_id is the snapshot ID which is m001.ss1. The ss_time is a timestamp of the snapshot, which is Oct. 1, 2017 at 3 am. im_list is the list of images used to compose the snapshot. Because this is the first snapshot taken, a full image of the snapshot is saved (m001.im1). The image table 5628 shows where this image is saved in the data store 5518.

On Oct. 1, 2017 at 9 am (time t2), a second backup of machine m001 is made. This results in the second row of the snapshot table for snapshot m001_ss2. The image list of this snapshot is m001.im1 and m001.im1-2. That is, the snapshot m001_ss2 is composed of the base full image m001.im1 combined with the incremental image m001.im1-2. The new incremental image m001.im1-2 is stored in data store 5518, with a corresponding entry in the image table 5628. This process continues every 6 hours as additional snapshots are made.

For virtual machines, pulling a snapshot for the VM typically includes the following steps: freezing the VM and taking a snapshot of the VM, transferring the snapshot (or the incremental differences) and releasing the VM. For example, the DMS cluster may receive a virtual disk file that includes the snapshot of the VM. The backup process may also include deduplication, compression/decompression and/or encryption/decryption.

From time to time, these tables and the corresponding data are updated as various snapshots and images are no longer needed or can be consolidated. FIGS. 58A-58D show an example of this. FIG. 58A shows the snapshot table 5626 and image table 5628 after backups have been taken for 3 days using the process described in FIG. 57. However, if the service schedule 5622 requires 6-hour backups only for the past 2 days, then the 6-hour backups for the first day October 1 are no longer needed. The snapshot m001.ss1 is still needed because the service schedule 5622 requires daily backups, but snapshots .ss2, .ss3 and .ss4 can be deleted and are removed from the snapshot table 5626, as indicated by the cross-hatching in FIG. 58B. However, the incremental images .im1-2, .im2-3 and .im3-4 are still required to build the remaining snapshots.

In FIG. 58C, the base image is updated from .im1 to .im5. That is, a full image of snapshot 5 is created from the existing images. This is a new row at the bottom of the image table 5628. The im_list for snapshots .ss5 to .ss12 are also updated to stem from this new base image .im5. As a result, the incremental images .im1-2, .im2-3, .im3-4 and .im4-5 are no longer required, and they can be deleted from the data store and from the image table 5628. However, the data store now contains two full images: .im1 and .im5. Full images are usually much larger than incremental images. This redundancy can be addressed by creating a backwards incremental image .im5-1, shown in FIG. 58D as a new row in the image table 5628. With the addition of this backwards incremental image, the full image .im1 is no longer needed.

FIGS. 58A-58D illustrate backup at an individual machine level. FIGS. 59A-C illustrate backup at an application-level. An application may be implemented across multiple machines. As a result, it is desirable that all of the component machines are backed up approximately at the same time. FIG. 59A is an example of an application service schedule 5632. Typically, this service schedule is in addition to the machine-level service schedule of FIG. 57A. The application service schedule 5632 defines which services for applications, each defined by a set of machines, should be performed and at what time. Each row of the application service schedule 5632 defines the services for a particular application. The application is identified by application_user_id, which is the ID of the application in the compute infrastructure, and by application_id, which is the ID of the application used internally by the DM cluster 5512x. The machines of each application may be identified by the machine_id, which is the unique ID used internally by the DM cluster 5512x. Furthermore, the services to be performed for each application are defined by the SLA column of the application service schedule 5632. In some examples, each application may have a single SLA shared with the set of machines of the application. However, the SLAs for machines within an application may vary.

Application APP01 is an application including machines m001, m002, m003, and a "standard application" SLA. Application APP02 includes machines m004, m005, and a "short life" SLA. Application APP03 includes machines m006, m007, and a "high frequency" SLA. Application APP04 includes machines m008, m009, and m001, and a "standard application" SLA. An application SLA may include a collection of SLAs for a set of machines. The SLAs for each machine may be the same or different. In some examples, each machine_id is associated with an SLA as shown in the service schedule 5622. An application may include two or more machines, and the machines may include virtual machines, physical machines, or combinations of virtual machines and physical machines. Furthermore, two or more applications may share a machine.

FIG. 59B is an example of the job queue 5624 of FIG. 57B but modified to include synchronized jobs for applications. Like the job queue 5624 in FIG. 57B, each row is a separate job identified by job_id. Furthermore, the job queue 5624 may include an application_id column or other identifier to indicate that the job is associated with an application. Jobs 00001 through 00003 are jobs associated with the application APP01. These jobs may share a common job_type, as well as a common start time such that the jobs associated with the application are synchronized. Jobs 00010 through 00011 are jobs associated with the application APP02, and also share the same start_time and job_type. In some examples, the jobs of an application may include different job_types. Job_info includes additional information for the job, such as the machine_id for the job. Jobs may be added to the jobs queue 5624 based on the service schedule 5622, the application service schedule 5632, or both.

FIG. 59C is an example of an application table 5636, illustrating backups for an application. The rows in the application table 5636 indicate the relations between application snapshots and the individual machine snapshots that form the application snapshots. The nomenclature for snapshots discussed above for the snapshot table 5626 may be applicable to the application table 5636. For example, app001.ss1 is a snapshot of an application app001 taken at time t1. Furthermore, snapshots m001.ss1, m002.ss1, and m003.ss1 are snapshots of machines m001, m003, and m003 associated with the application taken at the time t1. The ss_time is a timestamp of the snapshots, which should be the same time or close in time for each of the snapshots associated with the application. Furthermore, snapshot_child_list defines for each application the set of machines associated with the application. Snapshot_parent_list defines for each machine the application to which the machine belongs. App001.ss2 is a snapshot of the application taken at a time t2. Snapshots m001.ss2, m002.ss2, and m003.ss2 are snapshots of machines m001, m003, and m003 associated with the application taken at the time t2.

The snapshots of the machines may be full snapshots or incremental snapshots, as may be defined in the snapshot table 5626 of FIG. 57C. In some examples, each machine-level snapshot associated with an application may be defined with reference to a snapshot table 5626 and image table 5628, as shown in FIG. 57C. In some examples, the application table 5636 is integrated with the snapshot table 5626. For example, the application table 5636 may include an im_list to define images of the snapshots associated the application. In some examples, the application table 5636 lists only application snapshots with references to snapshots of individual machines stored in the snapshot table 5626.

The description above is just one example. The various data structures may be defined in other ways and may contain additional or different information.

In some examples, the DMS clusters 5512 provide DMS services for a set of machines, such as VMs 5504 and/or PMs 5508, which implement an application. The DMS services may include backup, recovery, replication, archival, and analytics services. For example, an application may include one or more database servers, file servers, and web servers distributed across multiple machines. The DMS clusters 5512 perform synchronized data fetch jobs for the set of machines in the application.

Figure 60:
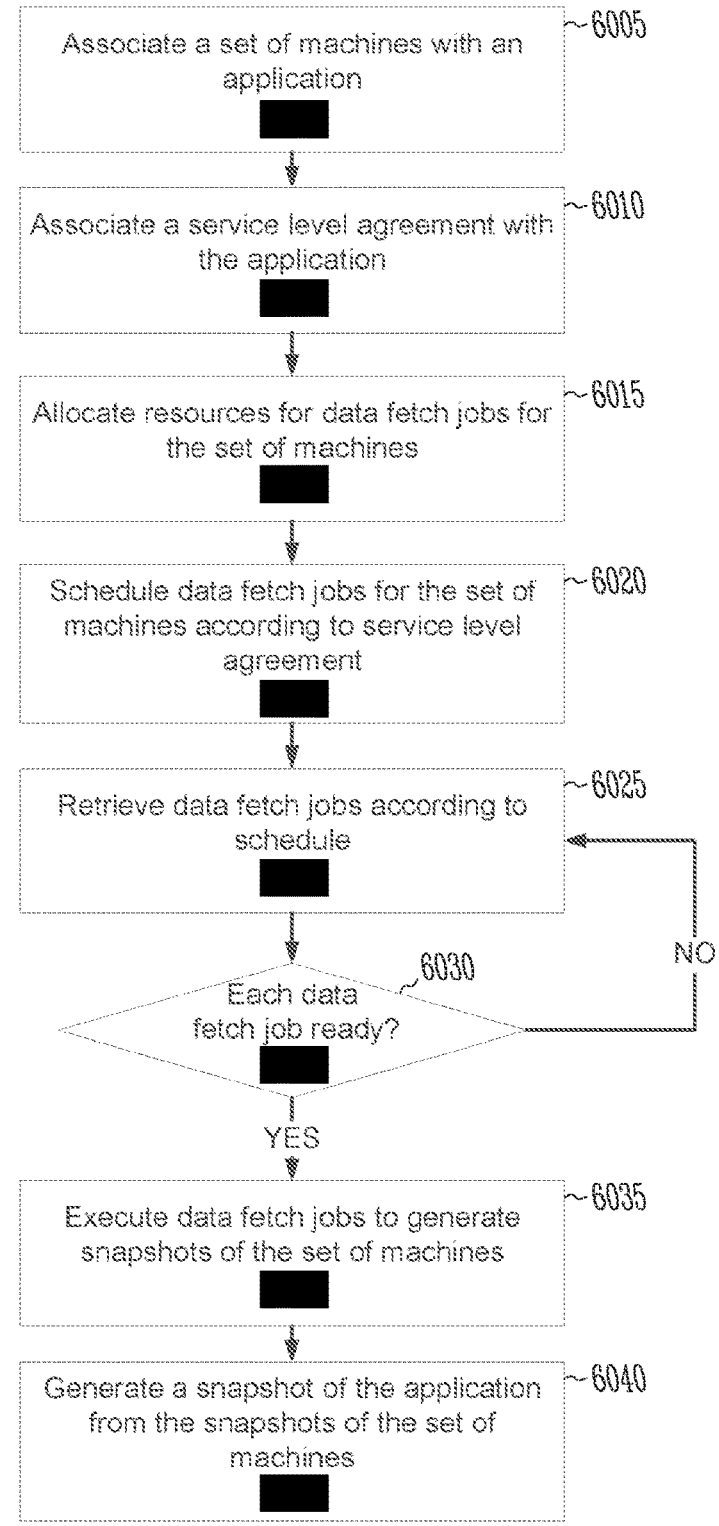
FIG. 60 is a flow chart of a process for managing data for an application, according to one example.

FIG. 60 is a flow chart of a process 6000 for generating a snapshot of an application, according to one example. The snapshot of the application refers to synchronized snapshots of multiple machines associated with the application. The process 6000 is discussed as being performed by DMS cluster 5512, although other types of computing structures may be used. In some examples, the process 6000 may include different and/or additional steps, or some steps may be in different orders.

At operation 6005 a DMS cluster 5512 (e.g., the job scheduler 5604a of a DMS node 5514a) associates a set of machines with an application. For example, a user of the compute infrastructure 5502 may access the DMS cluster 5512 via user interface 5601 to define the machines associated with the application in the compute infrastructure 5502. Furthermore, the user interface 5601 may be used to define what services should be performed at what time for the machines associated with the application.

In some examples, the job scheduler 5604a stores the association between the set of machines with the application using an application service schedule 5632. For example, the application service schedule 5632 may store in each row an application as identified by application_id, multiple machines associated with the application as identified by machine_user_id and/or machine_id, and the SLA(s) associated with the multiple machines. As discussed above, the machine_user_id refers to the ID of the machine in the compute infrastructure 5502, while the machine_id refers to a unique ID used internally by the DM cluster 5512.

At operation 6010 the DMS cluster 5512 (e.g., the job scheduler 5604a) associates one or more SLAs associated with the application. The services to be performed on each of the machines of the application are defined in the SLA. In some examples, the same SLA is associated with each of the set of machines of the application. In other examples, different machines may be associated with different SLAs, such as different backup (or "data fetch"), replication, or archive policies. In some examples, each of the machines may share the same backup policy in terms of frequency to synchronize the backup of the application but include different replication or archive policies. In some examples, the job scheduler 5604a stores the SLA in association with the application within a row of the service schedule 5632.

At operation 6015 the DMS cluster 5512 (e.g., the job scheduler 5604a) allocates processing and storage resources for data fetch jobs for the set of machines. For example, the job scheduler 5604a may perform an automated discovery operation to determine the machines, files, etc. of the application, and uses this information to determine the amount of processing and storage resources needed for allocation to the job. To perform multiple data fetch jobs for the machines of the application at the same or substantially the same time, the job scheduler 5604a may allocate a minimal amount of the processing resources of the DNS nodes 5514 and the storage resources of the data store 5518. In some examples, the job scheduler 5604a may define or update the size of the DMS cluster 5512 by associating multiple DMS nodes 5514 needed to perform the jobs with the DMS cluster 5512. The amount of resources allocated may vary, for example, based on the number of machines of the application, the amount of data to be transferred, or the amount of DMS nodes 5514 authorized for a user or compute infrastructure 5502.

At operation 6020 the DMS cluster 5512 (e.g., the job scheduler 5604a) schedules the data fetch jobs for the set of machines according to the SLA. For example, the job scheduler 5604a populates the job queue 5624 with data fetch jobs for the machines of the application according to the application service schedule 5632. Each data fetch job for a machine may be a separate row in the job queue 5624. Each job may be identified by the job_id, and may be associated with a start_time defining the scheduled start time for the job. The type of job may be defined by job_type, which for a data fetch job may be specified as "pull snapshot." Additional information regarding each job may be defined by job_info, such as the machine_id of the machine. In some embodiments, each job may further be associated with the application as defined by application_id in the jobs queue 5624. The application_id indicates the application associated with job, and multiple job_ids may be associated with the same application_id to indicate a job belongs to an application and thus should be synchronized with other jobs of the application that share the application_id in the jobs queue 5624.

At operation 6025 the DMS cluster 5512 (e.g., the job engine 5606 of one or more DMS nodes 5514 of the DMS cluster 5512) retrieves the data fetch jobs according to the schedule. For example, the job engine 5606 of multiple DMS nodes 5514 may monitor the jobs queue 5624, and retrieve the jobs associated with the application from the job queue for execution at the defined start time. In some examples, each job engine 5606 may retrieve one of the jobs defined in a row of the job queue. In some examples, each DMS node 5514 allocates processing and memory resources needed to execute the job. If resources are unavailable, the DMS node 5514 may determine that its retrieved job fails to be ready for execution.

At operation 6030 the DMS cluster 5512 (e.g., a synchronizer 5608a of the DMS node 5514a) determines whether each of the data fetch jobs associated with the application is ready for execution. The data fetch jobs may be determined as ready for execution when each of the jobs associated with the application has been retrieved by a job engine 5606 from the jobs queue 5624, or when the jobs engines 5606 is otherwise ready to execute the data fetch jobs (e.g., in parallel, at the defined start time). In some examples, each job engine 5606 of multiple DMS nodes 5514 that has retrieved a job associated with the application or is otherwise ready to execute the job sends a message to the synchronizer 5608a. The synchronizer 5608a may determine that a message has been received for each of the jobs associated with the application and may send a message to each of the job engines 5606 that enables job execution. In some examples, the synchronizer 5608a may monitor the jobs queue 5624 to determine each of the jobs associated with the application have been retrieved from the jobs queue 5624, and then enables the job execution when each of the jobs associated with the application have been retrieved from the jobs queue 5624.

In response to determining that at least one of the data fetch jobs fail to be ready for execution, at operation 6025 the DMS cluster 5512 (e.g., the job engines 5606) retrieves remaining data fetch jobs. In some examples, the synchronizer 5608a may delay execution of the data fetch jobs until each of the data fetch jobs is ready for execution. The synchronizer 5608a may wait until a message has been received for each of the jobs associated with the application before enabling each of the job engines 5606 to execute their job. In some examples, the synchronizer 5608a may allocate additional resources, such as an additional DMS node 5514, for a scheduled job that has caused delay in the parallel job execution.

In response to determining that each of the data fetch jobs is ready for execution, at operation 6035 the DMS cluster 5512 (e.g., the job engines 5606 of multiple DMS nodes 5514) executes the data fetch jobs to generate snapshots of the set of machines. The job engines 5606 of multiple DMS nodes 5514 may generate the snapshots of the machines of the application in parallel (e.g., as defined by the shared start time for the jobs) by capturing data from the compute infrastructure 5502 to generate a synchronous snapshot of the application. Each job engine 5606 may freeze a machine and take the snapshot of the machine, transferring the snapshot (or the incremental differences), and release the machine. As the needed resources for each of the fetch jobs has been allocated, and each of the job engines 5606 has retrieved a respective job of the application for execution, the snapshots of the machines are synchronized. Furthermore, the reliability of the jobs is increased.

At operation 6040 the DMS cluster 5512 (e.g., the job engines 5606) generates a snapshot of the application from the snapshots of the set of machines. The snapshots of the set machines may include full images, incremental images, or combinations of full and incremental images. Furthermore, the snapshot of the application may include the snapshots of the set of machines in a distributed data store, such as the backup data stored in the data store 5518. In some examples, the DMS cluster 5512 generates the snapshot of the application by associating the snapshots of the set of machines with the application in an application snapshot table 5636. Furthermore, each snapshot and its corresponding image(s) may be defined in the snapshot table 5626 and the image table 5628.

Although the process 6000 is discussed with respect to data fetch jobs, other types of synchronized jobs for multiple machines may be performed using the process 6000. As discussed above, the DMS cluster 5512 is not limited to backup or data fetch jobs, and may also provide other DMS services including recovery, replication, trash collection, archival, and analytics services. Furthermore, the process 6000 may be repeated to generate multiple snapshots of the application. Jobs for each snapshot of the application may be placed in the jobs queue 5624 and retrieved by DMS nodes to execute the jobs. Each of the DMS nodes 5514 may be "peers," and the DMS services for particular machines may be processed by different DMS nodes 5514 of the DMS cluster 5512 (e.g., for different application snapshots). In some examples, the process 6000 may be performed to provide synchronized DMS services for other groups of machines other than machines for an application.

Figure 61:
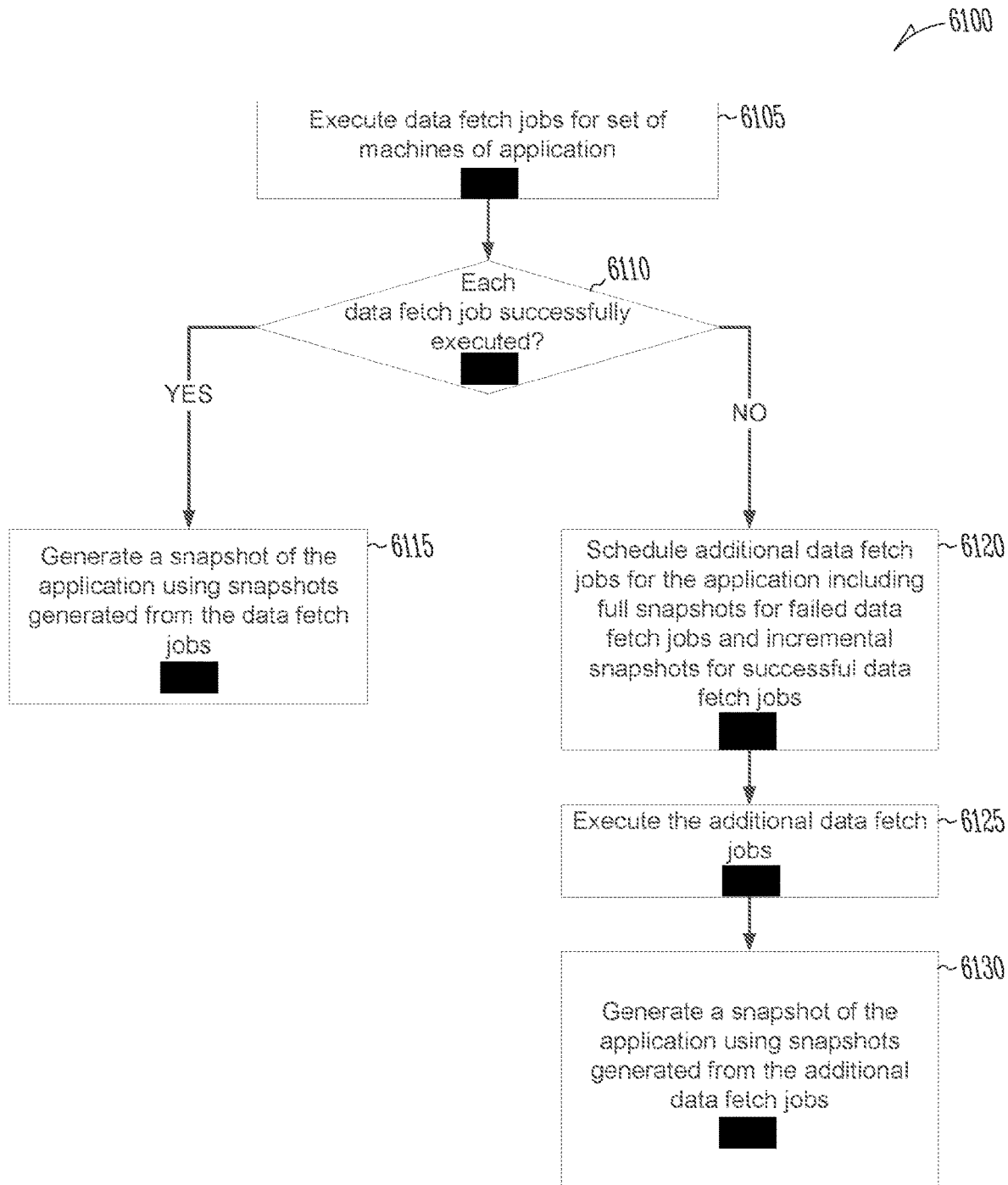
FIG. 61 is a flow chart of a process for generating a snapshot of an application using full and incremental snapshots, according to one example.

FIG. 61 is a flow chart of a process 6100 for generating a snapshot of an application, according to one example. The process 6100 may include performing additional data fetch jobs for an application when at least one of the data fetch jobs fail to successfully execute. In the additional data fetch jobs, a synchronized snapshot of the application is generated using incremental snapshots for machines associated with previously successfully data fetch jobs, and full snapshots for machines associated with previously failed data fetch. The process 6100 is discussed as being performed by DMS cluster 5512, although other types of computing structures may be used. In some examples, the process 6100 may include different and/or additional steps, or some steps may be in different orders.

At operation 6105 the DMS cluster 5512 (e.g., the job engines 5606) executes data fetch jobs associated with an application. The discussion at 6035 of the process 6000 may be applicable at 6105.

At operation 6110 The DMS cluster 5512 (e.g., the job scheduler 5604*a* or the synchronizer 5608*a*) determines whether each of the data fetch jobs of the application has successfully executed. A data fetch job for the application may be determined as successfully executed when a snapshot of each of the set of machines associated with the application has been successfully generated. These data fetch jobs may include captures of full snapshots (e.g., when no prior full snapshot exists, or when a full capture is otherwise desired) or incremental snapshots. However, one or more of the snapshots may fail for various reasons. For example, the freezing machine operation to prepare a machine for snapshot capture may fail, or a hardware or software of the DMS cluster 5512 may fail, or a network connection between the DMS cluster 5512 and the compute infrastructure 5502 may fail. In other examples, the cluster 5512 may have too much input/output operations per second (IOPS) demand on it, resulting in high production workload, or a quality of service (QoS) action failed.

In response to determining that each of the jobs of the application has successfully executed, at operation 6115 the DMS cluster 5512 generates a snapshot of the application using the snapshots of the set of machines generated from the data fetch jobs. For example, the DMS cluster 5512 associates the snapshots of the set of machines with the application by updating an application table 5636. These snapshots, which may include full or incremental snapshots of the set of machines, are incorporated with the snapshot of the application for the defined time (e.g., as specified by start_time in the job queue 5624).

In response to determining that a data fetch job of the application has failed to successfully execute, at operation 6120 the DMS cluster 5512 (e.g., the job scheduler 5604*a* or the synchronizer 5608*a*) schedules additional data fetch jobs for the application including a full snapshot for machines associated with the data fetch jobs that failed and incremental snapshots for other machines associated with the data fetch jobs that succeeded in the execution at 6105.

At operation 6125 the DMS cluster 5512 (e.g., job engine 5606 of one or more DMS nodes 5514 of the DMS cluster 5512) executes the additional data fetch jobs. The discussion for generating a snapshot of the application discussed above in connection with the process 6000 may be applicable at 6120 and 6125. For example, the synchronizer 5608*a* may ensure that all data fetch jobs of the application have been retrieved by DMS nodes 5514. Execution of the additional data fetch jobs, if successful, results in the full snapshots for the machines associated with the data fetch jobs that previously failed and incremental snapshots for the machines associated with the data fetch jobs that previously succeeded.

The DMS cluster 5512 (e.g., job engine 5606 of one or more DMS nodes 5514) generates 6130 the snapshot of the application using snapshots generated from the additional data fetch jobs. For example, the DMS cluster 5512 associates the snapshots generated from the additional data fetch jobs with the application by updating an application table 5636. The snapshot of the application is generated using full snapshots for the machines associated the data fetch jobs that previously failed, the full snapshots for the other machines associated with the data fetch jobs that previously succeeded, and the incremental snapshots for the other machines associated with the data fetch jobs that previously succeeded. The snapshot for the machines associated with data fetch jobs that previously succeeded may each include the (e.g., full or incremental) snapshot previously captured combined with the incremental snapshot captured in the additional data fetch jobs. The snapshot for the machines associated with data fetch jobs that previously failed each include the full snapshot captured in the additional data fetch jobs. As such, a synchronized snapshot of the application may be generated for each set of machines of the application using the additional data fetch jobs.

In some examples, rather than capturing a full snapshots for each machine associated with a data fetch job that previously failed, the DMS cluster 5512 may generate an incremental snapshot based on a prior successful full snapshot, or a prior successful incremental snapshot. Furthermore, the various operations associated with incremental snapshots discussed herein may be performed on the snapshots of the set of machines that form the snapshot of the application, such as so long as the snapshots of the machines remains synchronized. The operations on the snapshots may include consolidating multiple incremental snapshots, deleting unneeded snapshots or incremental snapshots, etc.

The process 6100 may be repeated. For example, if the current synchronized data fetch job for the application results in one or more failed data fetch job executions, then the process 6100 may be repeated to perform a subsequent synchronized data fetch job where the DMS cluster 5512 captures a full snapshot for the failed data fetch jobs in the current synchronized data fetch job, and incremental snapshots of the successful data fetch jobs in the current synchronized data fetch job.

Figure 62:
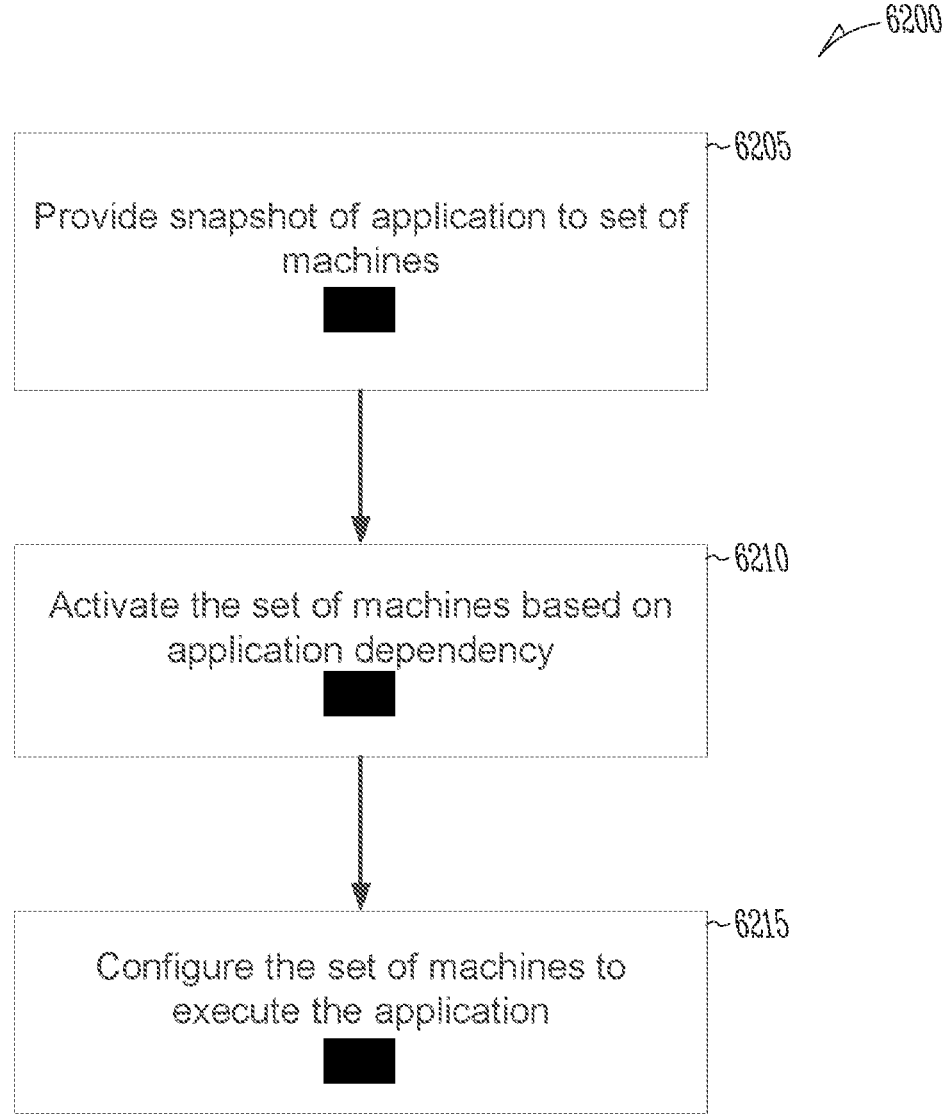
FIG. 62 is a flow chart of a process for recovering an application to a compute infrastructure, according to one example.

FIG. 62 is a flow chart of a process 6200 for recovering an application to a compute infrastructure, according to one examples. The process 6200 is discussed as being performed by DMS cluster 5512, although other types of computing structures may be used. In some examples, the process 6200 may include different and/or additional steps, or some steps may be in different orders.

The DMS cluster 5512 (e.g., job engine 5606 of one or more DMS nodes 5514) provides 6205 a snapshot of an application to a set of machines. The set of machines may be same machines of the compute infrastructure 5502 from which the snapshots of the machines were captured or may be different machines. In some examples, the application includes database servers, file servers, web servers, or other types of servers located across the set of machines. Each machine may contain one or more servers. In some examples, providing the snapshot of the application is performed by placing jobs including a "recovery" job type in the jobs queue for processing by peer DMS nodes 5514 of the DMS cluster 5512. The discussion regarding scheduling and executing the data fetch task in the process 6000 may be applicable to the recovery job. In some examples, the app snapshot is provided to the set of machines based on a predefined recovery priority. The predefined recovery may be defined by a user or programmatically (e.g., based on known dependencies).

The DMS cluster 5512 may provide the snapshot of the application to the compute infrastructure 5502 from the data store 5518 of the DMS cluster 5512, the data store 5518 of another DMS cluster 5512, or a data store of the archive system 5520, or some other location where the snapshots of the set of machines may be stored. In some examples, a single DMS cluster 5512 may provide the snapshot of the application to the set of machines. However, additional DMS clusters 5512 may be used (e.g., in parallel) to increase the speed of the recovery job.

The set of machines are activated 6210 based on application dependency. For example, the web servers may depend on the file servers, and the file servers may depend on the database servers. As such, the machines including database servers may be activated first, the machines including file servers activated second, and the machines including web server activated third. The application dependency and types of servers may vary. In some examples, the application dependency may be stored in the DMS database 5516 as metadata information, or some other location in the DMS cluster 5512.

The set of machines are configured 6215 to execute the application. For example, Internet Protocol (IP) addresses and other networking information may be assigned to each of the machines. In another example, a machine may execute a script to change content within the machine.

Incremental snapshots of virtual machines may be used to facilitate failover and failback processes for application migration between a primary environment and a secondary environment. Failover includes a process of executing a recovery plan configuration (e.g., IP configurations, resource mapping, etc.) and powering on snapshots of an application on the secondary environment, such as a designated recovery site. Failback includes reversing direction of the failover back to the primary environment. The primary and secondary environments may be different types of environments using different native formats for virtual machines. Here, snapshots generated in each environment are converted to formats suitable for the other environment to facilitate the failover and failback.

Figure 63:
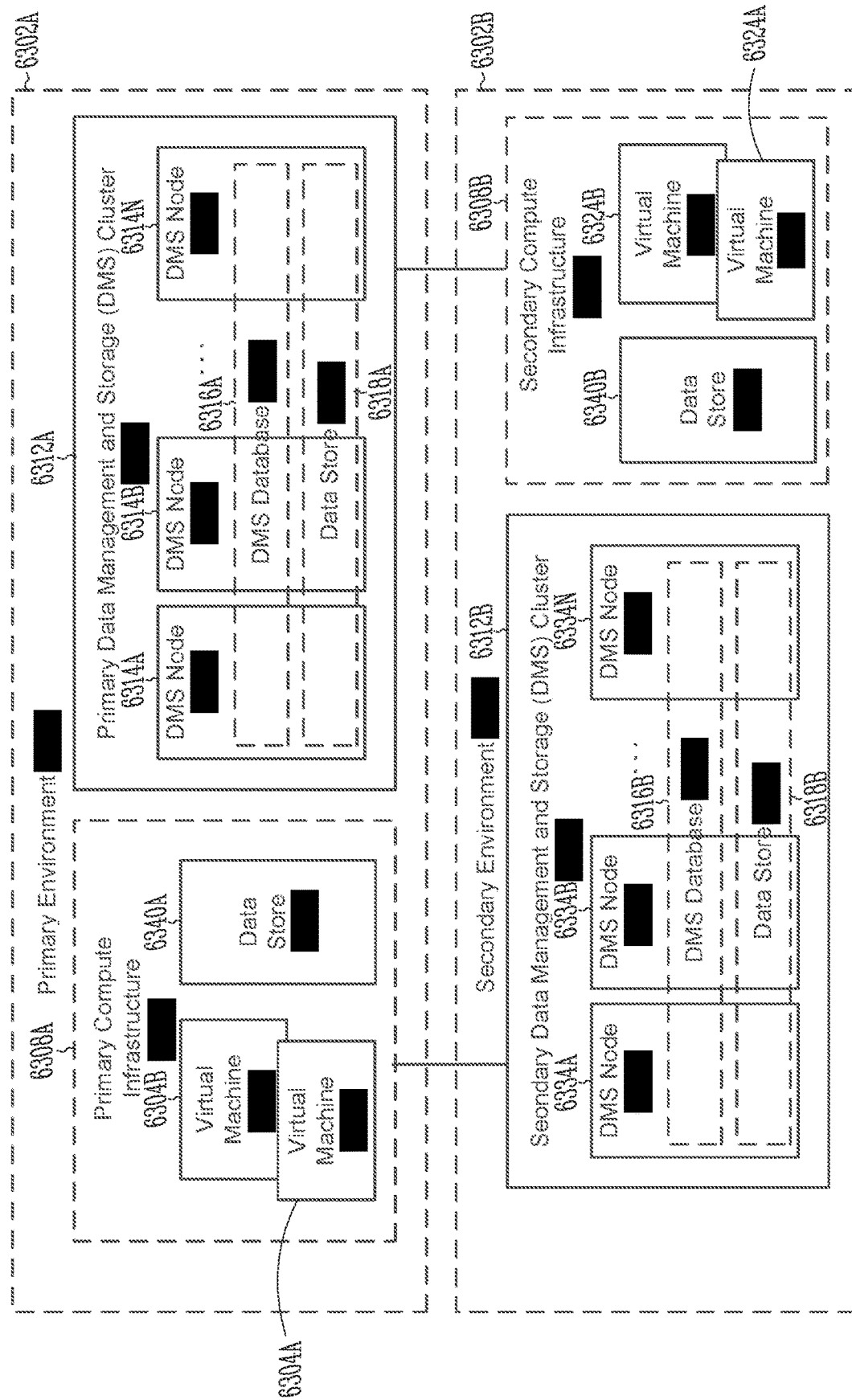
FIG. 63 is a block diagram illustrating a system for managing failover and failback for an application, according to one example.

FIG. 63 is a block diagram illustrating a system for managing failover and failback for an application, according to one examples. The system includes a primary environment 6302a and a secondary environment 6302b. The primary environment 6302a includes a primary compute infrastructure 6308a and a primary DMS cluster 6312a. The primary DMS cluster 6312a includes DMS nodes 6314a through 6314n. The secondary environment 6302b includes a secondary compute infrastructure 6308b and a secondary DMS cluster 6312b. The secondary DMS cluster 6312b includes DMS nodes 6334a through 6334n. Although a single DMS cluster is shown for each of the primary environment 6302a and secondary environment 6302b, the environments 6302a and 6302b may each include multiple DMS clusters. In some examples, the primary DMS cluster 6312a and the secondary DMS cluster 6312b are connected DMS clusters or are the same DMS cluster. In some examples, the secondary environment 6302a is integrated with the archive system 5520.

The primary environment 6302a may be a production environment and the secondary environment 6302b may be a failover environment. In some examples, the primary environment 6302a is an on-premise environment and the secondary environment 6302b is a cloud computing environment remote from the on-premise environment. In another example, the primary environment 6302a and the secondary environment 6302b are both cloud computing environments. In some examples, the primary environment 6302a is a different type of computing environment from the secondary environment 6302b. For example, the virtual machines or snapshots that are native to each environment may use different file formats.

The virtual machines 6304 of the primary compute infrastructure 6308a execute an application while the primary DMS cluster 6312a provides DMS services to the primary compute infrastructure 6308a. As discussed above in the process 6000 of FIG. 60, the primary DMS cluster 6312a may generate a snapshot of the virtual machines 6304. A snapshot of a virtual machine 6304 of the primary environment 6302a is referred to herein as a "primary snapshot." The primary snapshot may include a full snapshot of each of the virtual machines 6304, and any incremental snapshots of the full snapshots. The primary DMS cluster 6312a may generate the primary snapshots according to an SLA of a service schedule 5622 or application service schedule 5632 of the DMS database 6318a. The primary DMS cluster 6312a further stores the primary snapshots in the data store 6318a. The primary snapshots may also be stored in the data store 6340a of the primary compute infrastructure 6308a.

The primary DMS cluster 6312a is coupled to the secondary compute infrastructure 6308b. The primary DMS cluster 6312*a* provides the primary snapshots of the virtual machines 6304 to the secondary compute infrastructure 6308*b*. The secondary compute infrastructure 6308*b* stores the primary snapshots received from the primary environment 6302*a*. Here, the secondary compute infrastructure 6308*b* operates as a replication or archive storage location for the primary snapshots.

The secondary compute infrastructure 6308*b* includes a data store 6340*b* and virtual machines 6324. The data store 6340*b* receives the primary snapshots of the virtual machines 6304 from the DMS cluster 6312*a* and stores the primary snapshots. Responsive to a failure of the primary compute infrastructure 6308, the secondary environment 6302*b* executes a failover process where the primary snapshots stored in the data store 6340*b* are deployed as virtual machines 6324. Each virtual machine 6304 corresponds with a virtual machine 6324. The primary snapshots may include a full snapshot of the virtual machines 6304, and any incremental snapshots of the full snapshots. The virtual machines 6324 execute the application while the virtual machines 6304 of the primary compute infrastructure 6308*a* are inactive. The secondary compute infrastructure 6308*b* provides a failover environment for the primary compute infrastructure 6308*a*. For testing purposes, the primary and secondary compute infrastructures 6308 may execute the application in parallel.

In some examples, the primary snapshots of the virtual machines 6304 stored in the data store 6340*b* are converted into a format suitable for deployment in the secondary compute infrastructure 6308. For example, the primary snapshots of the virtual machine 6304 may be in a Virtual Machine Disk (VMDK) format when captured by the primary DMS cluster 6312*a*, and may be converted into an Amazon Machine Image (AMI) format when the secondary compute infrastructure 6308*b* is an Amazon Web Service (AWS) cloud computing infrastructure. The format conversion may include conversion of full or incremental primary snapshots, and results in the primary snapshots being stored in a native format of the secondary compute infrastructure 6308*b*. In some examples, the primary snapshots are captured in a native format of the primary compute infrastructure 6308*a*. The data in the AMI format may be deployed as virtual machines 6324 within Elastic Compute Cloud ("EC2") instances with Elastic Block Store (EBS) volumes. The VMDK and AMI formats are only examples, and other types of formats and conversions for migration between the primary and secondary environments may be used.

When the virtual machines 6324 of the secondary environment 6302*b* execute the application, the secondary DMS cluster 6312*b* may generate "secondary snapshots" of the virtual machines 6324 in the secondary environment 6302*b*. A secondary snapshot, as used herein, refers to a snapshot of a virtual machine of the secondary environment 6302*b*. In some examples, each secondary snapshot of a virtual machine 6324 is an incremental snapshot of one or more primary snapshot of a corresponding virtual machine 6304. For example, the secondary DMS cluster 6312*b* generates incremental snapshots of the virtual machines 6324 based on the SLA of a service schedule 5622 or application service schedule 5632 stored in the DMS data store 6318*b* of the secondary DMS cluster 6312*b*. The SLA stored in the DMS database 6316*b* may define the same policies as the SLA stored in the DMS database 6316*a* to retain the same DMS policies in the failover environment as the primary environment. The secondary DMS cluster 6312*b* stores the secondary snapshots in the DMS database 6316*b*.

In some examples, the secondary snapshots are generated in a native format of the secondary compute infrastructure 6308*b* and converted to the format of the primary snapshots. For example, the secondary snapshots may be snapshots of EBS volumes of the secondary compute infrastructure 6308*b* that are converted into the VMDK format of the primary compute infrastructure 6308*a*.

The secondary DMS cluster 6312*b* provides the secondary snapshots of the virtual machines 6324 to the data store 6340*a* of the primary compute infrastructure 6308*a*. To that end, the secondary DMS cluster 6312*b* is coupled to the primary compute infrastructure 6308*a*, such as via a network including the Internet. The secondary snapshots of each virtual machine 6324 are stored as incremental snapshots of the primary snapshots of a corresponding virtual machine 6304 to provide a snapshot for each virtual machine 6304. Here, a snapshot of a virtual machine includes at least one primary snapshot and at least one incremental secondary snapshot. By combining primary and secondary snapshots, the integrated snapshot reflects the state of the application prior to failover combined with modifications to the application from execution in the secondary environment 6302*b* prior to failback. In some examples, the secondary snapshots may be stored in the data store 6318*a* of the primary DMS cluster 6312*a*, which may provide the secondary snapshots to the data store 6340*a*.

Responsive to restoration of the primary compute infrastructure 6308*a* or in response to user input, the failback process is initiated where the snapshots are deployed as the virtual machine 6304 of the primary compute infrastructure 6308*a*. The virtual machines 6324*b* of the secondary compute infrastructure 6308*b* may be powered down. Furthermore, the primary DMS cluster 6312*a* may continue to generate primary snapshots of the virtual machines 6304*a* according to the SLA stored in the DMS database 6316*a*.

Figure 64:
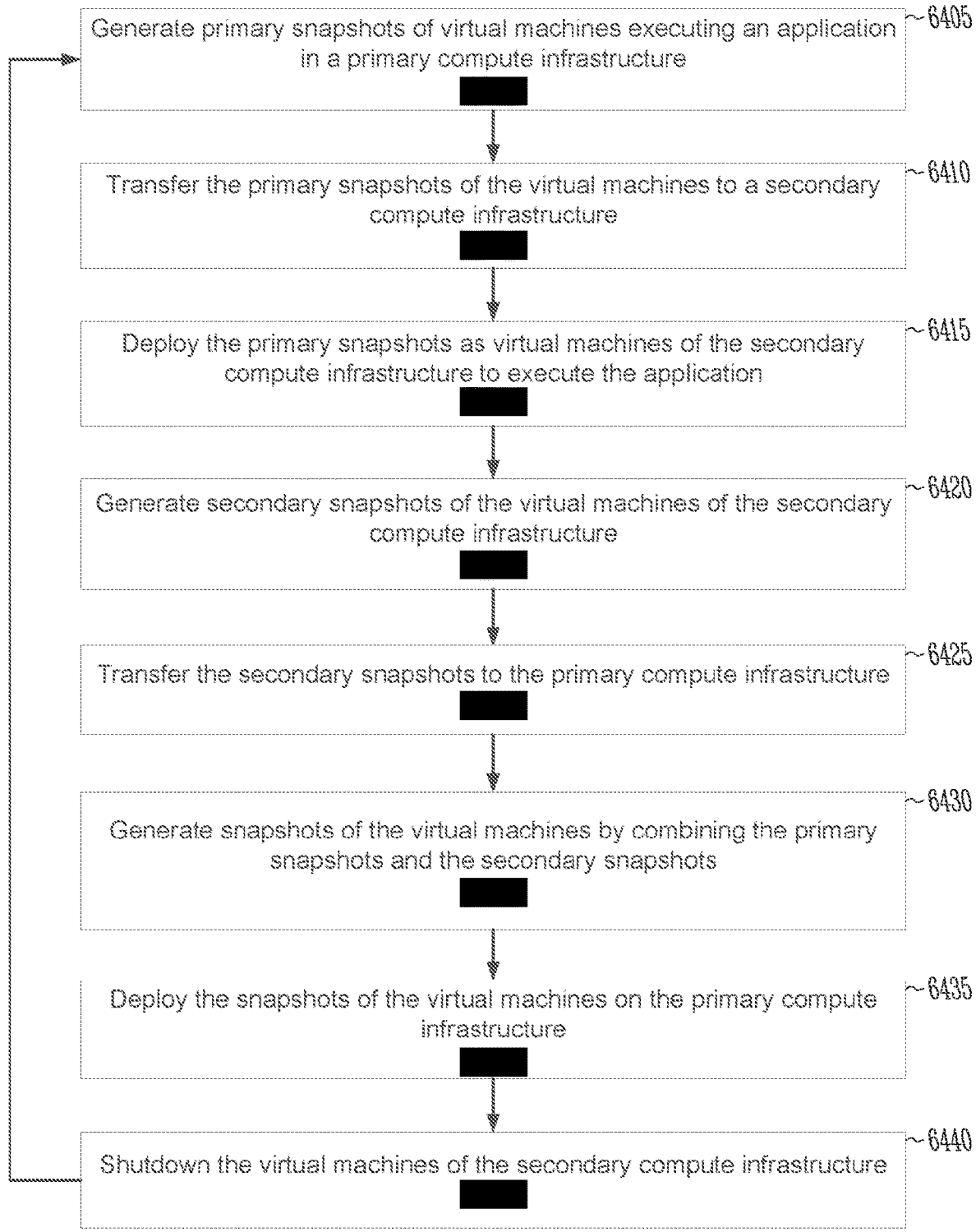
FIG. 64 is a flow chart of a process for failover and failback of an application between a primary compute infrastructure and a secondary compute infrastructure, according to one example.

FIG. 64 is a flow chart of a process 6400 for failover and failback of an application between a primary compute infrastructure and a secondary compute infrastructure, according to one examples. The process 6400 is discussed as being performed by the primary environment 6302*a* and secondary environment 6302*b*, although other types of computing structures may be used. In some examples, the process 6400 may include different and/or additional steps, or some steps may be in different orders.

A primary DMS cluster 6312*a* generates 6405 primary snapshots of virtual machines 6304 executing an application in a primary compute infrastructure 6308*a*. The primary snapshots may include full snapshots and/or incremental snapshots of the virtual machines 6304. For example, a full snapshot may be generated for each virtual machine 6304, and then subsequent snapshots may be incremental snapshots of the full snapshot. The virtual machines 6304 may include a set of virtual machines of an application including database, file, and web servers. The primary DMS cluster 6312*a* may generate the primary snapshots according to an SLA. The SLA may include backup and replication policies and may be used to populate a service schedule 5622 or application service schedule 5632.

The primary DMS cluster 6312*a* transfers 6410 the primary snapshots of the virtual machines 6304 to a secondary compute infrastructure 6308*b*. In some examples, the primary environment 6302*a* and secondary environment 6302*b* are connected via a network including the Internet. The primary snapshots may be provided to the data store 6340*b* of the secondary compute infrastructure 6308*b*. In some examples, the primary snapshots of the virtual machines 6304 are generated in a native format of the primary compute infrastructure 6308a, converted to a native format of the secondary compute infrastructure 6308b, and stored in the secondary compute infrastructure 6308b in the native format of the secondary compute infrastructure 6308b. The native format of the secondary compute infrastructure 6308b allows the primary snapshots to be deployed in the secondary compute infrastructure 6308b. For example, the primary snapshots may be transferred to the secondary compute infrastructure 6308b in a form suitable for deployment as virtual machines in the secondary compute infrastructure 6308b.

The primary snapshots of the virtual machines 6304 of the primary compute infrastructure 6308b are deployed 6415 as virtual machines 6324 of the secondary compute infrastructure 6308b to execute the application. For example, a failover may be initiated where the primary snapshots are deployed in the secondary compute infrastructure 6308b responsive to a failure in the primary compute infrastructure 6308b, a user input (e.g., for a test), or some other reason. The most recent primary snapshot of each virtual machine 6304 prior to the failure may be used to deploy the virtual machines 6324. Deployment of the virtual machines 6324 to the secondary environment 6302b results in the application being executed in the secondary environment 6302b. The secondary environment 6302b thus provides a failover environment for the application.

In some examples, the deployment of the virtual machines 6324 based on secondary snapshots may be performed using the process 6200 shown in FIG. 62. For example, the secondary snapshots may be activated based on application dependency, and then further configured as needed (e.g., resource mapping and network configuration, virtual machine configuration, inventory location, etc.) to execute the application in the secondary compute infrastructure 6308b.

In some examples, the secondary compute infrastructure 6308b is a cloud computing infrastructure, such as AWS. Here, the secondary snapshots may be in the AMI format such that they may be deployed as virtual machines within EC2 instances with EBS volumes. The format of the secondary snapshot and the type of cloud computing infrastructure of the secondary compute infrastructure 6308b may vary.

The failure in the primary compute infrastructure 6308a may include a planned failover, a data recovery test, or an unplanned failover. In the planned failover, datacenter downtime (e.g., maintenance) is known. In the data recovery test, a demonstration of failover without failback is performed. Here, the primary compute infrastructure 6308a continues to execute the application. The secondary compute infrastructure 6308b may also execute the application to demonstrate capability of executing the application on a recovery site. The secondary compute infrastructure 6308b may execute the application for a designated time period, such as according to compliance and regulations. Subsequent to the testing, the secondary compute infrastructure 6308b may perform a clean-up of resources provisioned during the test and may generate a data recovery report for the test.

In the unplanned failover, the primary environment 6302a is affected by an actual failure. The failure may include a failure in the primary compute infrastructure 6308a and the primary DMS cluster 6312a (e.g., a complete loss for the primary environment 6302a), a failure in the primary compute infrastructure 6308a but not the primary DMS cluster 6312a, or a failure from an interruption in the primary compute infrastructure 6308a.

A secondary DMS cluster 6312b generates 6420 secondary snapshots of the virtual machines 6324 while the virtual machines 6324 are executing the application. In some examples, the SLA used to generate the primary snapshots in the primary environment 6302a is used in the secondary environment 6302b. For example, the primary DMS cluster 6312a may share the SLA for the virtual machines of the application with the secondary DMS cluster 6312b. In another example, the secondary snapshots may use a different SLA or other policy.

In some examples, the secondary snapshot of a virtual machine 6324 is an incremental snapshot of one or more primary snapshots of a virtual machine 6304. The secondary snapshots may be captured in the native format of the secondary compute infrastructure 6308b and converted into a native format of the primary compute infrastructure 6308a.

To generate incremental snapshots, the secondary DMS cluster 6312b may track the difference in between the last snapshot taken of the virtual machine in the primary environment 6302a and the snapshot of the virtual machine in the secondary environment 6302b. Snapshots taken in the primary and secondary environments may be linked and tracked so that the history of snapshots is contiguous.

The secondary DMS cluster 6312b transfers 6425 the secondary snapshots of the virtual machines 6324 to the primary compute infrastructure 6308a. For example, the secondary DMS cluster 6312b may be coupled to the primary compute infrastructure 6308a, such as via a network including the Internet. The secondary snapshots may be incremental snapshots having smaller data size than full snapshots, thus reducing the size of data that needs to be transmitted from the secondary environment 6302b to the primary environment 6302a. The secondary snapshots may be transferred in a form suitable for deployment as virtual machines in the primary compute infrastructure 6308a.

The primary compute infrastructure 6308a generates 6430 snapshots of the virtual machines 6304 by combining the primary snapshots of the virtual machines 6304 with the secondary snapshots of the virtual machines 6324. To initiate the failback from the secondary compute infrastructure 6308b to the primary compute infrastructure 6308a, a current state of the application is reconstructed by combining the primary snapshots generated before the failover and the secondary snapshots generated during the failover.

The primary snapshots of a virtual machine 6304 include a full snapshot of the virtual machine 6304 and may include one or more incremental snapshots of the virtual machine 6304. The secondary snapshots may include one or more incremental snapshots of the virtual machine 6324 that are incremental to the primary snapshot. As such, the snapshot of a virtual machine 6304 includes the state of the virtual machine in the primary environment 6302a prior to failover combined with changes to the state during failover in the secondary environment 6302b. The snapshots may be stored in the data store 6340a for deployment. The known relationship between primary and secondary snapshots allows the virtual machines 6324 to be deployed to the primary compute infrastructure 6308a using virtual machine (VM) linking, and without requiring check sum comparisons between images captured from the primary compute infrastructure 6308a and the secondary compute infrastructure 6308b. Check-sum refers to a bit validation between snapshots, whereas VM linking refers to tracking the VM's state. VM linking may be performed even though machine_id or machine_user_id may be different. For example, the VM01's snapshots are replicated, and another VM that has the history of VM01 is dynamically generated as VM01'.

Even though the new snapshot is VM01' (because the actual VM01 is powered down), the snapshot history of VM01' is linked to VM01. Thus, the snapshot for VM01' may be used with incremental snapshots of VM01.

The snapshots of the virtual machines 6304 are deployed 6435 on the primary compute infrastructure 6308a to execute the application. For example, snapshots may be deployed responsive to the failure of the primary compute infrastructure 6308a being resolved, in response to user input, or some other reason. Deploying the snapshot results in deployment of the application in the current state. The primary environment 6302a thus provides a failback environment for the application subsequent to the failover to the secondary environment 6302b. In some examples, the deployment of the virtual machines 6304 based on snapshots may be performed using the process 6200 shown in FIG. 62. For example, the snapshots of a set of virtual machines 6304 of the application may be activated based on application dependency, and then further configured as needed (e.g., resource mapping and network configuration, virtual machine configuration, inventory location, etc.) to execute the application in the primary compute infrastructure 6308a.

The failback process may vary based on the type of failure in the primary compute infrastructure 6308a. For failure in the primary compute infrastructure 6308a and the primary DMS cluster 6312a, the secondary DMS cluster 6312b may provide the full snapshots to the primary DMS cluster 6312a for deployment on the primary compute infrastructure 6308a. Here, the secondary DMS cluster 6312b may generate the snapshot if a secondary snapshot has been captured. For failure in the primary compute infrastructure 6308a but not the primary DMS cluster 6312a, the second DMS cluster 6312b sends an incremental snapshot to the primary DMS cluster 6312a to generate the snapshot. Because the primary DMS cluster 6312a has retained the primary snapshots, only the incremental snapshots need to be sent. As such, the time to transition back to a protected state (from the secondary environment 6302b to the primary environment 6302a) is reduced. Furthermore, the amount of data transmitted between the environments 6302a and 6302b is reduced, thereby lowering network egress costs.

The virtual machines 6324 of the secondary compute infrastructure 6308b are shut down 6440 to end execution of the application in the secondary compute infrastructure 6308b. Here, the application has been migrated from the secondary environment 6302b to the primary environment 6302a to complete the failback.

The process 6400 may return to 6405, where the primary DMS cluster 6312a continues to generate 6405 primary snapshots of virtual machines 6304 executing the application in the primary compute infrastructure 6308a. The process 6400 may be repeated. In some examples, the primary DMS cluster 6312a or secondary DMS cluster 6312b generates a user interface that allows a user to initiate configure and initiate the process 6400 for failover and/or failback between the primary environment and a secondary environment.

Although the process 6400 is discussed for performing a failover and failback for an application, the process 6400 may be performed to migrate an application between different computing environments, including different cloud computing environments. Furthermore, the process 6400 is discussed for migration of a set of virtual machines of an application but may also be performed for other types of virtual machines.

Figure 65:
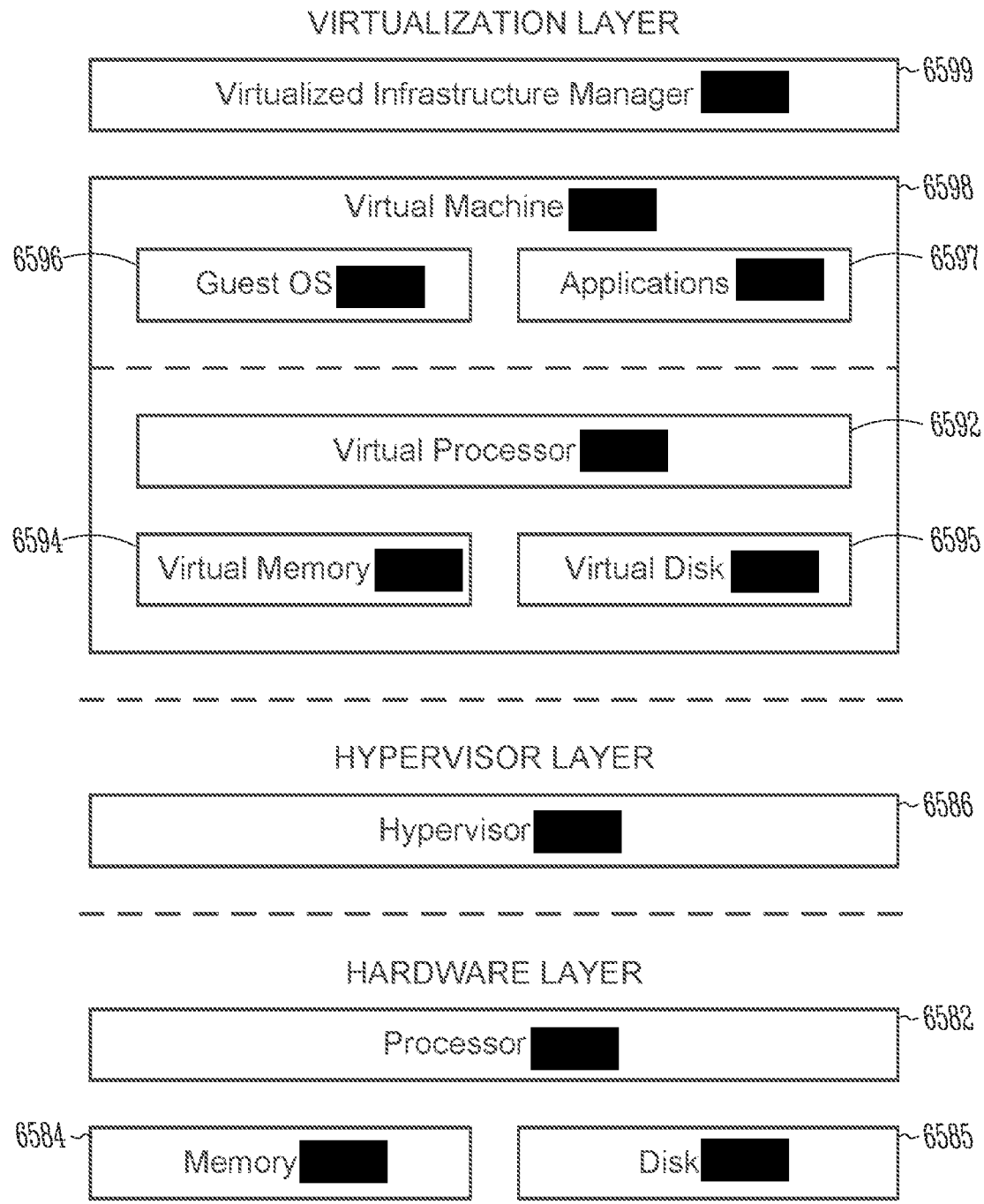
FIG. 65 is a block diagram of a virtual machine, according to one example.

FIG. 65 is a block diagram of a server for a VM platform, according to one examples. The server includes hardware-level components and software-level components. The hardware-level components include one or more processors 6582, one or more memory 6584, and one or more storage devices 6585, for example physical disks. The software-level components include a hypervisor 6586, a virtualized infrastructure manager 6599, and one or more virtual machines 6598. The hypervisor 6586 may be a native hypervisor or a hosted hypervisor. The hypervisor 6586 may provide a virtual operating platform for running one or more virtual machines 6598. Virtual machine 6598 includes a virtual processor 6592, a virtual memory 6594, and a virtual disk 6595. The virtual disk 6595 may comprise a file stored within the physical disks 6585. In one example, a virtual machine may include multiple virtual disks, with each virtual disk associated with a different file stored on the storage devices 6585, such as physical disks. Virtual machine 6598 may include a guest operating system 6596 that runs one or more applications, such as application 6597. Different virtual machines may run different operating systems. The virtual machine 6598 may load and execute an operating system 6596 and applications 6597 from the virtual memory 6594. The operating system 6596 and applications 6597 used by the virtual machine 6598 may be stored using the virtual disk 6595. The virtual machine 6598 may be stored as a set of files including (a) a virtual disk file for storing the contents of a virtual disk and (b) a virtual machine configuration file for storing configuration settings for the virtual machine. The configuration settings may include the number of virtual processors 6592 (e.g., four virtual CPUs), the size of a virtual memory 6594, and the size of a virtual disk 6595 (e.g., a 10 GB virtual disk) for the virtual machine 6598.

The virtualized infrastructure manager 6599 may run on a virtual machine or natively on the server. The virtualized infrastructure manager 6599 corresponds to the virtualization infrastructure manager 199 above and may provide a centralized platform for managing a virtualized infrastructure that includes a plurality of virtual machines. The virtualized infrastructure manager 6599 may manage the provisioning of virtual machines running within the virtualized infrastructure and provide an interface to computing devices interacting with the virtualized infrastructure. The virtualized infrastructure manager 6599 may perform various virtualized infrastructure related tasks, such as cloning virtual machines, creating new virtual machines, monitoring the state of virtual machines, and facilitating backups of virtual machines.

Application Migration—Disaster Recovery (DR) Orchestration

In some examples, DR orchestration is a framework used for mitigating disasters that widely impact physical data centers. Disasters may occur as a result of a ransomware attack or other malware event. In some examples, this mitigation involves "failing over" a set of applications and workloads to a separate physical data center location, using a set of well-defined plans that are easily repeatable, testable, and highly automated. At the time of a disaster, previously created and test plans can quickly and easily be implemented to recover from the disaster.

Some DR orchestration examples may employ, in part, application migration (or app flow) techniques, for example as described further above. Some examples provide DR orchestration capabilities which can be particularly useful for ransomware mitigation. For example, rather than simply orchestrating a failover to a second datacenter or public cloud, an app flow example supports executing DR plans at a primary datacenter, supporting a rollback of applications to a specific point in time, but in a highly orchestrated manner. This helps to ensure a high probability that affected applications will successfully come up after being rolled back. This "local recovery" capability, combined with direct integration to ransomware detection and mitigation products (for example as described above, in which some examples are known as "radar"), can provide an end-to-end solution for detecting ransomware, identifying a specific point in time prior to file-encryption, and rolling back datacenter-wide applications to that point in time.

In some examples, in a "steady state", a user (customer) environment is protected by one or more cloud data management (CDM) systems or methods, for example as described above. Radar (see above) has been deployed and is actively scanning snapshots for evidence of ransomware. An app flow example has been deployed and has been used to create "blueprints". In some examples, a blueprint is a proxy for an application grouping, or configuration. In some examples, blueprints are configured with or include boot priorities and scripts. In some examples, one or more blueprints define a DR orchestration plan (or an existing or desired recovery configuration) that can be used for both failover and local recovery. In some examples, each member of a blueprint has its own associated service level agreement.

In some examples, a blueprint includes a collection of "snappables" or snapshots. In some examples, a "snappable" is, or includes, an object such as a file object that is capable of forming the subject of a snapshot, or being backed up to a database or repository. A collection of snapshots may include snapshots of one or more virtual machines (VMs). In some examples, each snappable (of a VM) in a collection of snappables (of VMs) in a blueprint is protected by its own SLA. In some examples, one SLA may be different to another.

In some examples, one or more blueprints can be used to represent a complex multi-VM application, or specific application configuration. Some examples provide a capability to define a boot order of member VMs (i.e. one or more VMs the subject of a blueprint) and support script execution as part of a recovery. In some examples, successful script execution is a critical piece of providing automated recovery and restoration of complex applications.

In an example ransomware attack workflow, anomalies on specific VMs are detected via Radar. Radar may be used to identify the last known safe (or good) point in time prior to the encryption (ransomware) event. Radar recognizes that infected VMs are part of one or more blueprints defined in the app flow. In some examples, via a GUI, a user can select an option to execute an orchestrated recovery via the app flow and associated blueprints. Radar sends the VM data and last known safe (or good) point-in-time to the app flow. The app flow shows, via the GUI, the user all impacted blueprints, along with options for an orchestrated local recovery.

Some DR orchestration examples provide options to restore to a quarantine environment. Some DR orchestration examples enable a user to confirm or identify a blueprint to be recovered. In some examples, an app flow executes an orchestrated recovery at a production site. In some examples, a local recovery capability enables broader applicability for an orchestrated rollback in a DR. For example, an orchestrated rollback may be prompted by various events, such as a detection of malware (e.g., a virus), the detection of a data leak, or a data access issue or anomaly.

Figure 66:
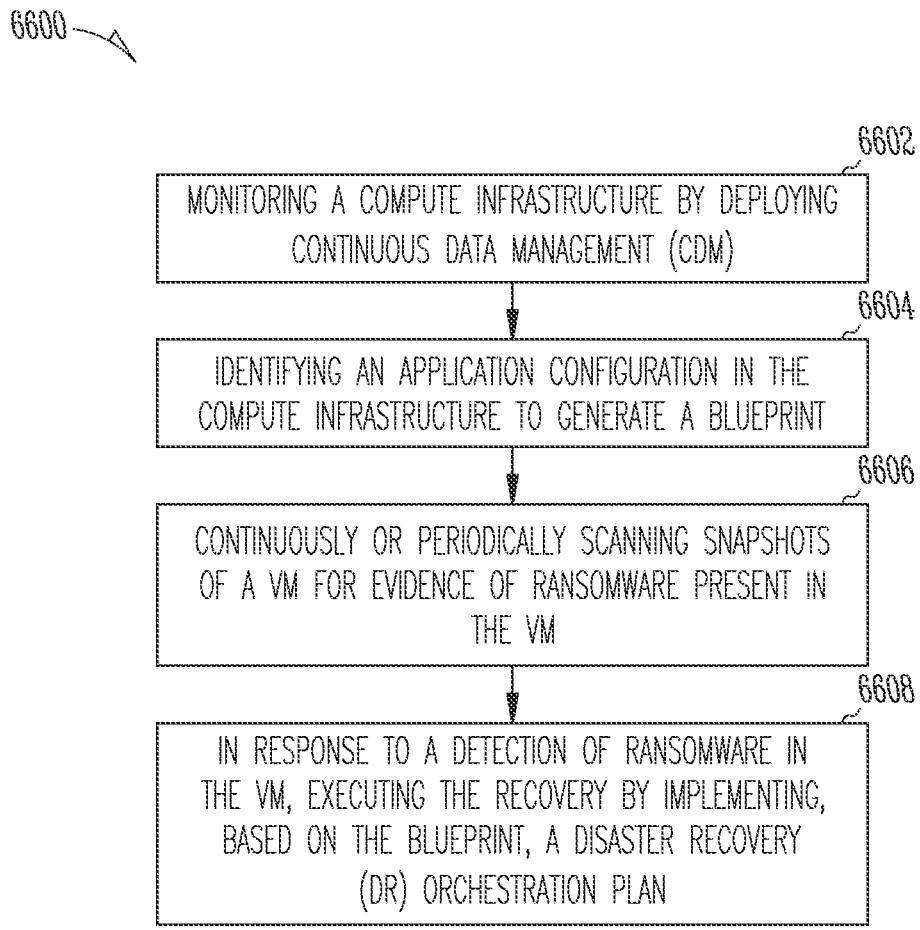
FIG. 66 is a flow chart of a method of orchestrating a recovery in the event of a ransomware attack on a compute infrastructure, according to one example.

FIG. 66 is a flow chart of a method 6600 of orchestrating a recovery in the event of a ransomware attack on a compute infrastructure, according to one example. In an example, method 6600 includes: at operation 6602, monitoring the compute infrastructure by deploying continuous data management (CDM) of the compute infrastructure, the compute infrastructure including a virtual machine (VM) having a virtual disk, a local primary datacenter and a remote secondary datacenter, the CDM to implement on-demand or automated backup services using the local primary datacenter or remote secondary datacenter; at operation 6604, identifying an application configuration in the compute infrastructure to generate a blueprint, the blueprint to serve as a target application configuration for a recovery in the event of a ransomware attack; at operation 6606, continuously or periodically scanning snapshots of the VM for evidence of ransomware present in the VM; and, at operation 6608, in response to a detection of ransomware in the VM, executing the recovery by implementing, based on the blueprint, a DR orchestration plan to establish the target application configuration at the local primary datacenter of the compute infrastructure.

In some examples, the deployed CDM includes at least: obtaining a base snapshot of the virtual disk of the VM; intercepting, at an interception point in an I/O path, a virtual disk I/O stream between the VM and a virtualization server; replicating the I/O stream at a backup site at the local primary datacenter or remote secondary datacenter; storing the replicated I/O stream at the backup site in I/O logs; forming a recoverable snapshot-log chain by applying the replicated I/O stream stored in the I/O logs on top of the base snapshot; receiving a request for recoverable data from a replication target; and sending data to the replication target based at least on a portion of the recoverable snapshot-log chain.

In some examples, the blueprint defines the DR orchestration plan for a failover or rollback employed in the recovery at the local primary data center, the DR orchestration plan including an application migration plan.

In some examples, the application migration plan is used to migrate, during the recovery, an application between different computing environments, the different computing environments including the local primary datacenter, the application migration plan based on snapshots of the VM executing the application in the compute infrastructure.

In some examples, scanning snapshots of the VM includes identifying a last known safe or good point in time prior to a data encryption of the ransomware attack.

In some examples, scanning snapshots of the VM includes recognizing that a ransomware-infected VM is identified in the blueprint.

Some examples include a tangible, machine-readable medium storing instructions which, when read by a machine, cause the machine to perform operations in a disaster recovery (DR) method of orchestrating a recovery in the event of a ransomware attack on a compute infrastructure, the operations comprising one or more of the operations summarized above with reference to FIG. 66, or described elsewhere herein.

Figure 32:
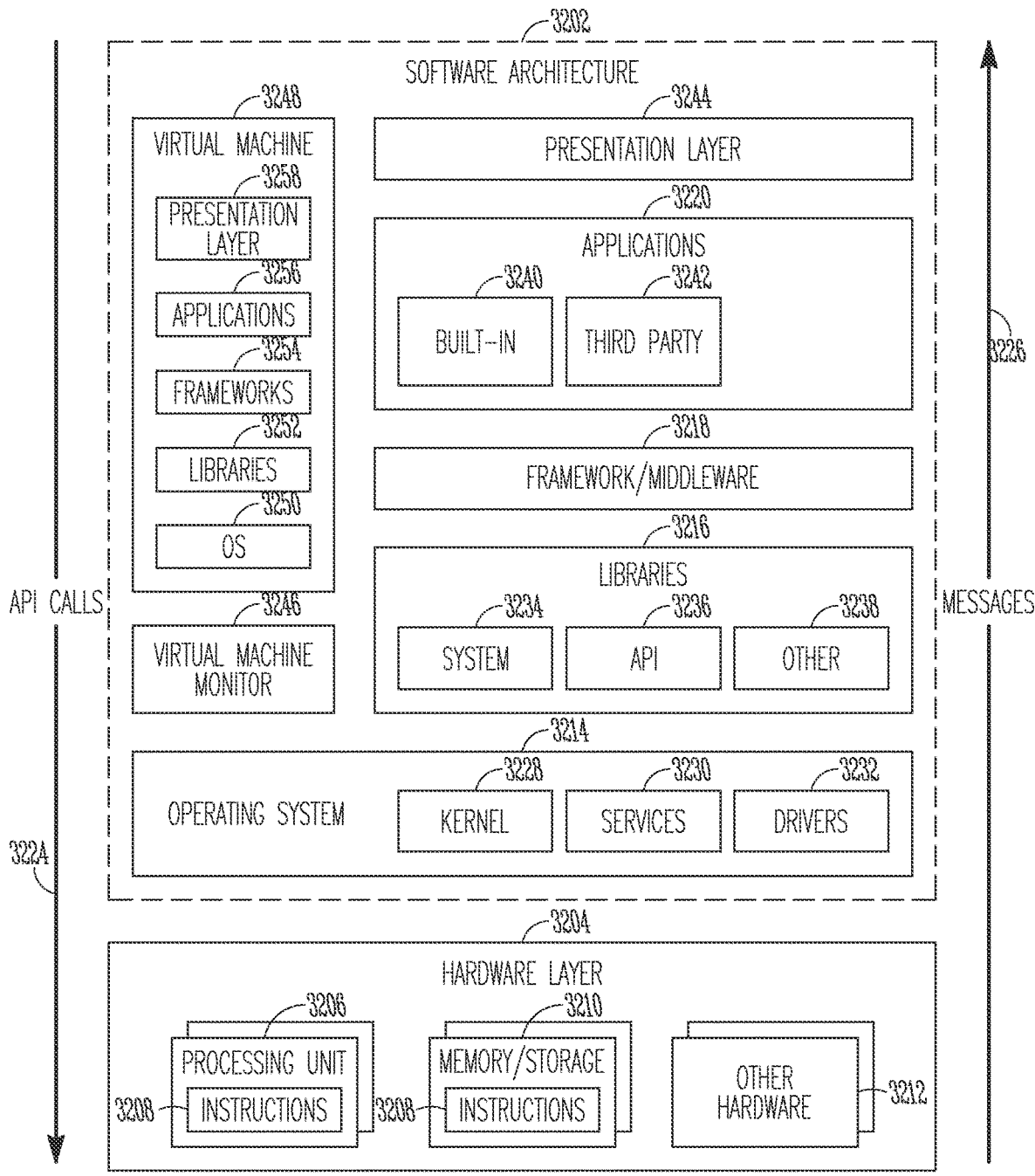
FIG. 32 depicts a block diagram illustrating an example of a software architecture that may be installed on a machine, according to some examples.

FIG. 32 is a block diagram illustrating an example of a software architecture that may be installed on a machine, according to some examples. FIG. 32 is merely a non-limiting example of a software architecture, and it will be appreciated that many other architectures may be implemented to facilitate the functionality described herein. The software architecture 3202 may be executing on hardware such as a machine 3300 of FIG. 33 that includes, among other things, processors 3310, memory 3330, and I/O components 3350. A representative hardware layer 3204 is illustrated and can represent, for example, the machine 3300 of FIG. 33. An example machine 3300 may be configured to perform any one or more of the methods, processes, or operations described herein. The representative hardware layer 3204 comprises one or more processing units 3206 having associated executable instructions 3208. The executable instructions 3208 represent the executable instructions of the software architecture 3202, including implementation of the methods, modules, and so forth described herein. The hardware layer 3204 also includes memory or storage modules 3210, which also have the executable instructions 3208. The hardware layer 3204 may also comprise other hardware 3212, which represents any other hardware of the hardware layer 3204, such as the other hardware illustrated as part of the machine 3200.

In the example architecture of FIG. 32, the software architecture 3202 may be conceptualized as a stack of layers, where each layer provides particular functionality. For example, the software architecture 3202 may include layers such as an operating system 3214, libraries 3216, frameworks/middleware 3218, applications 3220, and a presentation layer 3244. Operationally, the applications 3220 or other components within the layers may invoke API calls 3224 through the software stack and receive a response, returned values, and so forth (illustrated as messages 3226) in response to the API calls 3224. The layers illustrated are representative in nature, and not all software architectures have all layers. For example, some mobile or special purpose operating systems may not provide a frameworks/middleware 3218 layer, while others may provide such a layer. Other software architectures may include additional or different layers.

The operating system 3214 may manage hardware resources and provide common services. The operating system 3214 may include, for example, a kernel 3228, services 3230, and drivers 3232. The kernel 3228 may act as an abstraction layer between the hardware and the other software layers. For example, the kernel 3228 may be responsible for memory management, processor management (e.g., scheduling), component management, networking, security settings, and so on. The services 3230 may provide other common services for the other software layers. The drivers 3232 may be responsible for controlling or interfacing with the underlying hardware. For instance, the drivers 3232 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 3216 may provide a common infrastructure that may be utilized by the applications 3220 and/or other components and/or layers. The libraries 3216 typically provide functionality that allows other software modules to perform tasks in an easier fashion than by interfacing directly with the underlying operating system 3214 functionality (e.g., kernel 3228, services 3230, or drivers 3232). The libraries 3216 may include system libraries 3234 (e.g., C standard library) that may provide functions such as memory allocation functions, string manipulation functions, mathematic functions, and the like. In addition, the libraries 3216 may include API libraries 3236 such as media libraries (e.g., libraries to support presentation and manipulation of various media formats such as MPEG4, H.264, MP3, AAC, AMR, JPG, PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 3216 may also include a wide variety of other libraries 3238 to provide many other APIs to the applications 3220 and other software components/modules.

The frameworks 3218 (also sometimes referred to as middleware) may provide a higher-level common infrastructure that may be utilized by the applications 3220 or other software components/modules. For example, the frameworks 3218 may provide various graphic user interface (GUI) functions, high-level resource management, high-level location services, and so forth. The frameworks 3218 may provide a broad spectrum of other APIs that may be utilized by the applications 3220 and/or other software components/modules, some of which may be specific to a particular operating system or platform.

The applications 3220 include built-in applications 3240 and/or third-party applications 3242. Examples of representative built-in applications 3240 may include, but are not limited to, a home application, a contacts application, a browser application, a book reader application, a location application, a media application, a messaging application, or a game application.

The third-party applications 3242 may include any of the built-in applications 3240, as well as a broad assortment of other applications. In a specific example, the third-party applications 3242 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third-party applications 3242 may invoke the API calls 3224 provided by the mobile operating system such as the operating system 3214 to facilitate functionality described herein.

The applications 3220 may utilize built-in operating system functions (e.g., kernel 3228, services 3230, or drivers 3232), libraries (e.g., system 3234, APIs 3236, and other libraries 3238), or frameworks/middleware 3218 to create user interfaces to interact with users of the system. Alternatively, or additionally, in some systems, interactions with a user may occur through a presentation layer, such as the presentation layer 3244. In these systems, the application/module "logic" can be separated from the aspects of the application/module that interact with the user.

Some software architectures utilize virtual machines. In the example of FIG. 32, this is illustrated by a virtual machine 3248. A virtual machine creates a software environment where applications/modules can execute as if they were executing on a hardware machine e.g., the machine 3300 of FIG. 33, for example). A virtual machine 3248 is hosted by a host operating system (e.g., operating system 3214) and typically, although not always, has a virtual machine monitor 3246, which manages the operation of the virtual machine 3248 as well as the interface with the host operating system (e.g., operating system 3214). A software architecture executes within the virtual machine 3248, such as an operating system 3250, libraries 3252, frameworks/middleware 3254, applications 3256, or a presentation layer 3258. These layers of software architecture executing within the virtual machine 3248 can be the same as corresponding layers previously described or may be different.

Figure 33:
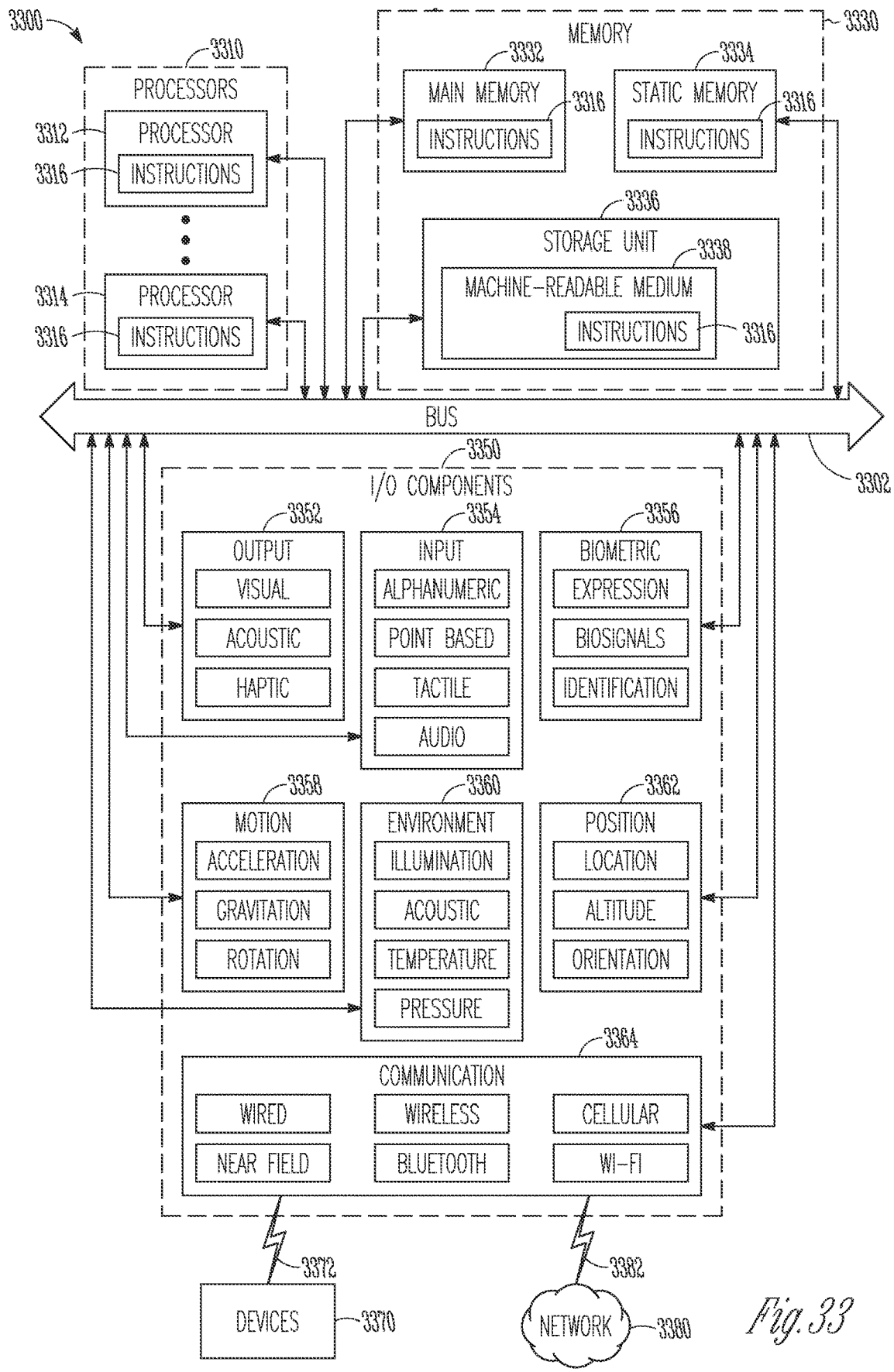
FIG. 33 illustrates a diagrammatic representation of a machine in the form of a computer system within which a set of instructions may be executed for causing a machine to perform any one or more of the methodologies discussed herein, according to an example.

FIG. 33 illustrates a diagrammatic representation of a machine 3300 in the form of a computer system within which a set of instructions may be executed for causing the machine to perform any one or more of the methodologies discussed herein, according to an example. Specifically, FIG. 33 shows a diagrammatic representation of the machine 3300 in the example form of a computer system, within which instructions 3316 (e.g., software, a program, an application, an applet, an app, or other executable code) for causing the machine 3300 to perform any one or more of the methodologies discussed herein may be executed. Additionally, or alternatively, the instructions 3316 may implement the operations of the methods shown in the accompanying figures, or as elsewhere described herein. The instructions 3316 transform the general, non-programmed machine 3300 into a particular machine 3300 programmed to carry out the described and illustrated functions in the manner described. In alternative examples, the machine 3300 operates as a standalone device or may be coupled (e.g., networked) to other machines. In a networked deployment, the machine 3300 may operate in the capacity of a server machine or a client machine in a server-client network environment, or as a peer machine in a peer-to-peer (or distributed) network environment. The machine 3300 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 3316, sequentially or otherwise, that specify actions to be taken by the machine 3300. Further, while only a single machine 3300 is illustrated, the term "machine" shall also be taken to include a collection of machines 3300 that individually or jointly execute the instructions 3316 to perform any one or more of the methodologies discussed herein.

The machine 3300 may include processors 3310, memory 3330, and I/O components 3350, which may be configured to communicate with each other such as via a bus 3302. In an example, the processors 3310 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 3312 and a processor 3314 that may execute the instructions 3316. The term "processor" is intended to include multi-core processors that may comprise two or more independent processors (sometimes referred to as "cores") that may execute instructions 3316 contemporaneously. Although FIG. 33 shows multiple processors 3310, the machine 3300 may include a single processor with a single core, a single processor with multiple cores (e.g., a multi-core processor), multiple processors with a single core, multiple processors with multiples cores, or any combination thereof.

The memory 3330 may include a main memory 3332, a static memory 3334, and a storage unit 3336, both accessible to the processors 3310 such as via the bus 3302. The main memory 3330, the static memory 3334, and storage unit 3336 store the instructions 3316 embodying any one or more of the methodologies or functions described herein. The instructions 3316 may also reside, completely or partially, within the main memory 3332, within the static memory 3334, within the storage unit 3336, within at least one of the processors 3310 (e.g., within the processor's cache memory), or any suitable combination thereof, during execution thereof by the machine 3300.

The I/O components 3350 may include a wide variety of components to receive input, provide output, produce output, transmit information, exchange information, capture measurements, and so on. The specific I/O components 3350 that are included in a particular machine will depend on the type of machine. For example, portable machines such as mobile phones will likely include a touch input device or other such input mechanisms, while a headless server machine will likely not include such a touch input device. It will be appreciated that the I/O components 3350 may include many other components that are not shown in FIG. 33. The I/O components 3350 are grouped according to functionality merely for simplifying the following discussion and the grouping is in no way limiting. In various examples, the I/O components 3350 may include output components 3352 and input components 3354. The output components 3352 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 3354 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In a further example, the I/O components 3350 may include biometric components 3356, motion components 3358, environmental components 3360, or position components 3362, among a wide array of other components. For example, the biometric components 3356 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 3358 may include acceleration sensor components (e.g., accelerometer), gravitation sensor components, rotation sensor components (e.g., gyroscope), and so forth. The environmental components 3360 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 3362 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 3350 may include communication components 3364 operable to couple the machine 3300 to a network 3380 or devices 3370 via a coupling 3382 and a coupling 3372, respectively. For example, the communication components 3364 may include a network interface component or another suitable device to interface with the network 3380. In further examples, the communication components 3364 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 3370 may be another machine or any of a wide variety of peripheral devices (e.g., a peripheral device coupled via a USB).

Moreover, the communication components 3364 may detect identifiers or include components operable to detect identifiers. For example, the communication components 3364 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 3364, such as location via Internet Protocol (IP) geolocation, location via Wi-Fi® signal triangulation, location via detecting an NFC beacon signal that may indicate a particular location, and so forth.

The various memories (i.e., 3330, 3332, 3334, and/or memory of the processor(s) 3310) and/or storage unit 3336 may store one or more sets of instructions and data structures (e.g., software) embodying or utilized by any one or more of the methodologies or functions described herein. These instructions (e.g., the instructions 3316), when executed by processor(s) 3310, cause various operations to implement the disclosed examples.

As used herein, the terms "machine-storage medium," "device-storage medium," "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various examples, one or more portions of the network 3380 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 3380 or a portion of the network 3380 may include a wireless or cellular network, and the coupling 3382 may be a Code Division Multiple Access (CDMA) connection, a Global System for Mobile communications (GSM) connection, or another type of cellular or wireless coupling. In this example, the coupling 3382 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 3316 may be transmitted or received over the network 3380 using a transmission medium via a network interface device (e.g., a network interface component included in the communication components 3364) and utilizing any one of a number of well-known transfer protocols (e.g., hypertext transfer protocol (HTTP)). Similarly, the instructions 3316 may be transmitted or received using a transmission medium via the coupling 3372 (e.g., a peer-to-peer coupling) to the devices 3370. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 3316 for execution by the machine 3300, and includes digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a matter as to encode information in the signal.

The terms "machine-readable medium," "computer-readable medium" and "device-readable medium" mean the same thing and may be used interchangeably in this disclosure. The terms are defined to include both machine-storage media and transmission media. Thus, the terms include both storage devices/media and carrier waves/modulated data signals.

Although the inventive subject matter of this disclosure has been described with reference to specific examples, it will be evident that various modifications and changes may be made to these examples without departing from the broader spirit and scope of the inventive subject matter. Accordingly, the specification and drawings are to be regarded in an illustrative rather than a restrictive sense. The accompanying drawings that form a part hereof, show by way of illustration, and not of limitation, specific examples in which the subject matter may be practiced. The examples illustrated are described in sufficient detail to enable those skilled in the art to practice the teachings disclosed herein. Other examples may be utilized and derived therefrom, such that structural and logical substitutions and changes may be made without departing from the scope of this disclosure. This Detailed Description, therefore, is not to be taken in a limiting sense, and the scope of various examples is defined only by the appended claims, along with the full range of equivalents to which such claims are entitled.

Such examples of the inventive subject matter may be referred to herein, individually and/or collectively, by the term "invention" merely for convenience and without intending to voluntarily limit the scope of this application to any single invention or inventive concept if more than one is in fact disclosed. Thus, although specific examples have been illustrated and described herein, it should be appreciated that any arrangement calculated to achieve the same purpose may be substituted for the specific examples shown. This disclosure is intended to cover any and all adaptations or variations of various examples. Combinations of the above examples, and other examples not specifically described herein, will be apparent to those of skill in the art upon reviewing the above description.

The invention claimed is:

1. A disaster recovery (DR) system for orchestrating a recovery in a compute infrastructure, the DR system comprising:
   at least one processor for executing machine-readable instructions; and
   a memory storing instructions configured to cause the at least one processor to perform operations comprising, at least:
   monitoring the compute infrastructure by deploying continuous data management (CDM) of the compute infrastructure, the compute infrastructure including a virtual machine (VM) having a virtual disk, a local primary datacenter and a remote secondary datacenter, the CDM to implement on-demand or automated backup services using the local primary datacenter or the remote secondary datacenter;
   identifying an application configuration for one or more applications that execute on the VM in the compute infrastructure to generate a blueprint, the blueprint to serve as a target application configuration for the recovery in response to a ransomware attack, wherein the blueprint is indicative of one or more scripts for restoring the target application configuration for the VM;
   continuously or periodically scanning snapshots of the VM for evidence of ransomware present in the VM;
   detecting, based at least in part on scanning the snapshots of the VM, that the VM is infected with ransomware;
   identifying that the ransomware infected VM is identified in the blueprint; and
   in response to a detection of the ransomware in the VM and identifying that the ransomware infected VM is identified in the blueprint, executing the recovery by implementing, based on the blueprint, a DR orchestration plan to establish the target application configuration at the local primary datacenter of the compute infrastructure, wherein the DR orchestration plan triggers execution of the one or more scripts of the blueprint to establish the target application configuration at the local primary datacenter.

2. The DR system of claim 1, wherein deploying the CDM comprises:
   obtaining a base snapshot of the virtual disk of the VM;
   intercepting, at an interception point in an I/O path, a virtual disk I/O stream between the VM and a virtualization server;
   replicating the virtual disk I/O stream at a backup site at the local primary datacenter or the remote secondary datacenter;
   storing the replicated virtual disk I/O stream at the backup site in I/O logs;
   forming a recoverable snapshot-log chain by applying the replicated virtual disk I/O stream stored in the I/O logs on top of the base snapshot;
   receiving a request for recoverable data from a replication target; and
   sending data to the replication target based at least on a portion of the recoverable snapshot-log chain.

3. The DR system of claim 1, wherein the blueprint defines the DR orchestration plan for a failover or rollback employed in the recovery at the local primary datacenter, the DR orchestration plan including an application migration plan.

4. The DR system of claim 3, wherein the application migration plan is used to migrate, during the recovery, an application between different computing environments, the different computing environments including the local primary datacenter, the application migration plan based on the snapshots of the VM executing the application in the compute infrastructure.

5. The DR system of claim 1, wherein scanning snapshots of the VM comprises:
   identifying a last known safe or good point in time prior to a data encryption of the ransomware attack.

6. The DR system of claim 1, wherein each virtual machine of a collection of virtual machines of the generated blueprint is protected based on a respective service level agreement (SLA) that defines a set of DMS policies that includes a backup policy, a replication policy, and an archival policy for the snapshots of the virtual machine.

7. The DR system of claim 1, wherein the blueprint defines a boot priority for the one or more applications that execute on the VM for restoring the target application configuration for the VM and wherein the DR orchestration plan is executed in accordance with the boot priority for the one or more applications.

8. A computer-implemented disaster recovery (DR) method of orchestrating a recovery in a compute infrastructure, the DR method comprising, at least:
   monitoring the compute infrastructure by deploying continuous data management (CDM) of the compute infrastructure, the compute infrastructure including a virtual machine (VM) having a virtual disk, a local primary datacenter and a remote secondary datacenter, the CDM to implement on-demand or automated backup services using the local primary datacenter or the remote secondary datacenter;
   identifying an application configuration for one or more applications that execute on the VM in the compute infrastructure to generate a blueprint, the blueprint to serve as a target application configuration for the recovery in response to a ransomware attack, wherein the blueprint is indicative of one or more scripts for restoring the target application configuration for the VM;
   continuously or periodically scanning snapshots of the VM for evidence of ransomware present in the VM;
   detecting, based at least in part on scanning the snapshots of the VM, that the VM is infected with ransomware;
   identifying that the ransomware infected VM is identified in the blueprint; and
   in response to a detection of the ransomware in the VM and identifying that the ransomware infected VM is identified in the blueprint, executing the recovery by implementing, based on the blueprint, a DR orchestration plan to establish the target application configuration at the local primary datacenter of the compute infrastructure, wherein the DR orchestration plan triggers execution of the one or more scripts of the blueprint to establish the target application configuration at the local primary datacenter.

9. The DR method of claim 8, deploying the CDM comprises:
obtaining a base snapshot of the virtual disk of the VM;
intercepting, at an interception point in an I/O path, a virtual disk I/O stream between the VM and a virtualization server;
replicating the virtual disk I/O stream at a backup site at the local primary datacenter or the remote secondary datacenter;
storing the replicated virtual disk I/O stream at the backup site in I/O logs;
forming a recoverable snapshot-log chain by applying the replicated virtual disk I/O stream stored in the I/O logs on top of the base snapshot;
receiving a request for recoverable data from a replication target; and
sending data to the replication target based at least on a portion of the recoverable snapshot-log chain.

10. The DR method of claim 8, wherein the blueprint defines the DR orchestration plan for a failover or rollback employed in the recovery at the local primary datacenter, the DR orchestration plan including an application migration plan.

11. The DR method of claim 10, wherein the application migration plan is used to migrate, during the recovery, an application between different computing environments, the different computing environments including the local primary datacenter, the application migration plan based on the snapshots of the VM executing the application in the compute infrastructure.

12. The DR method of claim 8, wherein scanning snapshots of the VM comprises:
identifying a last known safe or good point in time prior to a data encryption of the ransomware attack.

13. A non-transitory machine-readable medium storing instructions which, when read by a machine, cause the machine to perform operations in a disaster recovery (DR) method of orchestrating a recovery in a compute infrastructure, the operations comprising, at least:
monitoring the compute infrastructure by deploying continuous data management (CDM) of the compute infrastructure, the compute infrastructure including a virtual machine (VM) having a virtual disk, a local primary datacenter and a remote secondary datacenter, the CDM to implement on-demand or automated backup services using the local primary datacenter or the remote secondary datacenter;
identifying an application configuration for one or more applications that execute on the VM in the compute infrastructure to generate a blueprint, the blueprint to serve as a target application configuration for the recovery in response to a ransomware attack, wherein the blueprint is indicative of one or more scripts for restoring the target application configuration for the VM;
continuously or periodically scanning snapshots of the VM for evidence of ransomware present in the VM;
detecting, based at least in part on scanning the snapshots of the VM, that the VM is infected with ransomware;
identifying that the ransomware infected VM is identified in the blueprint; and
in response a detection of the ransomware in the VM and identifying that the ransomware infected VM is identified in the blueprint, executing the recovery by implementing, based on the blueprint, a DR orchestration plan to establish the target application configuration at the local primary datacenter of the compute infrastructure, wherein the DR orchestration plan triggers execution of the one or more scripts of the blueprint to establish the target application configuration at the local primary datacenter.

14. The medium of claim 13, wherein deploying the CDM comprises:
obtaining a base snapshot of the virtual disk of the VM;
intercepting, at an interception point in an I/O path, a virtual disk I/O stream between the VM and a virtualization server;
replicating the virtual disk I/O stream at a backup site at the local primary datacenter or the remote secondary datacenter;
storing the replicated virtual disk I/O stream at the backup site in I/O logs;
forming a recoverable snapshot-log chain by applying the replicated virtual disk I/O stream stored in the I/O logs on top of the base snapshot;
receiving a request for recoverable data from a replication target; and
sending data to the replication target based at least on a portion of the recoverable snapshot-log chain.

15. The medium of claim 13, wherein the blueprint defines the DR orchestration plan for a failover or rollback employed in the recovery at the local primary datacenter, the DR orchestration plan including an application migration plan.

16. The medium of claim 15, wherein the application migration plan is used to migrate, during the recovery, an application between different computing environments, the different computing environments including the local primary datacenter, the application migration plan based on snapshots of the VM executing the application in the compute infrastructure.

17. The medium of claim 13, wherein scanning snapshots of the VM comprises:
identifying a last known safe or good point in time prior to a data encryption of the ransomware attack.

* * * * *